United States Patent
Ishii

(10) Patent No.: US 11,398,250 B2
(45) Date of Patent: Jul. 26, 2022

(54) RECOVERY DEVICE, RECOVERY SYSTEM, AND RECOVERY METHOD

(71) Applicant: NEC Platforms, Ltd., Kawasaki (JP)

(72) Inventor: Hiroaki Ishii, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 17/299,451

(22) PCT Filed: Dec. 13, 2019

(86) PCT No.: PCT/JP2019/048893
§ 371 (c)(1),
(2) Date: Jun. 3, 2021

(87) PCT Pub. No.: WO2020/129833
PCT Pub. Date: Jun. 25, 2020

(65) Prior Publication Data
US 2022/0028423 A1    Jan. 27, 2022

(30) Foreign Application Priority Data
Dec. 20, 2018  (JP) .............................. JP2018-237872

(51) Int. Cl.
*G11B 15/67*        (2006.01)
*G11B 15/675*       (2006.01)
(Continued)

(52) U.S. Cl.
CPC ...... *G11B 15/672* (2013.01); *G11B 15/67502* (2013.01); *G11B 23/20* (2013.01); *B65H 7/06* (2013.01)

(58) Field of Classification Search
CPC ...................... G11B 15/672; G11B 15/67502
See application file for complete search history.

(56) References Cited

U.S. PATENT DOCUMENTS 3,637,153 A * 1/1972 King ..................... G11B 23/113
                                              242/523.1
4,230,520 A * 10/1980 Morgan ................. G11B 23/113
                                              156/505
(Continued)

FOREIGN PATENT DOCUMENTS

JP    H05-282839 A    10/1993
JP    H01-275688 A    12/1997
(Continued)

OTHER PUBLICATIONS

International Search Report for PCT Application No. PCT/JP2019/048893, dated Mar. 3, 2020.
(Continued)

*Primary Examiner* — Brian E Miller

(57) ABSTRACT

In order to improve the probability of recovering tape remaining in a tape device without disassembling the tape device, this recovery device comprises: a connection unit that attaches one lengthwise end of a designated recovery tape member to near one lengthwise end, which is a free end, of a tape member having the other end bound to a designated binding member; a recovery unit to which the other end of the recovery tape member is fixed and that winds the recovery tape member and the attached tape member; and a release unit that separates the tape member from the binding member at the other end or near the other end after attachment.

18 Claims, 48 Drawing Sheets

(51) Int. Cl.
*G11B 23/20* (2006.01)
*B65H 7/06* (2006.01)

(56) References Cited

U.S. PATENT DOCUMENTS

| | | | | |
|---|---|---|---|---|
| 4,283,026 A * | 8/1981 | Werner | G11B 15/674 | 242/345 |
| 4,364,791 A * | 12/1982 | Kincheloe | G11B 23/113 | 156/506 |
| 4,501,630 A * | 2/1985 | Kiuchi | G11B 27/06 | 156/159 |
| 4,636,279 A * | 1/1987 | Morgan | G11B 23/20 | 156/506 |
| 4,854,517 A * | 8/1989 | Watanabe | G11B 23/113 | 242/532.1 |
| 4,974,785 A * | 12/1990 | Woodley | B31F 5/06 | 156/505 |
| 5,150,849 A * | 9/1992 | Farrow | G11B 23/113 | 242/532.1 |
| 5,221,404 A * | 6/1993 | Oya | G07F 11/68 | 156/350 |
| 5,305,964 A * | 4/1994 | Sota | G11B 23/113 | 242/532.1 |
| 5,366,174 A * | 11/1994 | Tsukamoto | B65H 19/105 | 156/763 |
| 5,513,818 A * | 5/1996 | Wada | G11B 23/113 | 242/532.1 |
| 2015/0059488 A1* | 3/2015 | Chang | G01N 19/04 | 73/794 |
| 2022/0028423 A1* | 1/2022 | Ishii | B65H 7/06 | |

FOREIGN PATENT DOCUMENTS

| | | |
|---|---|---|
| JP | H09-328661 | 12/1997 |
| JP | 2002-230936 A | 8/2002 |
| JP | 2003-030953 | 1/2003 |
| JP | 2003-091964 | 3/2003 |
| JP | 2005-285226 A | 10/2005 |

OTHER PUBLICATIONS

English translation of Written opinion for PCT Application No. PCT/JP2019/048893, dated Mar. 3, 2020.
Shinobu Fujihara. "2-1 LTO Tape Drive Technology", The Journal of the Institute of Image Information and Television Engineers vol. 70, No. 3, pp. 377-381. 2016.

* cited by examiner

RECOVERY DEVICE, RECOVERY SYSTEM, AND RECOVERY METHOD

This application is a National Stage Entry of PCT/JP2019/048893 filed on Dec. 13, 2019, which claims priority from Japanese Patent Application 2018-237872 filed on Dec. 20, 2018, the contents of all of which are incorporated herein by reference, in their entirety.

TECHNICAL FIELD

The present invention relates to a method of recovering a tape from a device.

BACKGROUND ART

As a magnetic tape device, a magnetic tape device using a magnetic tape cartridge of a single-reel type is generally widespread.

FIG. 1 is a schematic diagram illustrating a configuration of a magnetic tape device 101 being an example of a general single-reel type magnetic tape device. FIG. 1(a) is a side view of the magnetic tape device 101. FIG. 1(b) is a cross-sectional view assumed to be cut at a line 901a illustrated in FIG. 1(a). Further, FIG. 2 is a schematic diagram illustrating a configuration of a cassette 201 being an example of a general cassette to be mounted on the magnetic tape device 101 illustrated in FIG. 1. Further, FIG. 3 is a schematic diagram illustrating a situation where the cassette 201 illustrated in FIG. 2 is mounted on the magnetic tape device 101 illustrated in FIG. 1, and recording/reproduction of a magnetic tape is performed.

When the cassette 201 is mounted on the magnetic tape device 101, an end portion 218 of a magnetic tape 216 illustrated in FIG. 2 passes through the right of each of guides 116 and a head 111 being illustrated in FIG. 1 and is mounted on a reel 106 by a known loading mechanism (not illustrated). The loading mechanism is, for example, a tape loading arm disclosed in FIG. 3 in NPL 1. The end portion is disclosed in FIG. 2 in NPL 1, for example. Then, as illustrated in FIG. 3, the reel 106 of the magnetic tape device 101 rotates in a direction of an arrow 906a and a rotating unit 206 of the cassette 201 rotates in a direction of an arrow 906b, and thus the magnetic tape 216 passes through above (the right of) the head 111. At this time, magnetic information recorded on the magnetic tape 216 is reproduced by the head 111, or new magnetic information is recorded on the magnetic tape 216 by the head 111. The magnetic tape 216 after reproduction or recording is performed by the head 111 is stored as a magnetic tape 216b in the reel 106. A traveling path of the magnetic tape 216 in the magnetic tape device 101 is a path of a portion in which the magnetic tape 216 is displayed from the lowest guide 116 to the reel 106 through the head 111 and the other guides 116.

Note that the guides 116, the head 111, and a drive unit 126 being a drive unit of the reel 106 are each fixed to a member (not illustrated) fixed to a housing 121. Further, partitions 131, 132, and 133 illustrated in FIG. 1 have a role as a guide and a stopper when the cassette 201 is mounted on the magnetic tape device 101.

The magnetic tape device 101 includes a drive unit 127 illustrated in FIG. 1(a) for rotating and driving the rotating unit 206 of the cassette 201. When reproduction or recording of a magnetic tape 216a illustrated in FIG. 3 ends, the magnetic tape device 101 rotates the rotating unit 206 in an opposite direction to the arrow 906b in FIG. 3 by the drive unit 127, and winds the magnetic tape 216b around the rotating unit 206. When winding is completed, the cassette 201 becomes in a state of being able to be removed from the magnetic tape device 101.

Herein, PTL 1 discloses an inspection device of a tape coiled body that shakes surroundings of the tape coiled body in a predetermined angle range from a position of the tape coiled body facing an outer tape surface, and determines quality of an external appearance shape of the tape coiled body, based on an output of a sensor means.

Further, PTL 2 discloses a continuous recovery method for a magnetic tape, of winding a magnetic tape of a plurality of tape cassettes around a tape recovery reel.

Further, PTLs 3 and 4 disclose a method of adjusting adhesive strength of an adhesive.

CITATION LIST

Patent Literature

[PTL 1] Japanese Unexamined Patent Application Publication No. 2003-091964
[PTL 2] Japanese Unexamined Patent Application Publication No. 2003-030953
[PTL 3] Japanese Unexamined Patent Application Publication No. H09-328661
[PTL 4] Japanese Unexamined Patent Application Publication No. H01-275688

Non Patent Literature

[NPL 1] Shinobu FUJIHARA, The Journal of the Institute of Image Information and Television Engineers Vol. 70, No. 3, pp. 377 to 381 (2016), 2-1 LTO Tape Drive Technology

SUMMARY OF INVENTION

Technical Problem

The magnetic tape 216 may be cut while recording/reproduction of the magnetic tape 216 is performed as illustrated in FIG. 3.

FIG. 4 is a schematic diagram illustrating a situation where the magnetic tape 216 is cut when recording/reproduction of the magnetic tape 216 is performed as illustrated in FIG. 3.

In the state illustrated in FIG. 4, the magnetic tape is cut (hereinafter, referred to as a "tape cut") between a rupture portion 217a and a rupture portion 217b. In this way, the magnetic tape is divided into a magnetic tape 216b already stored in the reel 106 of the magnetic tape device 101 and a magnetic tape 216a being the other portion.

In the state illustrated in FIG. 4, the magnetic tape 216a is stored inside the cassette 201 by rotation of the rotating unit 206 by the drive unit 127 illustrated in FIG. 1, and the cassette 201 is then removed from the magnetic tape device 101, and thus the magnetic tape 216a can be recovered. However, the magnetic tape 216b already stored in the magnetic tape device 101 cannot be generally recovered unless the magnetic tape device 101 is disassembled.

Such recovery by disassembling may be relatively easily performed when the magnetic tape device 101 is brought into a well-equipped factory or the like. However, confidential information of a user and the like of the magnetic tape device 101 is stored in the magnetic tape 216b, and the magnetic tape 216b may not be brought out from a controlled area of the user and the like. In this case, difficult work such as disassembling in the controlled area and the like where a facility for recovery by disassembling is insufficient needs to be performed.

An object of the present invention is to provide a recovery device and the like being able to improve a probability that a tape remaining inside a tape device is able to be recovered without disassembling the tape device.

Solution to Problem

A recovery device according to the present invention includes a connection unit that attaches one end portion in a longitudinal direction of a recovery tape to a vicinity of one end portion in a longitudinal direction being a free end of a tape having another end portion being bound to a member, a recovery unit to which another end portion of the recovery tape is fixed, and that performs winding of the tape and the recovery tape that are attached, and a cutting unit that separates the tape from the member at the one end portion or in a vicinity of the one end portion after the attachment.

Advantageous Effects of Invention

A recovery device and the like according to the present invention are able to improve a probability that a tape remaining inside a tape device is able to be recovered without disassembling the tape device.

BRIEF DESCRIPTION OF DRAWINGS

FIG. 12 is an enlarged view illustrating a configuration in a range 916a.

FIG. 29 is an enlarged view illustrating a configuration in a range 917a.

FIG. 40 is an enlarged view in a range 918a.

EXAMPLE EMBODIMENT

First Example Embodiment

A recovery system according to the present example embodiment recovers an in-device tape being a magnetic tape that is difficult to recover inside a magnetic tape device due to a tape cut, and includes a recovery cassette and the magnetic tape device.

The magnetic tape device previously includes, outside a traveling path on which a magnetic tape travels, a recovery tape for recovering the in-device tape.

When a tape cut described in the section of [Technical Problem] occurs in the magnetic tape device, a general cassette mounted on the magnetic tape device is taken out, and the recovery cassette is mounted instead. Then, the recovery cassette connects the in-device tape, the recovery cassette, and a tape winding mechanism of the recovery cassette by a method described later.

The recovery tape and the magnetic tape that are formed into one by the above-mentioned connection are recovered by traveling on the traveling path by winding by the tape winding mechanism.

[Configuration and Operation]

Figure 5:
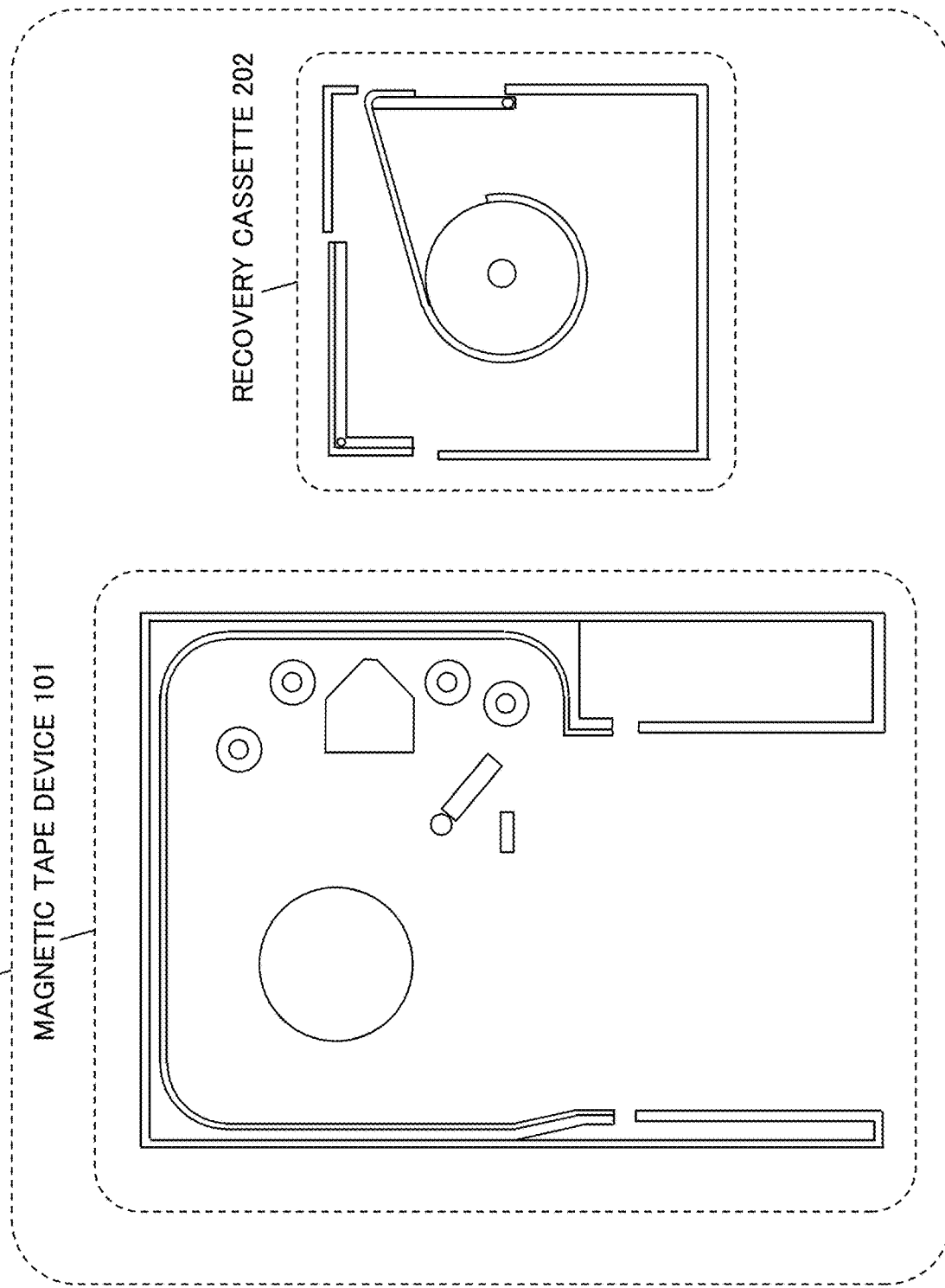
FIG. 5 is a schematic diagram illustrating a configuration example of a tape recovery system according to the present example embodiment.

FIG. 5 is a schematic diagram illustrating a configuration of a tape recovery system 100 being an example of a tape recovery system according to the present example embodiment.

The tape recovery system 100 includes a magnetic tape device 101 and a recovery cassette 202.

Figure 2:
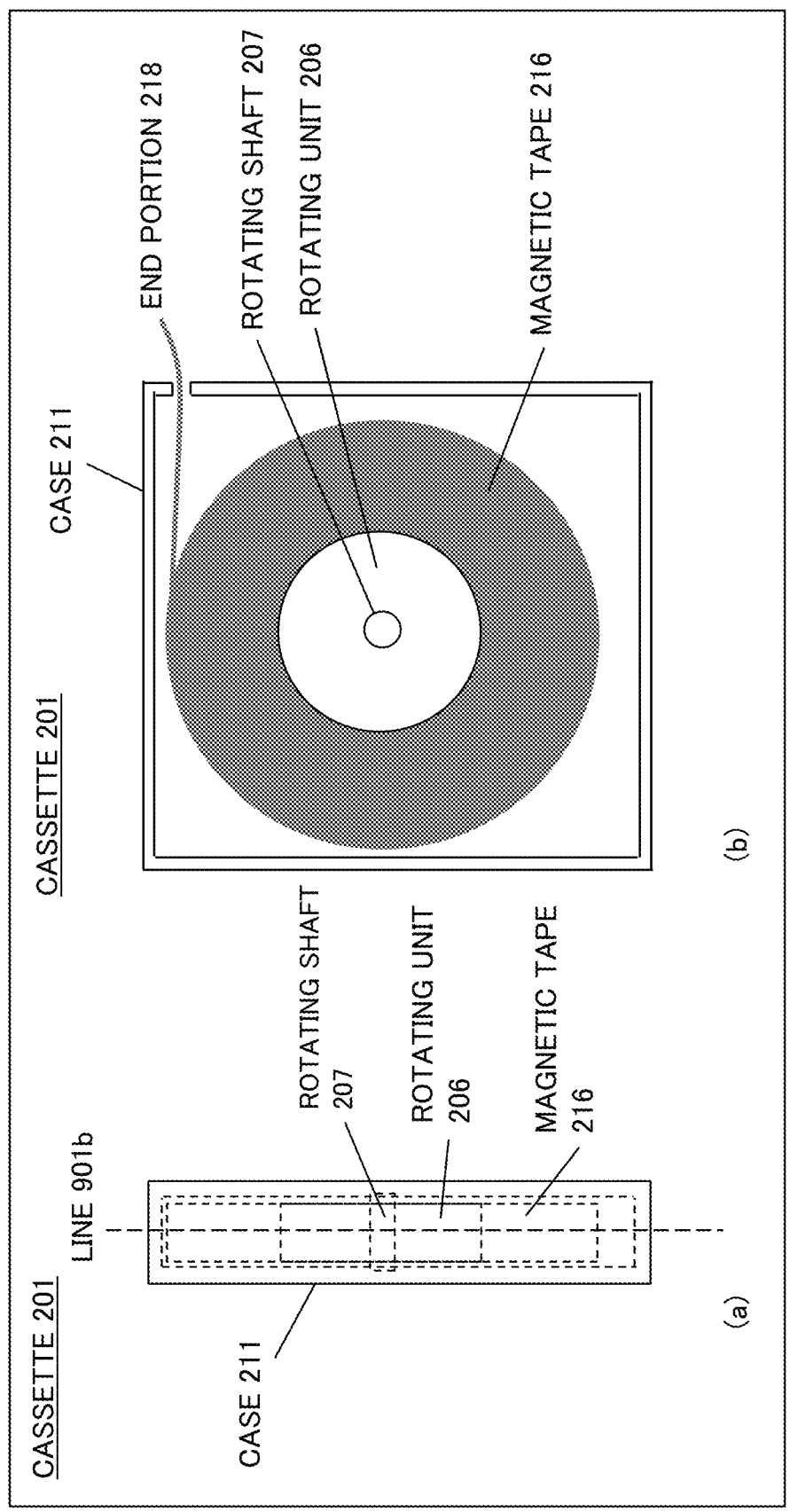
FIG. 2 is a schematic diagram illustrating a configuration example of a general cassette.

The tape recovery system 100 is used for recovering a magnetic tape remaining inside the magnetic tape device 101 in a case where a tape cut occurs when the tape recovery system 100 operates the magnetic tape device 101 illustrated in FIG. 5 on which the general cassette illustrated in FIG. 2 is mounted.

The tape recovery system 100 recovers a magnetic tape remaining inside the magnetic tape device 101 illustrated in FIG. 5 by mounting the recovery cassette 202 on the magnetic tape device 101 and causing an operation described later to be performed.

A configuration of the magnetic tape device 101 illustrated in FIG. 5 will be described later with reference to FIGS. 6 to 8. Further, a configuration of the recovery cassette 202 illustrated in FIG. 5 will be described later with reference to FIGS. 10 to 14. Further, an operation, performed by the tape recovery system 100, of recovering a magnetic tape remaining inside the magnetic tape device 101 due to a tape cut will be described later with reference to FIGS. 15 to 36.

Figure 6:
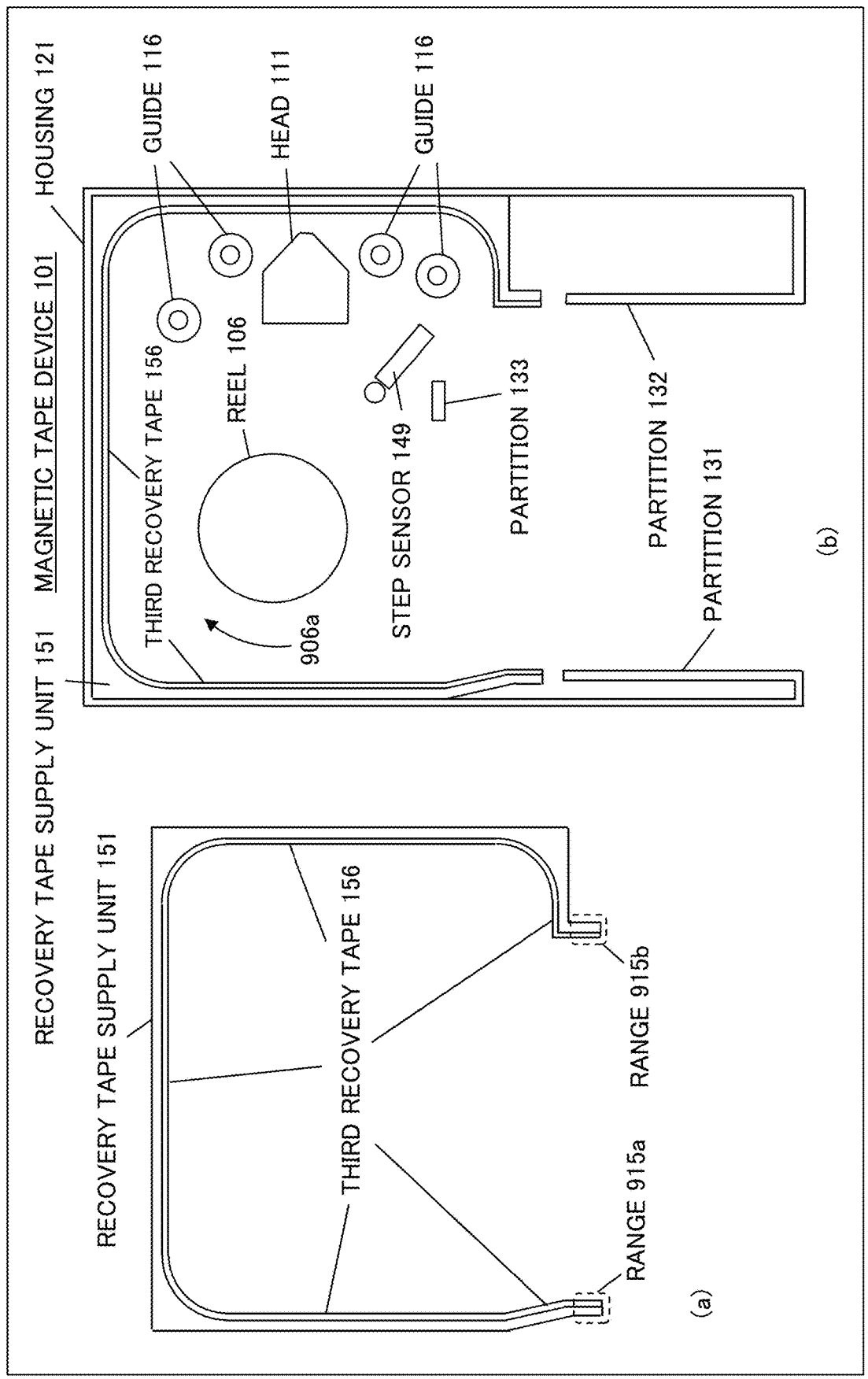
FIG. 6 is a schematic diagram illustrating a configuration example of a magnetic tape device according to the present example embodiment.

FIG. 6 is a schematic diagram illustrating a configuration of the magnetic tape device 101 illustrated in FIG. 5.

Figure 1:
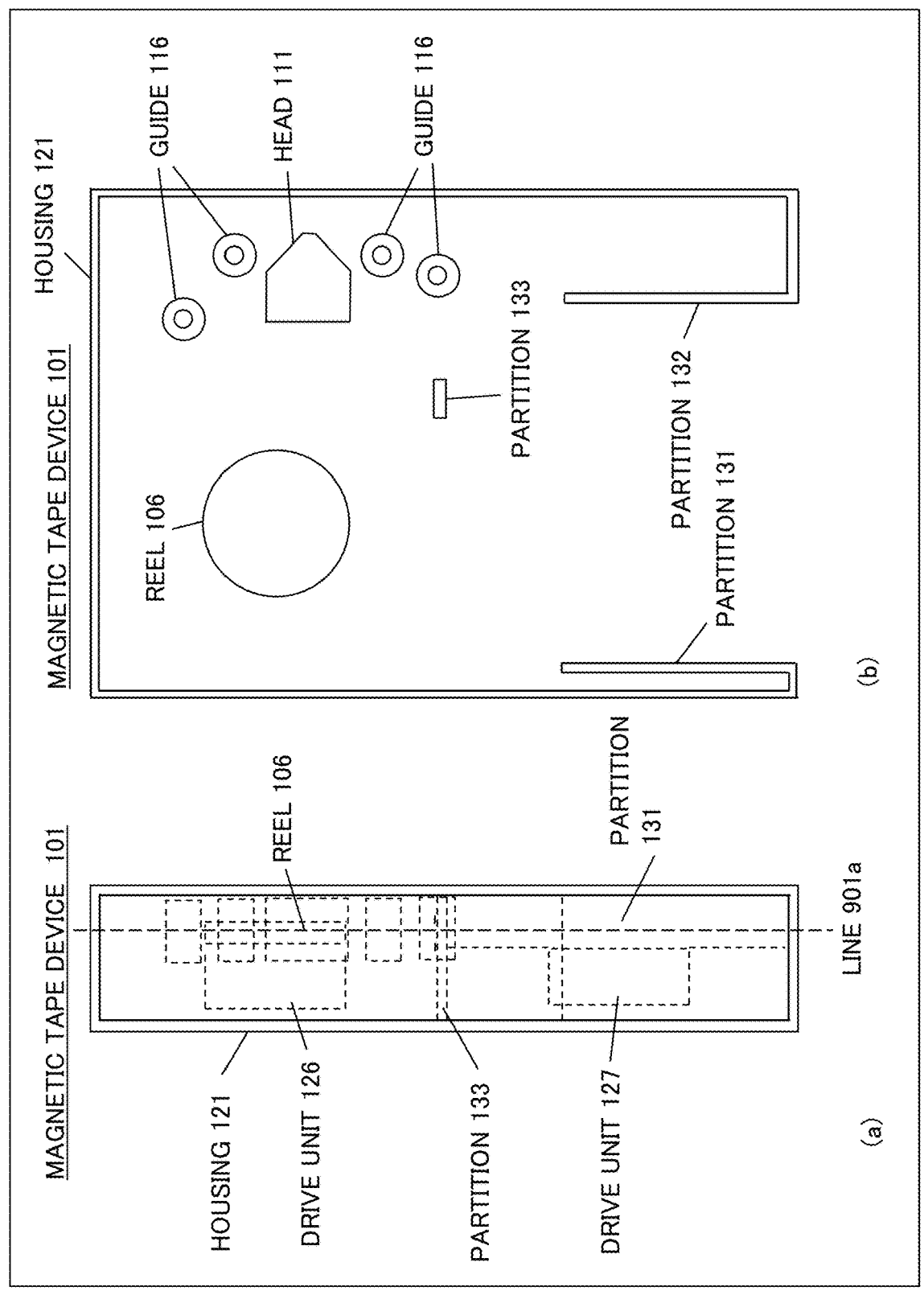
FIG. 1 is a schematic diagram illustrating a configuration example of a general magnetic tape device.

The magnetic tape device 101 is acquired by mounting a recovery tape supply unit 151 and a step sensor 149 illustrated in FIG. 6(a) on the general magnetic tape device 101 illustrated in FIG. 1. FIG. 6(a) is a diagram illustrating the recovery tape supply unit 151 alone. Further, FIG. 6(b) is a diagram illustrating a situation where the recovery tape supply unit 151 and the step sensor 149 are mounted on the general magnetic tape device 101 illustrated in FIG. 1. FIG. 6(b) is a cross-sectional view on an assumption that the magnetic tape device 101 illustrated in FIG. 5 is cut in a cross section corresponding to a cross section of the cross-sectional view of the magnetic tape device 101 illustrated in FIG. 1(b).

Note that, although not illustrated, the magnetic tape device 101 illustrated in FIG. 6 includes the drive units 126 and 127 illustrated in FIG. 1.

Figure 3:
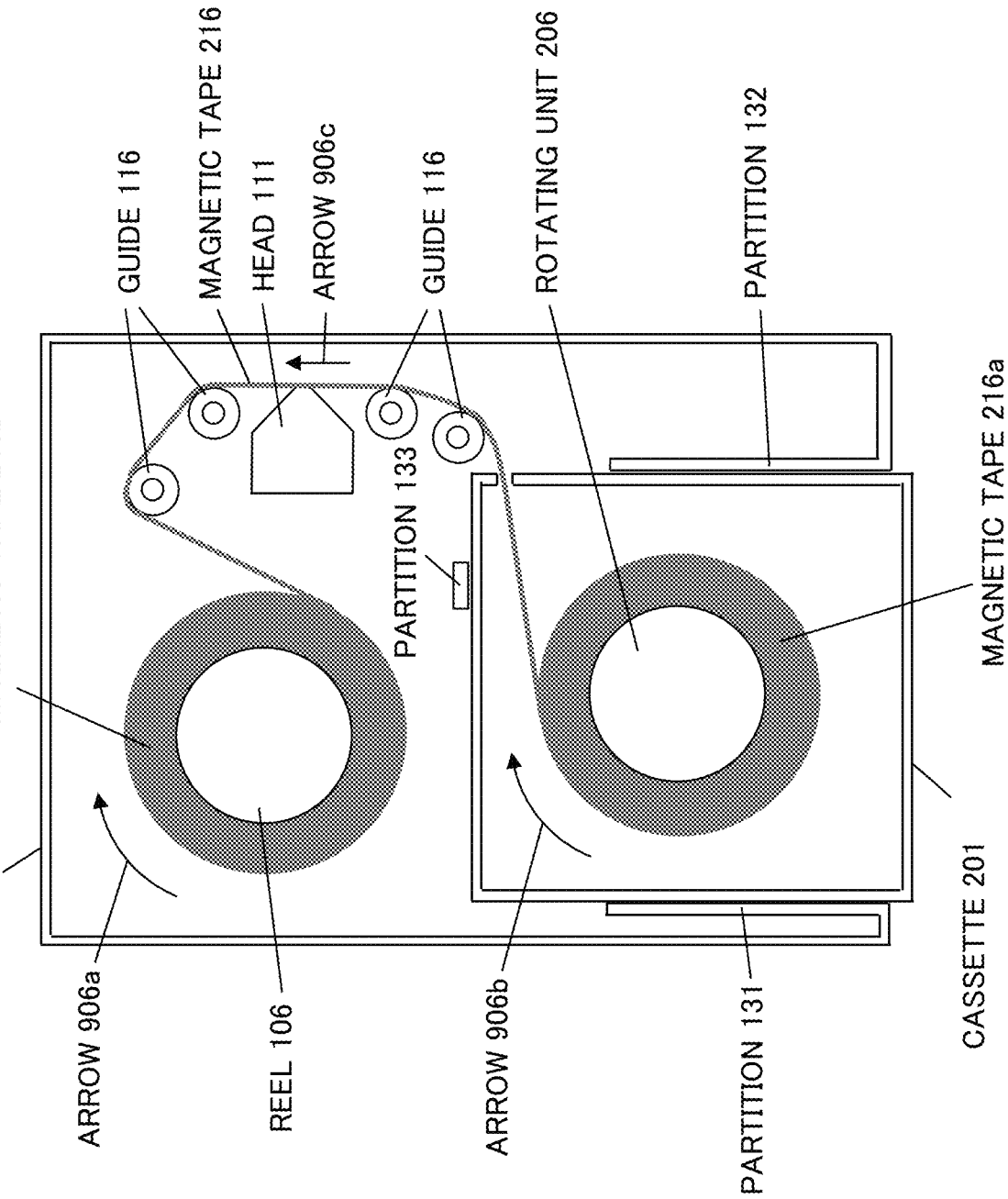
FIG. 3 is a schematic diagram illustrating a situation where a general cassette is mounted on a general magnetic tape device, and recording/reproduction of a magnetic tape is performed.

A third recovery tape 156 is mounted inside the recovery tape supply unit 151. The third recovery tape 156 illustrated in FIG. 6(a) is a cross section of the third recovery tape 156. The third recovery tape 156 recovers a magnetic tape remaining inside the magnetic tape device 101 by being connected to another recovery tape included in a recovery-specific cassette described later. Although not illustrated, the width of the third recovery tape 156 is approximately the same as the width of the magnetic tapes 216, 216a, and 216b illustrated in FIGS. 2 and 3 and magnetic tapes 216a and 216b illustrated in FIG. 15 described later. Note that an enlarged view of ranges 915a and 915b illustrated in FIG. 6(a) will be described later with reference to FIG. 7.

The step sensor 149 rotates, together with a reel 106, the magnetic tape 216b wound around the reel 106 as illustrated in FIGS. 15 to 18 described later, and detects a rotational position of a rupture portion 217b by a step. A detailed example of the step sensor 149 will be described later with reference to FIG. 8.

Figure 4:
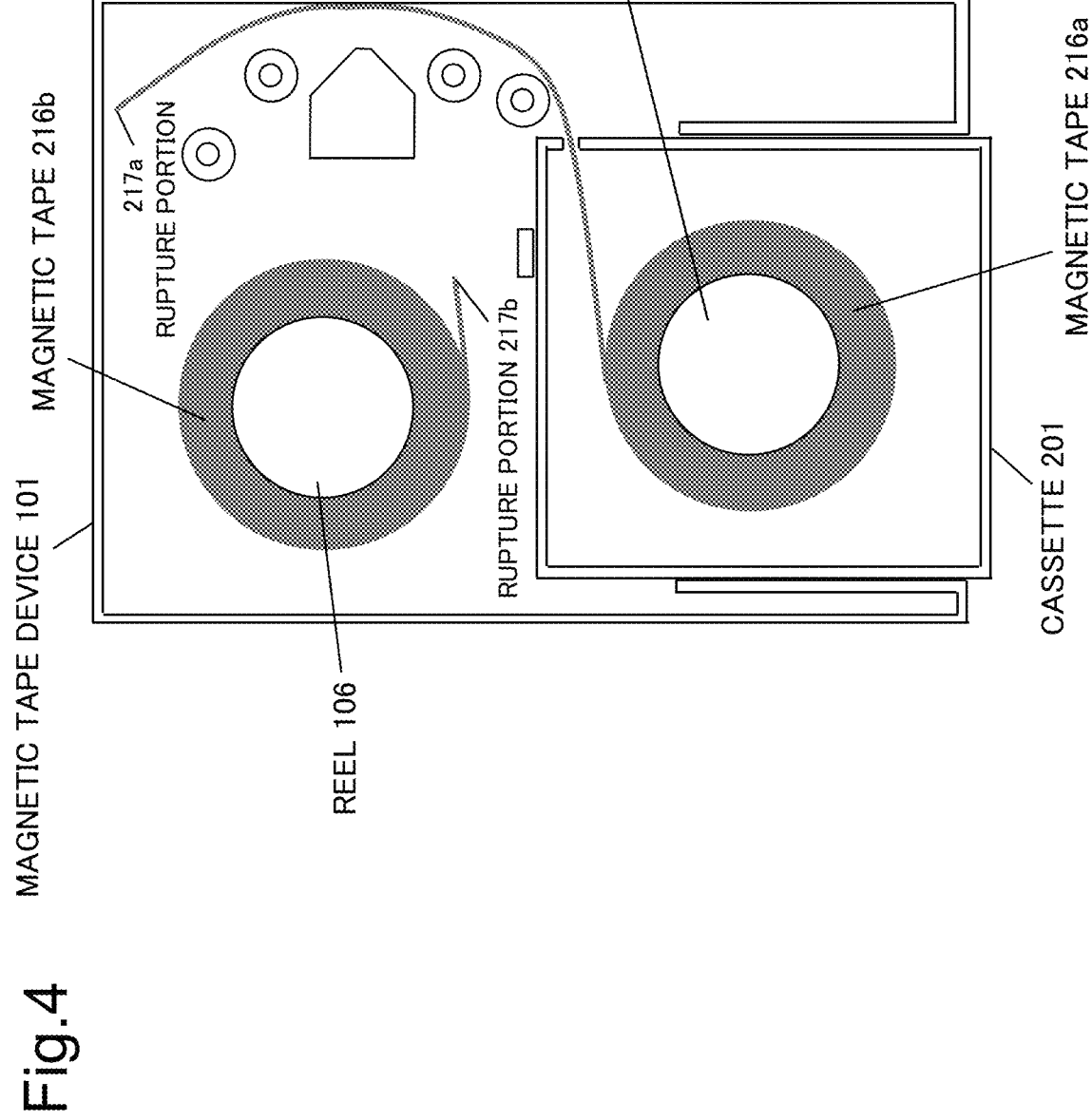
FIG. 4 is a schematic diagram illustrating a situation where the magnetic tape is cut.

Note that the magnetic tape device 101 illustrated in FIG. 6(b) has a configuration of the magnetic tape device 101 illustrated in FIG. 1. Thus, the magnetic tape device 101 illustrated in FIG. 6(b) can perform the operation illustrated in FIG. 3 while the cassette 201 illustrated in FIG. 2 being a general cassette is mounted. Further, a tape cut as illustrated in FIG. 4 may occur during the operation illustrated in FIG. 3 in the magnetic tape device 101 illustrated in FIG. 6(b).

FIG. 7(a) is an enlarged view (cross-sectional view) of the range 915a illustrated in FIG. 6(a). Further, FIG. 7(b) is an enlarged view (cross-sectional view) of the range 915b illustrated in FIG. 6(a).

In both of the ranges 915a and 915b, the third recovery tape 156 is installed on the recovery tape supply unit 151. The third recovery tape 156 is bonded to a surface of the recovery tape supply unit 151 by an adhesive (not illustrated).

The third recovery tape 156 is acquired by laminating a plurality of layers of thin tapes (hereinafter referred to as "sub-tapes"). Two overlapping sub-tapes are bonded together with feeble strength. All degree of bonding between two overlapping sub-tapes is approximately the same. Since the bonding is feeble, an outermost layer 156a being a sub-tape in an outermost layer can be easily peeled off from an overlapping sub-tape without damaging the sub-tape.

Note that the bonding strength between two overlapping sub-tapes may be sufficiently weaker than the adhesive strength of adhesives 259g and 259i illustrated in FIG. 11 and an adhesive 259a illustrated in FIG. 14 described later.

For example, as described later, when another tape is bonded to a surface in a vicinity of an end portion 921a or 152b of the outermost layer 156a by an adhesive and then the tape is pulled, peeling occurs between the outermost layer 156a and a second sub-tape. The reason is that pulling the tape causes greater tensile stress closer to a surface of the third recovery tape 156.

Note that, as an adhesive applied between sub-tapes, an adhesive having weak adhesive strength may be selected from among adhesives on the market and be used. Further, for example, the methods disclosed in PTLs 3 and 4 may be used for further weakening adhesive strength.

Figure 7:
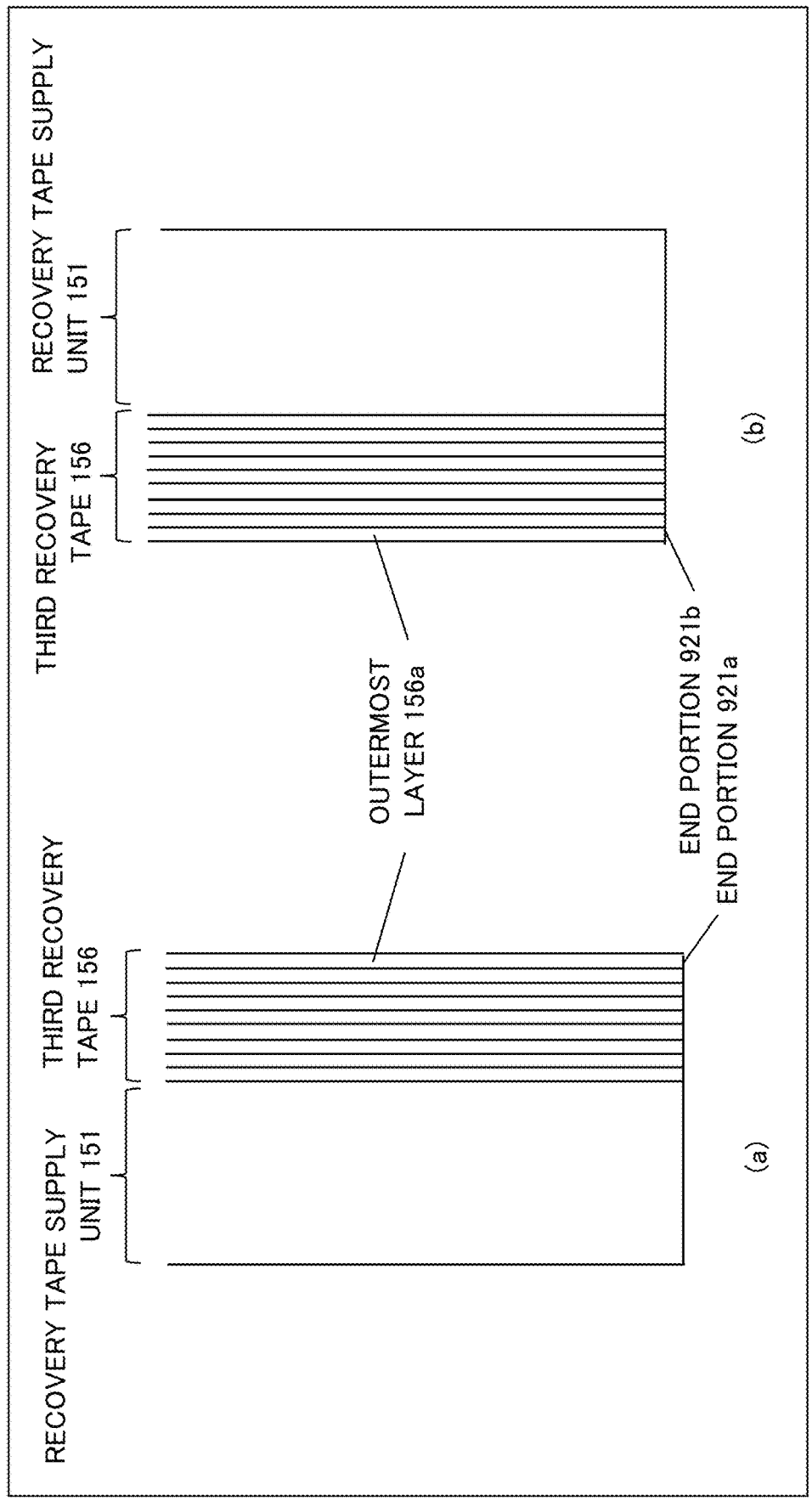
FIG. 7 is an enlarged view (cross-sectional view) of ranges 915a and 915b.

Note that an effect acquired by using a laminated tape as illustrated in FIG. 7 for the third recovery tape 156 will be described later in description of an operation.

Figure 8:
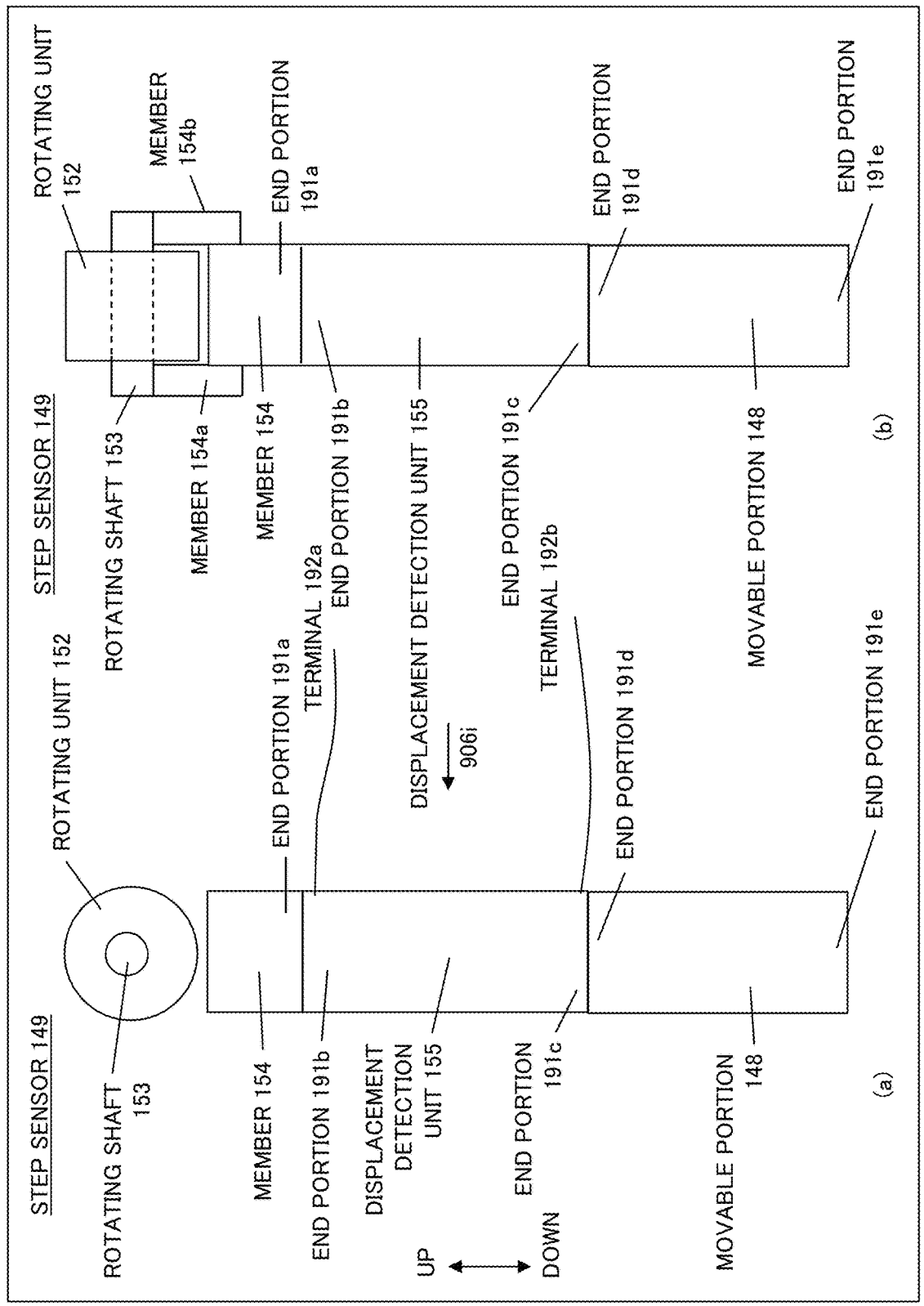
FIG. 8 is a schematic diagram illustrating a configuration example of a step sensor.

FIG. 8 is a schematic diagram illustrating a configuration example of the step sensor 149 illustrated in FIG. 6.

FIG. 8(a) is a cross-sectional view on an assumption that the step sensor 149 is cut in a cross section associated with a cross section illustrated in FIG. 6. Further, FIG. 8(b) is a side view on an assumption that the step sensor 149 is viewed from a direction of an arrow 906i illustrated in FIG. 8(a).

The step sensor 149 includes a movable portion 148, a displacement detection unit 155, members 154, 154a, and 154b, a rotating shaft 153, and a rotating unit 152.

The rotating unit 152 can rotate about the rotating shaft 153 fixed to the member 154 by the members 154a and 154b.

Figure 18:
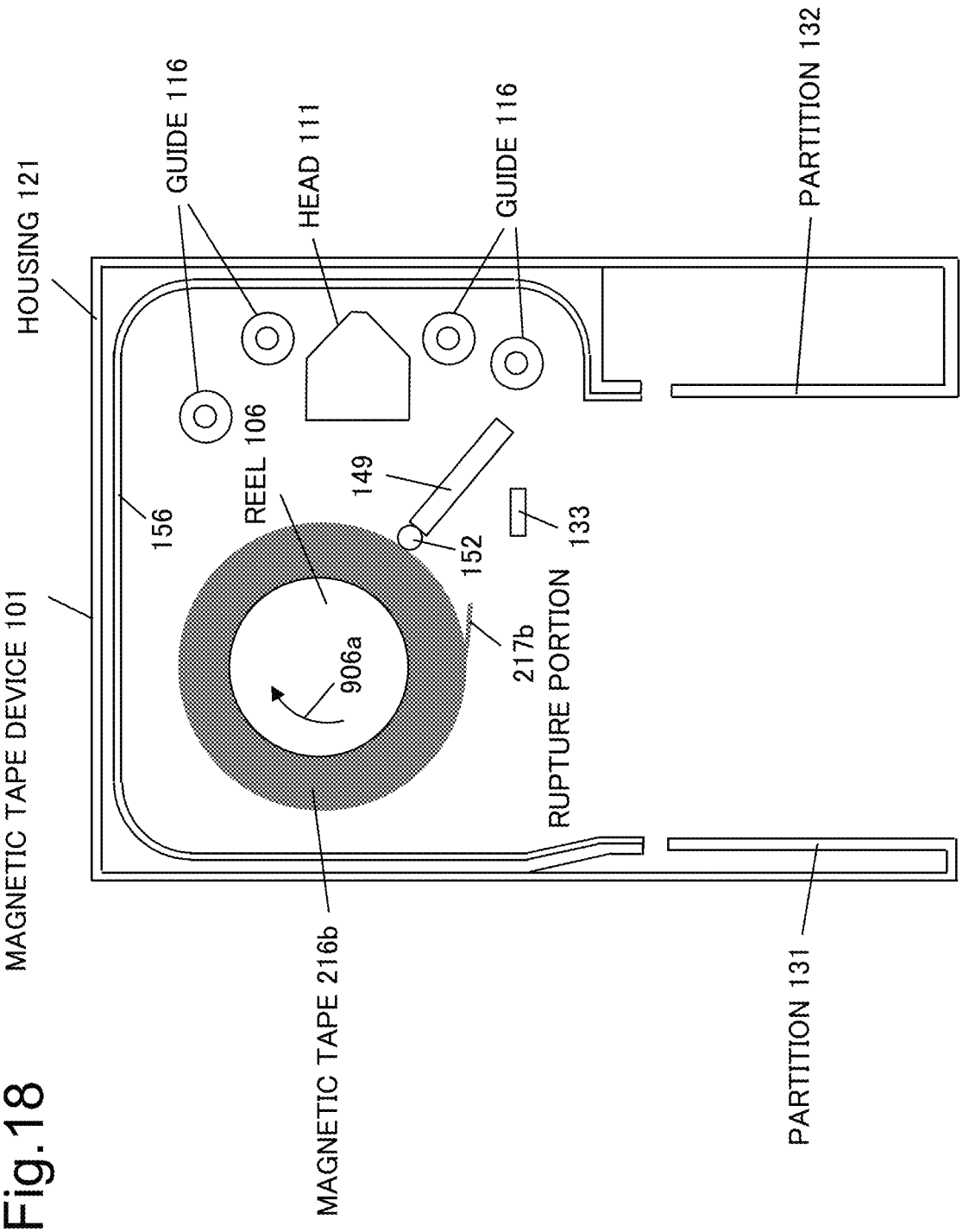
FIG. 18 is a schematic diagram illustrating a state where a tip of a rotating unit is in contact with a periphery of the magnetic tape.

As illustrated in FIG. 18 described later, a surface of the rotating unit 152 is a portion assumed to be rotated by rotation of the magnetic tape 216b due to rotation of the reel 106 by the surface of the rotating unit 152 being in contact with a surface of the cut magnetic tape 216b.

An end portion 191e of the movable portion 148 is fixed to a housing 121 illustrated in FIG. 6 or a member (not illustrated) fixed to the housing 121. A direction of the fixing is illustrated in FIG. 6.

The movable portion 148 can adjust a distance from the end portion 191e of an end portion 191d by a signal transmitted from a processing unit (not illustrated). The movable portion 148 can adjust, by an instruction from the control unit, a distance from the end portion 191e of the end portion 191d in such a way that the rotating unit 152 is in contact with the surface of the cut magnetic tape 216b as illustrated in FIG. 18 described later. A method of adjusting the distance by the movable portion 148 may be appropriately selected from a known technique. Thus, description thereof is omitted here.

When force is applied between an end portion 191b and an end portion 191c, the displacement detection unit 155 outputs a voltage according to magnitude of the force between terminals 192a and 192b. The displacement detection unit 155 has a configuration including a piezoelectric element, for example. The processing unit monitors an output voltage between the terminals 192a and 192b. It is assumed that, by rotation of the reel 106 in a direction of an arrow 906a illustrated in FIG. 6, the rotating unit 152 passes through a step of one magnetic tape generated by the rupture portion 217b illustrated in FIG. 18 described later. In this case, the processing unit detects an output between the terminals 192a and 192b according to force applied between the end portions 191b and 191c by the step.

The magnetic tape 216b illustrated in FIG. 18 described later is rotated in the direction of the arrow 906a while the rotating unit 152 of the step sensor 149 is in contact with the magnetic tape 216b, and thus floating of the magnetic tape 216b is also held down. The step sensor 149 also functions as a plunger that holds floating of the magnetic tape 216b down.

Figure 9:
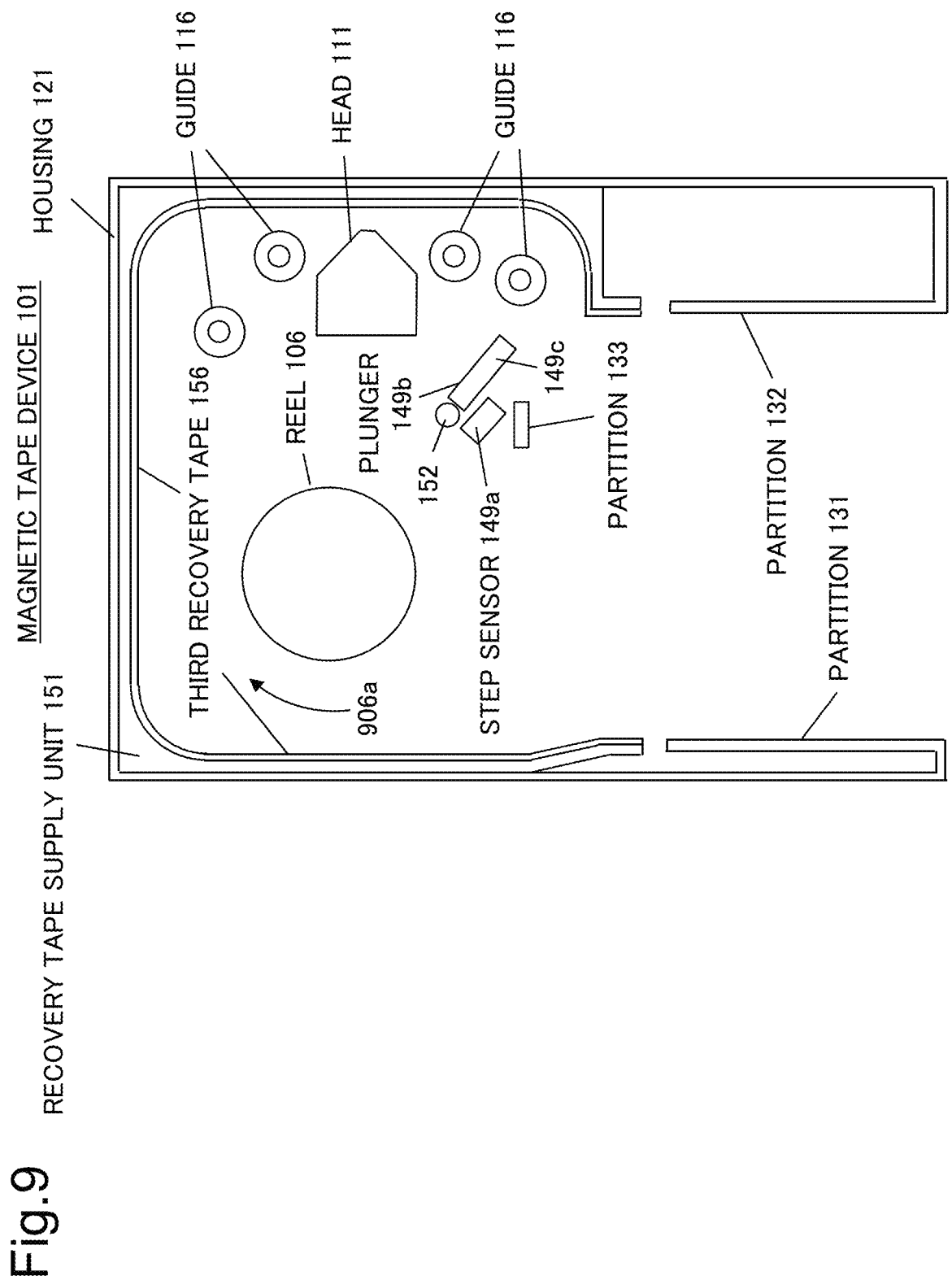
FIG. 9 is a schematic diagram illustrating a configuration example of a magnetic tape device using an optical displacement meter as a step sensor.

Note that a combination of a step sensor 149a and a plunger 149b illustrated in FIG. 9 can also be used instead of the step sensor 149 illustrated in FIG. 8.

In this case, the plunger 149b extends a shaft portion 149c, based on instruction information from a processing unit (not illustrated), and brings the rotating unit 152 into contact with the magnetic tape 216b. The shaft portion 149c has a configuration similar to that of the movable portion 148 illustrated in FIG. 8, and performs a similar operation. Subsequently, the reel 106 rotates by an instruction from the processing unit, and thus floating of the magnetic tape 216b is suppressed.

The step sensor 149a is an optical displacement meter. The step sensor 149a irradiates the surface of the magnetic tape 216b with measurement light while the magnetic tape 216b rotates in the direction of the arrow 906a, and measures a distance from a reflection surface by reflected light. The step sensor 149a transmits an output according to the distance to a processing unit (not illustrated). The processing unit detects a rotational position of a step representing a rupture portion of the magnetic tape 216b from a change in the output.

Figure 10:
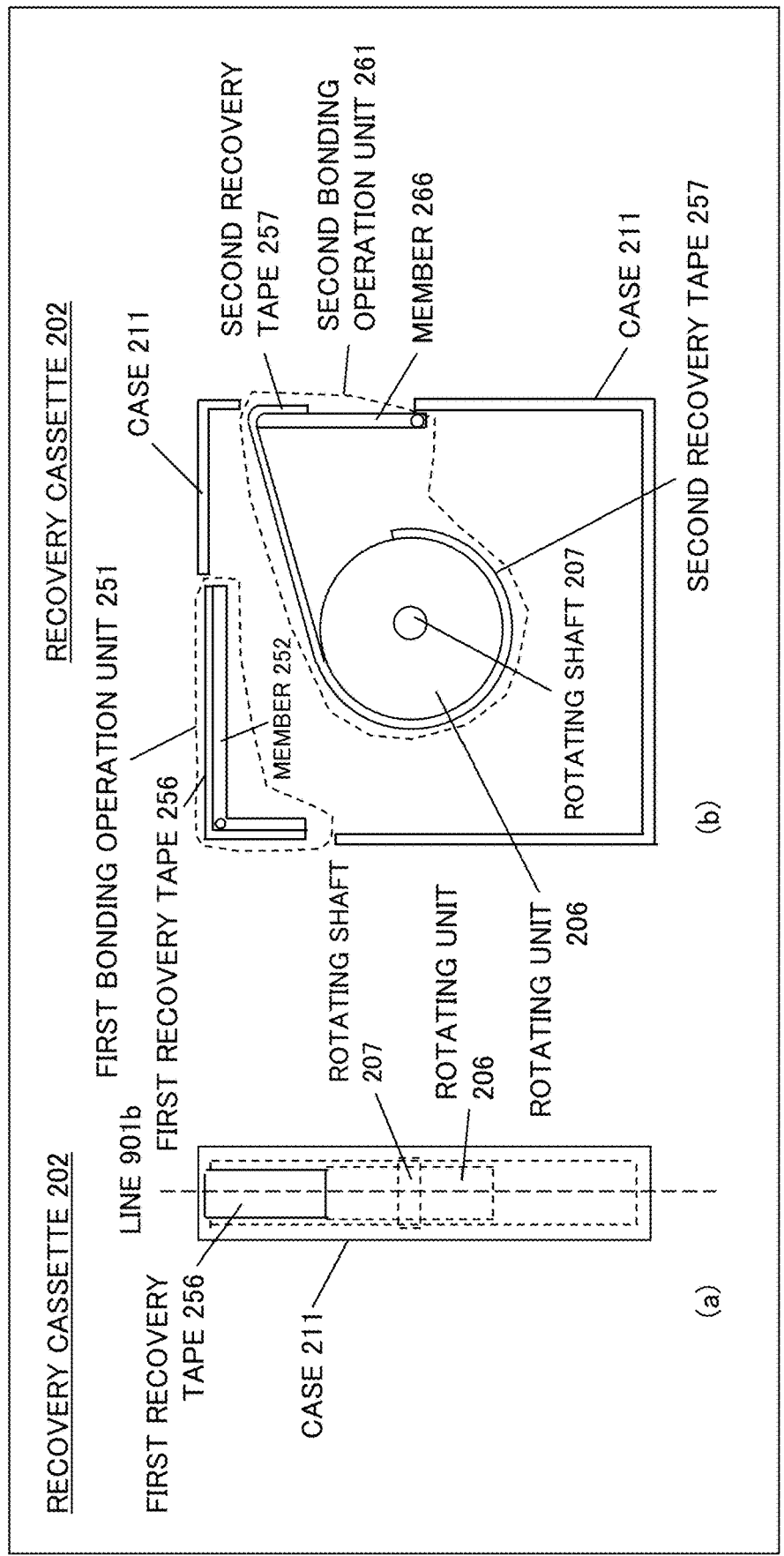
FIG. 10 is a schematic diagram illustrating a configuration example of a recovery cassette according to the present example embodiment.

FIG. 10 is a schematic diagram illustrating a configuration of the recovery cassette 202 that is mounted on the magnetic tape device 101 illustrated in FIG. 6(b), and performs recovery of the magnetic tape remaining in the magnetic tape device 101 due to a tape cut. FIG. 10(a) is a side view of the recovery cassette 202. FIG. 10(b) is a cross-sectional view assumed when the recovery cassette 202 is cut at a line 901b illustrated in FIG. 10(a).

The recovery cassette 202 includes a case 211, a first bonding operation unit 251 and a second bonding operation unit 261.

The first bonding operation unit 251 includes a member 252 and a first recovery tape 256. The first recovery tape 256 illustrated in FIG. 10(b) is a cross section of the first recovery tape 256. An actual thickness of the cross section is normally thinner than an illustrated thickness, but the illustrated thickness is displayed thicker in such a way as to be easier to see in FIG. 10(b) and the following drawings. A detailed configuration of the first bonding operation unit 251 will be described later with reference to FIGS. 11 to 13. Further, a bonding operation by the first bonding operation unit 251 will be described later with reference to FIGS. 22 to 25.

The second bonding operation unit 261 includes a rotating shaft 207, a rotating unit 206, a member 266, and a second recovery tape 257. The second recovery tape 257 illustrated in FIG. 10(b) is a cross section of the second recovery tape 257. An actual thickness of the cross section is normally thinner than an illustrated thickness, but the illustrated thickness is displayed thicker in such a way as to be easier to see in FIG. 10(b) and the following drawings. A detailed configuration of the second bonding operation unit 261 will be described later with reference to FIG. 14. Further, a bonding operation by the second bonding operation unit 261 will be described later with reference to FIGS. 27 to 29.

Figure 11:
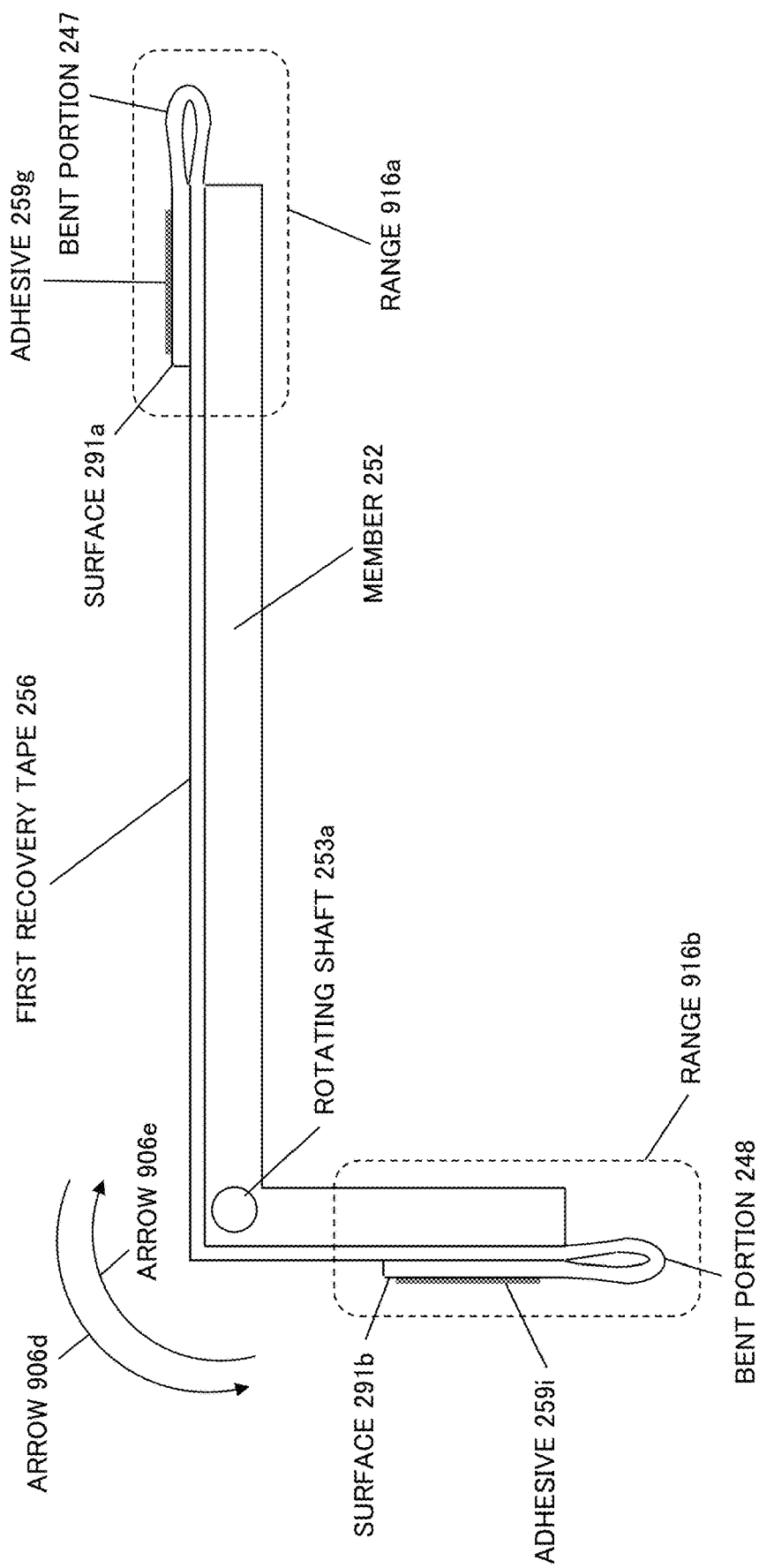
FIG. 11 is an enlarged view of a first bonding operation unit.

FIG. 11 is an enlarged view of the first bonding operation unit 251 illustrated in FIG. 10.

The first bonding operation unit 251 includes the member 252 and a rotating shaft 253a. The first recovery tape 256 is installed on an upper surface and a left side surface of the member 252. Although not illustrated, the width of the first recovery tape 256 is approximately the same as the width of the magnetic tape 216 illustrated in FIG. 2.

The first recovery tape and the member 252 are bonded together with an adhesive (a weak adhesive) (not illustrated) having weak adhesive strength. Since the adhesive strength is weak, the first recovery tape 256 can be easily peeled off from the member 252.

A portion of the first recovery tape 256 in a range 916a has a bent structure. The adhesive 259g is provided on a surface 291a of the first recovery tape 256. The adhesive strength of the adhesive 259g is sufficiently greater than the adhesive strength of the weak adhesive described above. A configuration in the range 916a will be described below in detail with reference to FIG. 13.

A portion of the first recovery tape 256 in a range 916b also has a bent structure. The adhesive 259i is provided on a surface 291b of the first recovery tape 256. The adhesive strength of the adhesive 259i is sufficiently greater than the adhesive strength of the weak adhesive described above. A configuration in the range 916b will be described below in detail with reference to FIG. 13.

The rotating shaft 253a is fixed to the case 211 illustrated in FIG. 10 or a member (not illustrated) fixed to the case 211. The member 252 rotates by a predetermined angle in each of directions of arrows 906e and 906d by driving by a drive unit (not illustrated) while the first recovery tape 256 is installed. A configuration of the drive unit can be appropriately selected from a known method. Thus, description thereof is omitted here. Note that it is assumed that the recovery cassette 202 illustrated in FIG. 10 includes a power source (not illustrated) for driving the drive unit.

Figure 12:
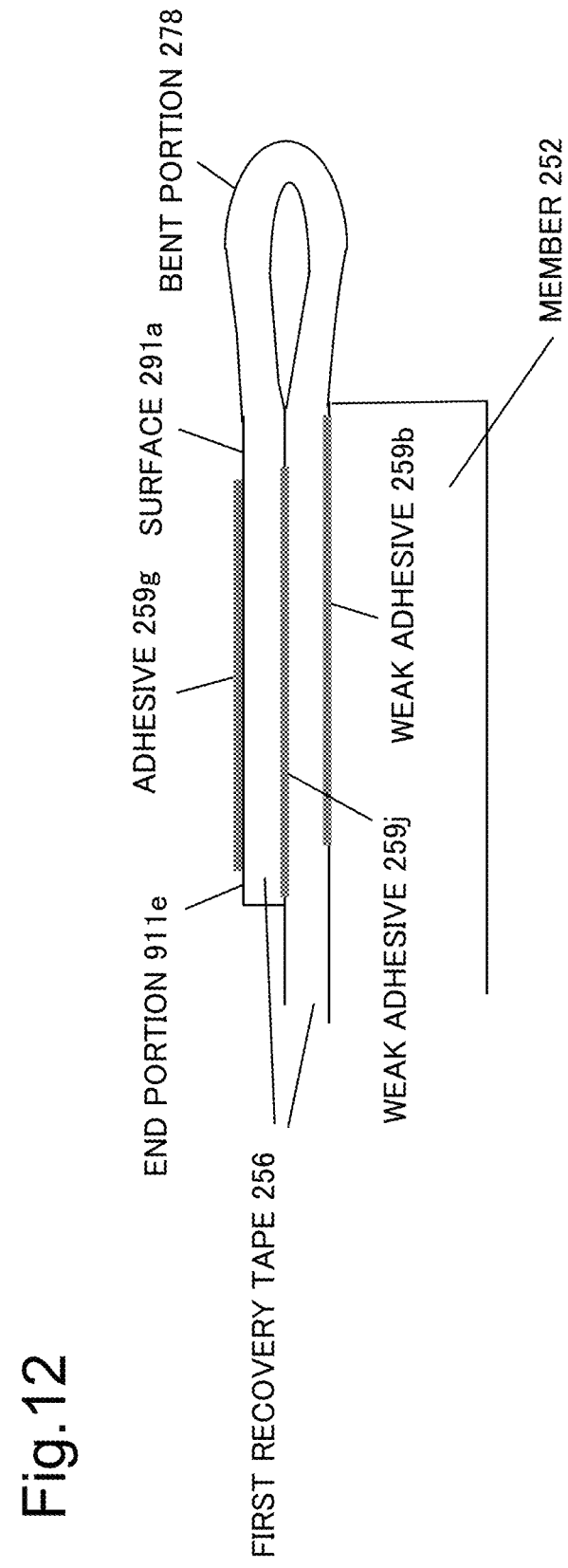

FIG. 12 is an enlarged view illustrating a configuration in the range 916a illustrated in FIG. 11.

The first recovery tape 256 is bent into two at a bent portion 278. A part of the bent first recovery tape 256 between the bent portion 278 and an end portion 911e is bonded to a surface facing the first recovery tape 256 by a weak adhesive 259j. The adhesive strength of a weak adhesive 259c is sufficient for maintaining a bent shape of the first recovery tape 256 as illustrated in FIG. 12 when no external force is applied. However, the adhesive strength of the weak adhesive 259j is weak enough for an adhering portion to be easily peeled due to predetermined external force.

As the weak adhesive 259j, an adhesive having weak adhesive strength may be selected from among adhesives on the market and be used. Further, for example, the methods disclosed in PTLs 3 and 4 may be used for further weakening adhesive strength. The points also apply to another weak adhesive described below.

The first recovery tape 256 is bonded to the member 252 by a weak adhesive 259b while being bent as mentioned above. The adhesive strength of the weak adhesive 259b is weak enough for an adhering portion of the first recovery tape 256 to be easily peeled off from the member 252 due to predetermined external force.

As also disclosed in PTL 3, a method of forming an adhesive on an object includes a method performed by application of an adhesive dissolved in a solvent to an object and transpiration of a solvent.

The adhesive 259g is provided on the surface 291a of the first recovery tape 256. The adhesive strength of the adhesive 259g is sufficiently greater than the adhesive strength of each of the weak adhesives 259b and 259j. Thus, for example, when another tape is bonded to the first recovery tape 256 by the adhesive 259g and the tape is pulled to the left, peeling occurs in a bonding portion by the weak adhesives 259b and 259j before peeling occurs in a bonding portion by the adhesive 259g.

Figure 13:
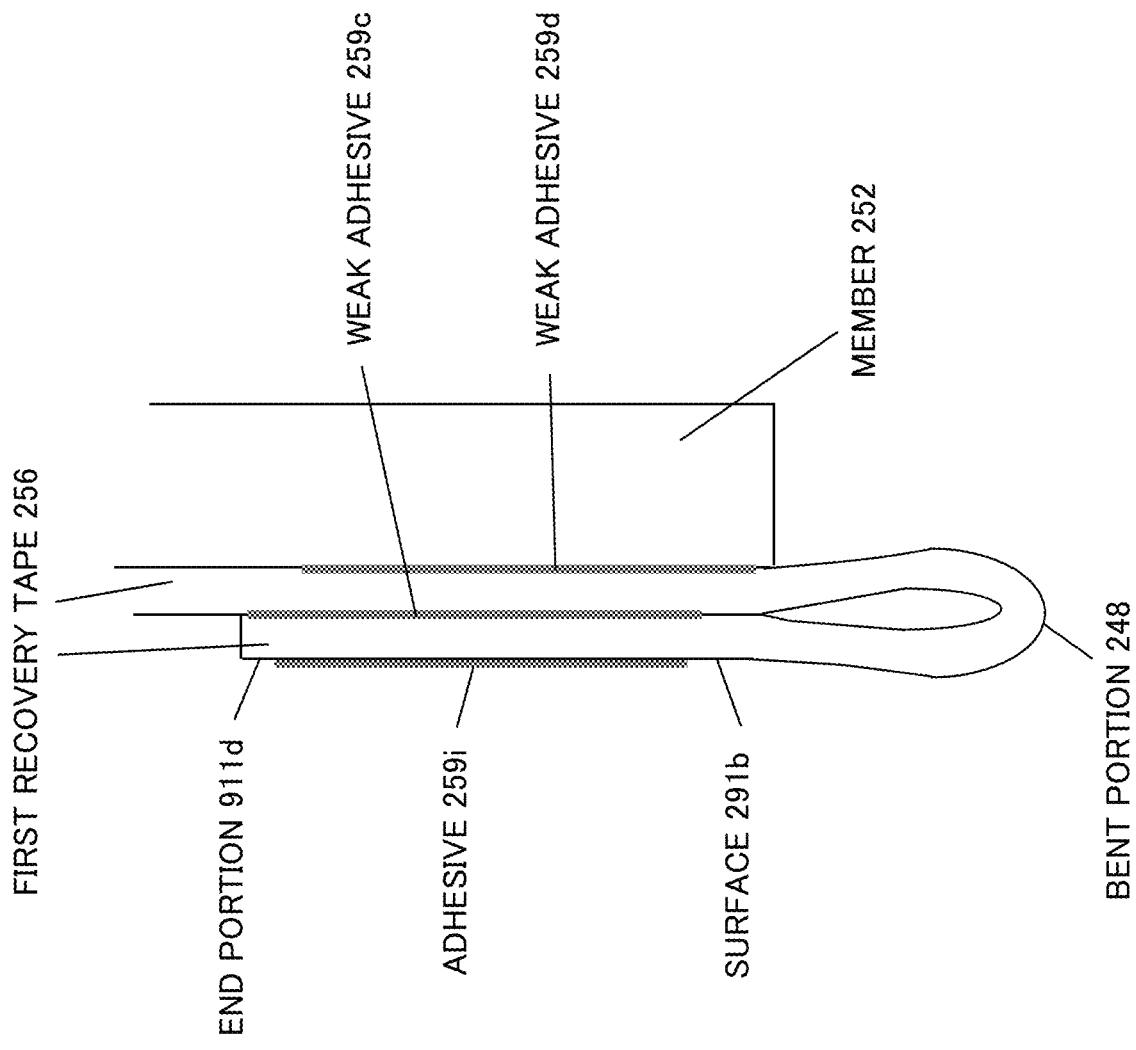
FIG. 13 is an enlarged view illustrating a configuration in a range 916b.

FIG. 13 is an enlarged view illustrating a configuration in the range 916b illustrated in FIG. 11.

The first recovery tape 256 is bent into two at a bent portion 248. A part of the bent first recovery tape 256 between the bent portion 248 and an end portion 911d is bonded to a surface facing the first recovery tape 256 by the weak adhesive 259c. The adhesive strength of the weak adhesive 259c is sufficient for maintaining a bent shape of the first recovery tape 256 as illustrated in FIG. 13 when no external force is applied. However, the adhesive strength of the weak adhesive 259c is weak enough for an adhering portion to be easily peeled due to predetermined external force.

The first recovery tape 256 is bonded to the member 252 by a weak adhesive 259d while being bent as mentioned above.

The adhesive 259i is provided on the surface 291b of the first recovery tape 256. The adhesive strength of the adhesive 259i is sufficiently greater than the adhesive strength of each of the weak adhesives 259c and 259d. Thus, for example, when another tape is bonded to the first recovery tape 256 by the adhesive 259i and the tape is pulled to the left, peeling occurs in a bonding portion by the weak adhesives 259c and 259d before peeling occurs in a bonding portion by the adhesive 259i.

Figure 14:
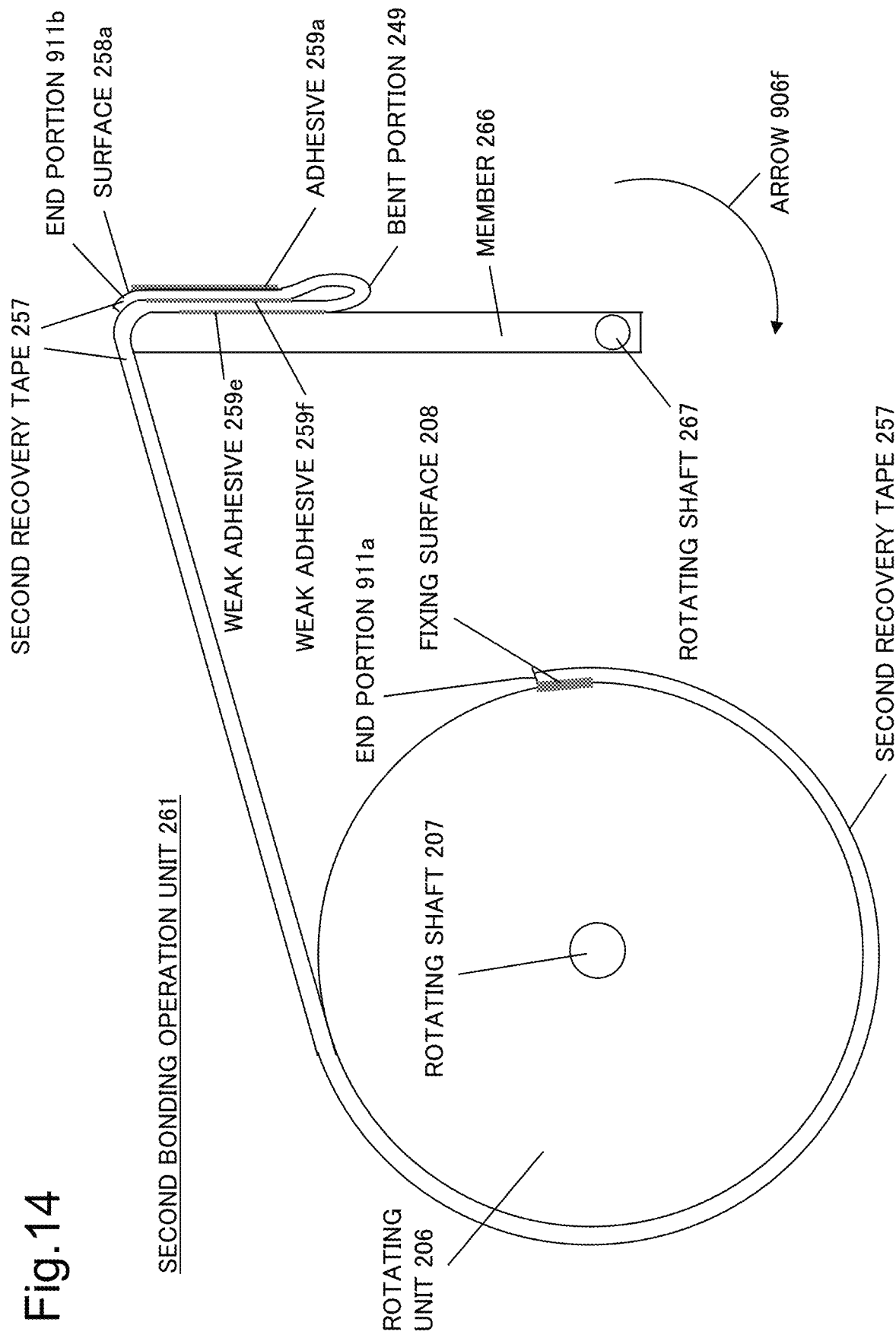
FIG. 14 is an enlarged view of a second bonding operation unit.

FIG. 14 is an enlarged view of the second bonding operation unit 261 illustrated in FIG. 10.

The second bonding operation unit 261 includes the rotating shaft 207, the rotating unit 206, the second recovery tape 257, a rotating shaft 267, and the member 266.

The rotating shaft 207 and the rotating unit 206 are the same as the rotating shaft 207 and the rotating unit 206 illustrated in FIG. 2, for example.

A vicinity of an end portion 911a of the second recovery tape 257 is fixed to a fixing surface 208 of the rotating unit 206.

The second recovery tape 257 in a predetermined range from the end portion 911a is wound around the rotating unit 206.

A vicinity of an end portion 911b of the second recovery tape 257 is bent into two at a bent portion 249. A part of the end portion 911b of the second recovery tape 257 between the bent portion 249 and the end portion 911b is bonded to a surface facing the second recovery tape 257 by a weak adhesive 259f. The adhesive strength of the weak adhesive 259f is sufficient for maintaining a bent shape of the second recovery tape 257 as illustrated in FIG. 14 when no external force is applied. However, the adhesive strength of the weak adhesive 259f is weak enough for an adhering portion to be easily peeled due to predetermined external force.

The second recovery tape 257 is bonded to the member 266 by a weak adhesive 259e while being bent as mentioned above. The adhesive strength of the weak adhesive 259e is weak enough for an adhering portion of the second recovery tape 257 to be easily peeled off from the member 266.

The adhesive 259a is provided on a surface 258a of the second recovery tape 257. The adhesive strength of the adhesive 259a is sufficiently greater than the adhesive strength of each of the weak adhesives 259e and 259f. Thus, for example, when another tape is bonded to the second recovery tape 257 by the adhesive 259a and the tape is pulled to the right, peeling occurs in a bonding portion by the weak adhesives 259*e* and 259*f* before peeling occurs in a bonding portion by the adhesive 259*a*.

The rotating shaft 267 is fixed to the case 211 illustrated in FIG. 10 or a member (not illustrated) fixed to the case 211. The member 266 rotates by a predetermined angle in a direction of an arrow 906*f* and an opposite direction thereof by driving by a drive unit (not illustrated) while the second recovery tape 257 is installed. A configuration of the drive unit can be appropriately selected from a known method. Thus, description thereof is omitted here. Note that it is assumed that the recovery cassette 202 illustrated in FIG. 10 includes a power source (not illustrated) for driving the drive unit.

Next, an operation of recovering a magnetic tape in a case where a tape cut occurs when the cassette 201 being the general cassette illustrated in FIG. 2 is mounted and the magnetic tape device 101 according to the present example embodiment illustrated in FIG. 6 is activated will be described.

Figure 15:
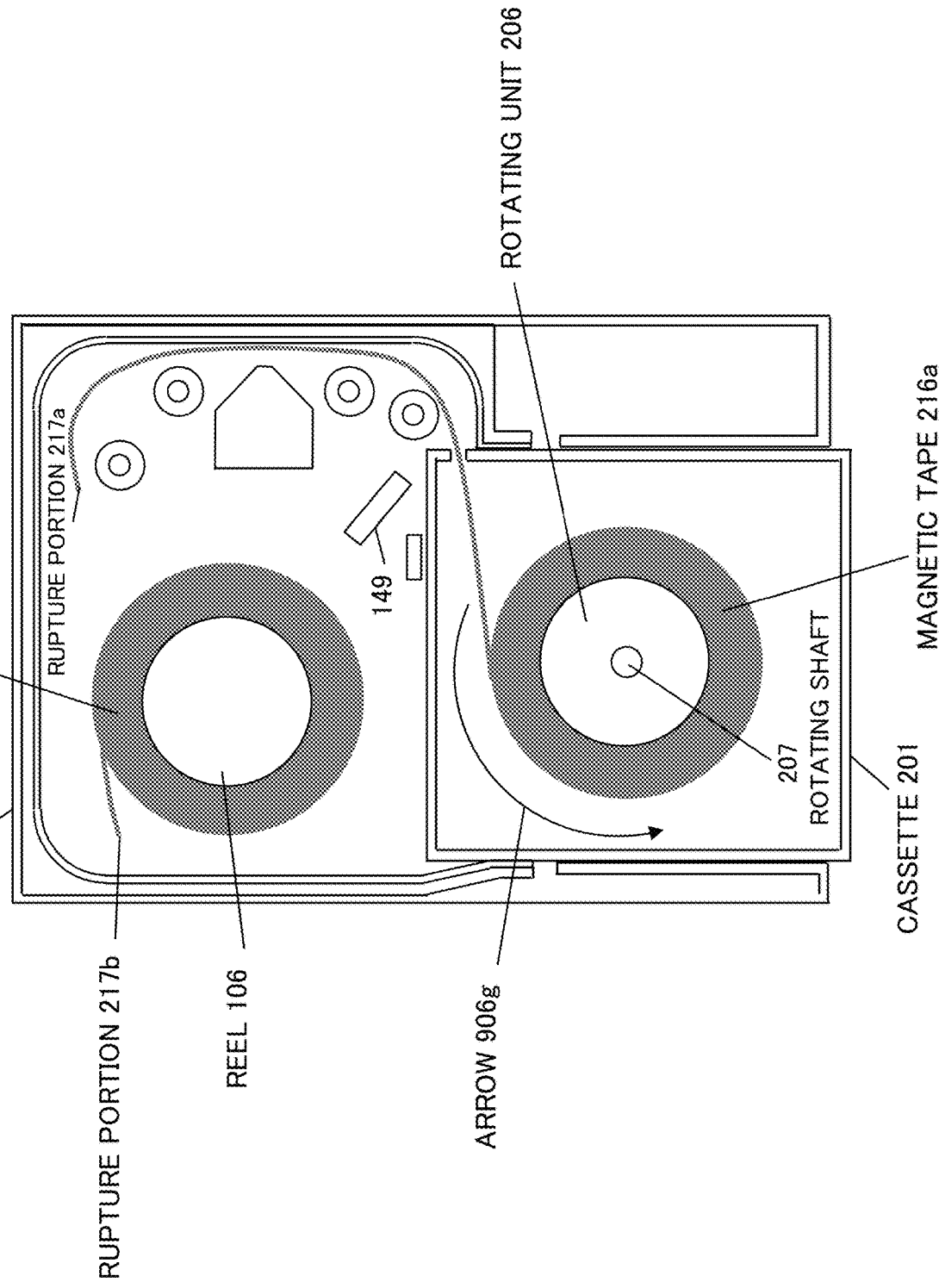
FIG. 15 is a schematic diagram illustrating a state where a tape cut occurs when the cassette is mounted and the magnetic tape device is activated.

FIG. 15 is a schematic diagram illustrating a state where a tape cut occurs when the cassette 201 illustrated in FIG. 2 is mounted and the magnetic tape device 101 illustrated in FIG. 6 is activated.

A tape cut occurs in a magnetic tape between a rupture portion 217*a* and a rupture portion 217*b*. FIG. 15 illustrates, as the magnetic tape 216*b*, the magnetic tape wound around the reel 106 and stored in the magnetic tape device 101 at this time. The magnetic tape 216*a* illustrated in FIG. 15 is a magnetic tape other than the magnetic tape 216*b*.

When a tape cut occurs as illustrated in FIG. 15, an operator first rotates the rotating unit 206 in a direction of an arrow 906*g* by the drive unit 127 illustrated in FIG. 1. In this way, a portion of the magnetic tape 216*a* exposed from the cassette 201 is stored inside the cassette 201.

Figure 16:
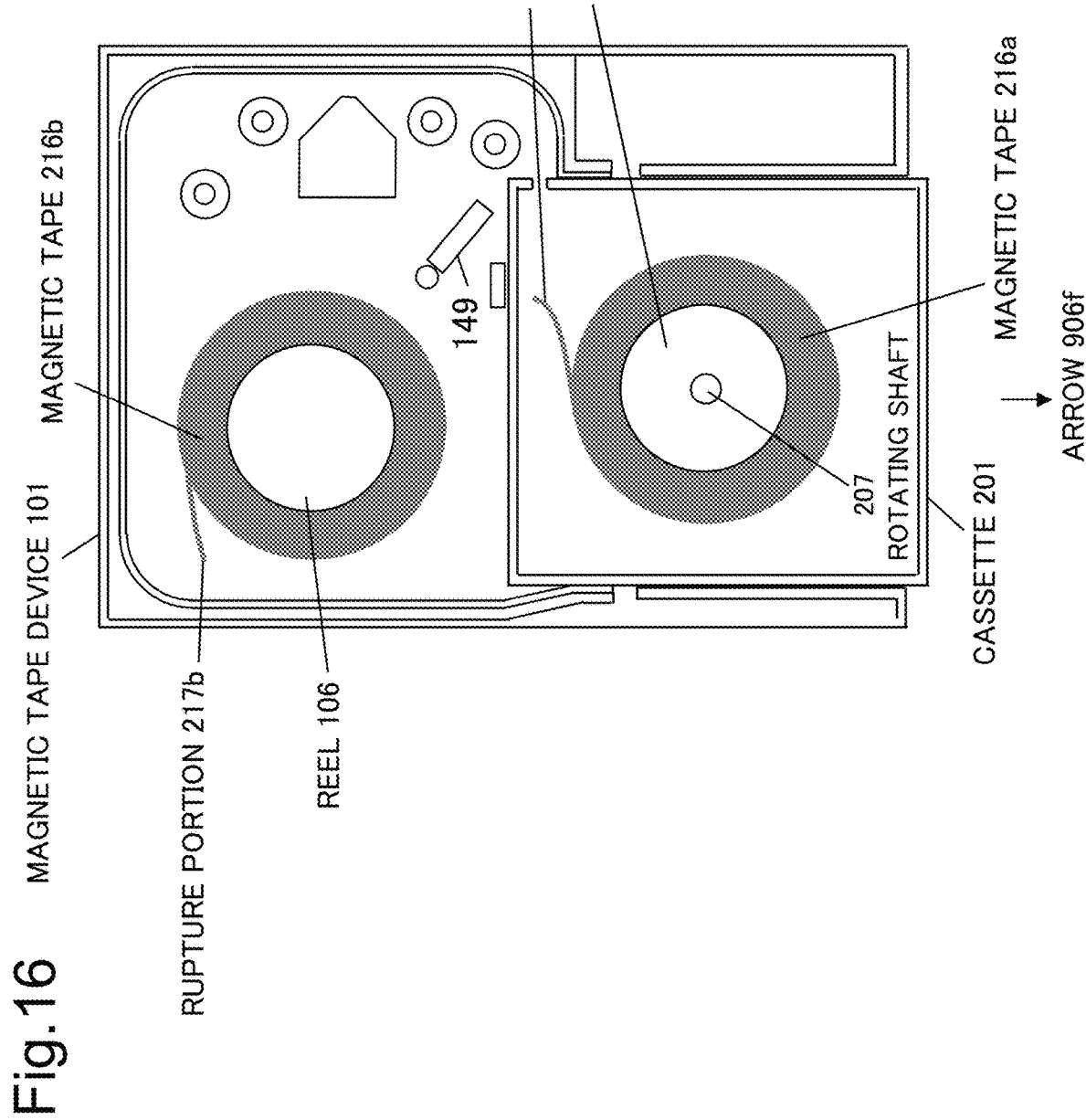
FIG. 16 is a diagram illustrating a state where the magnetic tape exposed from the cassette is stored inside the cassette.

FIG. 16 is a diagram illustrating a state where a portion of the magnetic tape 216*a* exposed from the cassette 201 is stored inside the cassette 201. Then, an operator takes out the cassette 201 in a direction of an arrow 906*f*.

Figure 17:
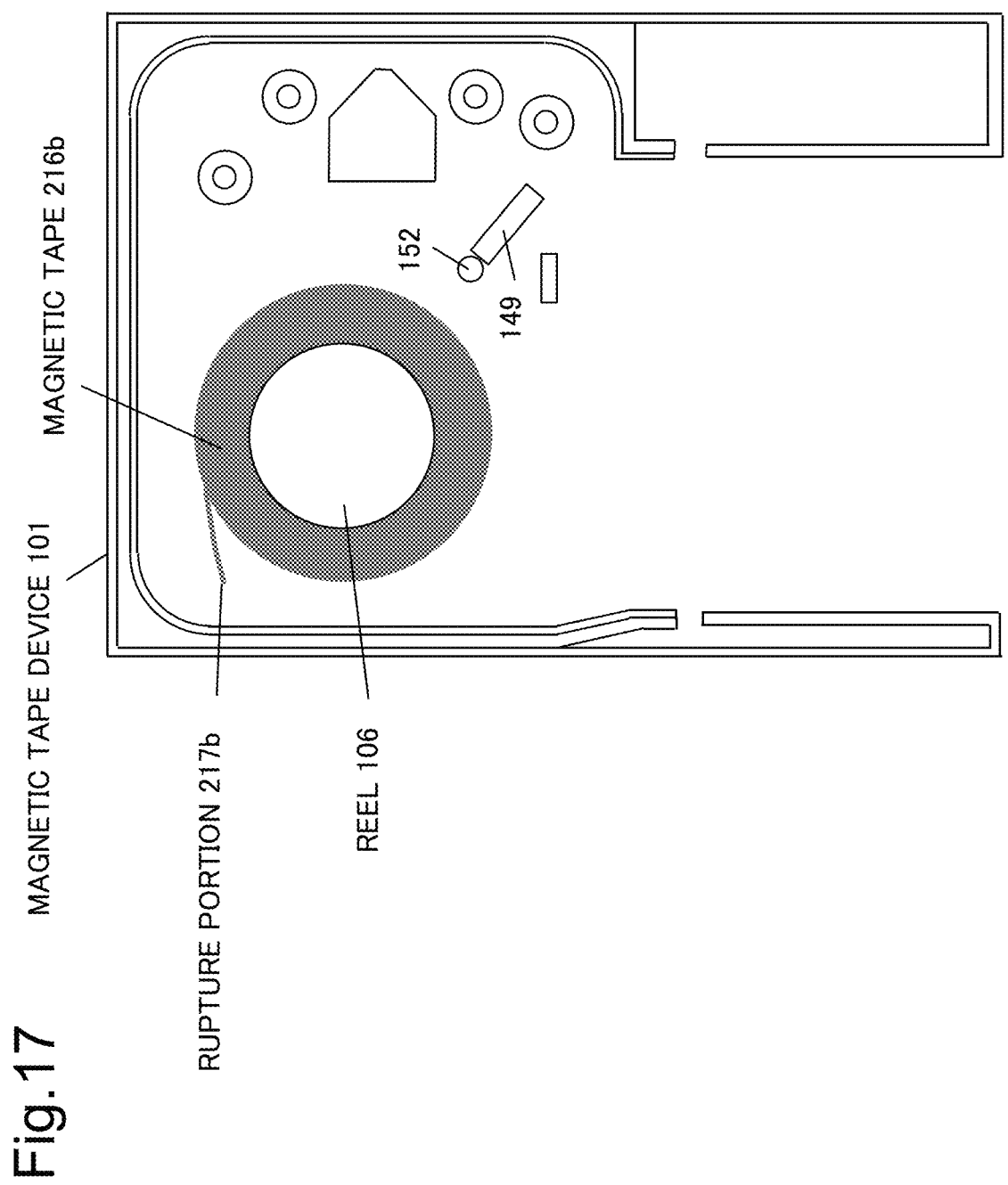
FIG. 17 is a schematic diagram illustrating the magnetic tape device from which the cassette is taken out.

FIG. 17 is a schematic diagram illustrating the magnetic tape device 101 from which the cassette 201 is taken out.

Next, an operator brings the rotating unit 152 of the step sensor 149 into contact with an outermost peripheral surface of the magnetic tape 216*b*.

The processing unit (not illustrated) of the magnetic tape device 101 transmits instruction information to the movable portion 148 illustrated in FIG. 8 by a button operation of an operator and the like, for example, and extends a distance between the end portions 191*d* and 191*e* of the movable portion 148. The processing unit successively monitors a voltage between the terminals 192*a* and 192*b* illustrated in FIG. 8(*a*). When a tip of the rotating unit 152 is in contact with the periphery of the magnetic tape 216*b*, a compressive force is applied between the end portion 191*b* and the end portion 191*c* illustrated in FIG. 8 of the displacement detection unit 155. Then, the displacement detection unit 155 outputs, between the terminals 192*a* and 192*b*, a voltage according to the compressive force. By the output, the processing unit stops the movable portion 148 from extending between the end portions 191*d* and 191*e*.

Subsequently, while the processing unit monitors an output between the terminals 192*a* and 192*b*, the processing unit causes the movable portion 148 to make a fine adjustment to a distance between the end portions 191*d* and 191*e*.

FIG. 18 is a schematic diagram illustrating a state where a tip of the rotating unit 152 is in contact with the periphery of the magnetic tape 216*b* by the above-mentioned operation.

Then, the processing unit causes the drive unit 126 illustrated in FIG. 1(*a*) to rotate the reel 106 in a direction of an arrow 906*a* illustrated in FIG. 18. In this way, the reel 106 rotates together with the magnetic tape 216*b* in the direction of the arrow 906*a*.

The processing unit also monitors a voltage between the terminals 192*a* and 192*b* illustrated in FIG. 8(*a*) during the rotation.

On the other hand, the drive unit 126 illustrated in FIG. 1 transmits information according to a rotational angle position of the reel 106 to the processing unit.

The processing unit derives, from information according to a rotational angle position of the reel 106 being transmitted from the drive unit 126 and an output between the terminals 192*a* and 192*b* illustrated in FIG. 8(*a*), a relationship between the rotational angle position of the reel 106 and the output between the terminals 192*a* and 192*b*.

Figure 19:
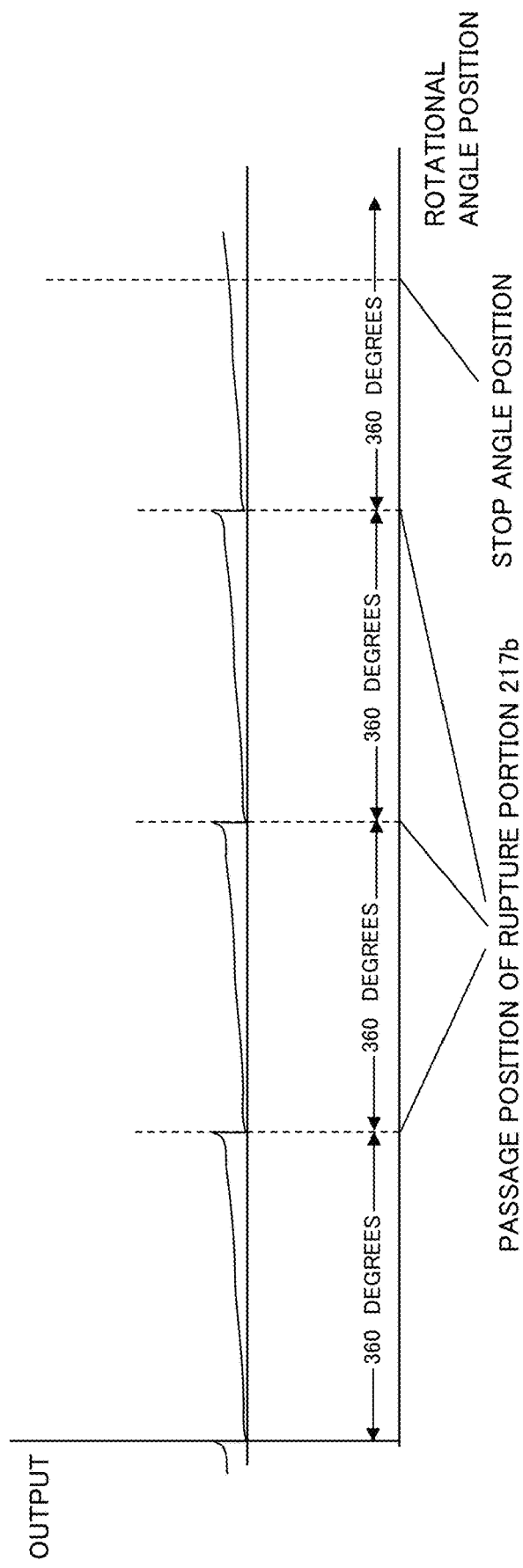
FIG. 19 is a diagram illustrating a relationship between a rotational angle position of a reel and an output from the step sensor.

FIG. 19 is an image diagram illustrating a relationship, which is derived by the processing unit, between a rotational angle position of the reel 106 and an output between the terminals 192*a* and 192*b*.

The output between the terminals 192*a* and 192*b* suddenly declines every 360 degrees. The decline is associated with relaxation of a compressive force applied to the end portions 191*b* and 191*c* of the displacement detection unit 155 illustrated in FIG. 8 when the rotating unit 152 illustrated in FIG. 18 passes through the rupture portion 217*b* rotating together with the reel 106.

Figure 22:
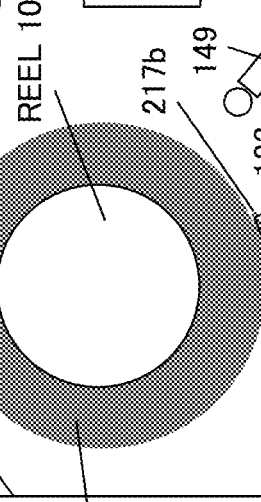
FIG. 22 is a schematic diagram illustrating a bonding operation (part 1) by the first bonding operation unit.

The processing unit causes the drive unit 126 illustrated in FIG. 1 to stop rotation of the reel 106 in a stop angle position being an angle position in which rotation of the reel 106 is stopped, from a relationship between a rotational angle position of the reel 106 and an output between the terminals 192*a* and 192*b*. The stop angle position is a position in which a bonding operation by the first bonding operation unit 251 described with reference to FIG. 22 is performed in an excellent manner on a vicinity of the rupture portion 217*b* of the magnetic tape 216*b*. Note that it is assumed that a reaching rotational angle being a rotational angle from a passage angle position being a rotational angle position in which passage of the rotating unit 152 through the rupture portion 217*b* is detected to a stop angle position is previously determined by a measurement and the like. The processing unit sets, as the stop angle position, an angle position acquired by adding the reaching rotational angle to a certain passage angle position.

Figure 20:
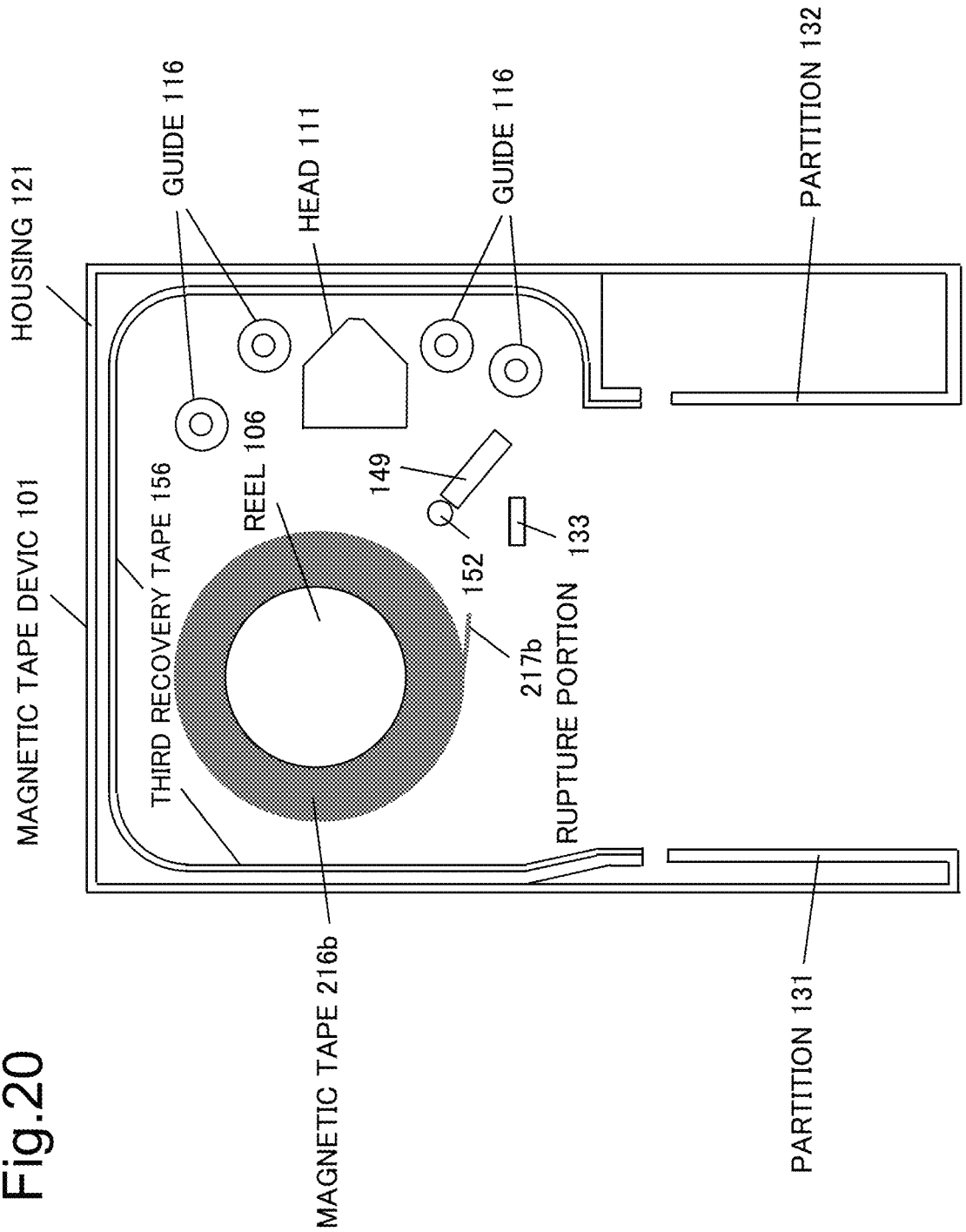
FIG. 20 is a schematic diagram illustrating a state where rotation of the reel is stopped at a stop angle position.

FIG. 20 is a schematic diagram illustrating a state where the processing unit stops rotation of the reel 106 at the stop angle position. In the state illustrated in FIG. 20, the processing unit also causes the step sensor 149 to return the rotating unit 152 to a position illustrated in FIG. 17.

Figure 21:
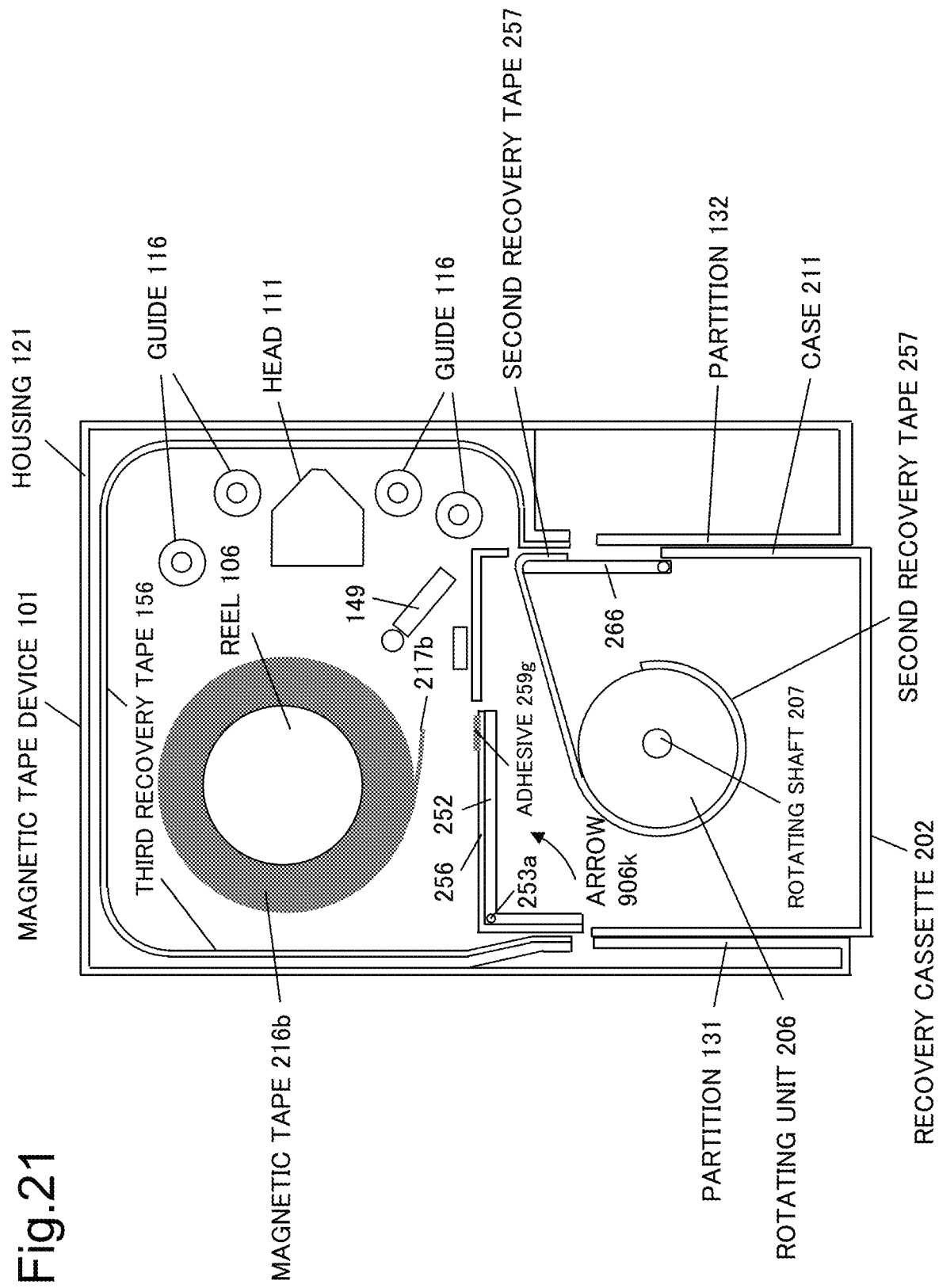
FIG. 21 is a schematic diagram illustrating a state immediately after the recovery cassette is inserted into the magnetic tape device.

Next, an operator inserts the recovery cassette 202 illustrated in FIG. 10 into the magnetic tape device 101. FIG. 21 is a schematic diagram illustrating a state immediately after the recovery cassette 202 illustrated in FIG. 10 is inserted into the magnetic tape device 101.

When the recovery cassette 202 is inserted into the magnetic tape device 101, the recovery cassette 202 performs a bonding operation described below. The recovery cassette 202 starts the bonding operation when, for example, a sensor (not illustrated) included in the recovery cassette 202 detects that the recovery cassette 202 is inserted into the magnetic tape device 101. The sensor is, for example, a contact sensor. In this case, it is assumed that the sensor detects that the recovery cassette 202 is in contact with a predetermined member of the magnetic tape device 101. Then, the sensor transmits a signal indicating that the recovery cassette 202 is inserted into the magnetic tape device 101 to a drive unit (hereinafter referred to as a "first bonding operation drive unit") (not illustrated) of the first bonding operation unit 251.

In response to the signal, the first bonding operation drive unit rotates the member 252 in a direction of an arrow 906$k$.

The first bonding operation drive unit stops the rotation when a portion of the member 252 provided with the adhesive 259$g$ contacts the magnetic tape 216$b$ as in FIG. 22. When the first bonding operation drive unit includes a motor, the first bonding operation drive unit can detect that the portion of the member 252 provided with the adhesive 259$g$ contacts the magnetic tape 216$b$ by detecting that a current flowing through the motor exceeds a threshold value.

Figure 23:
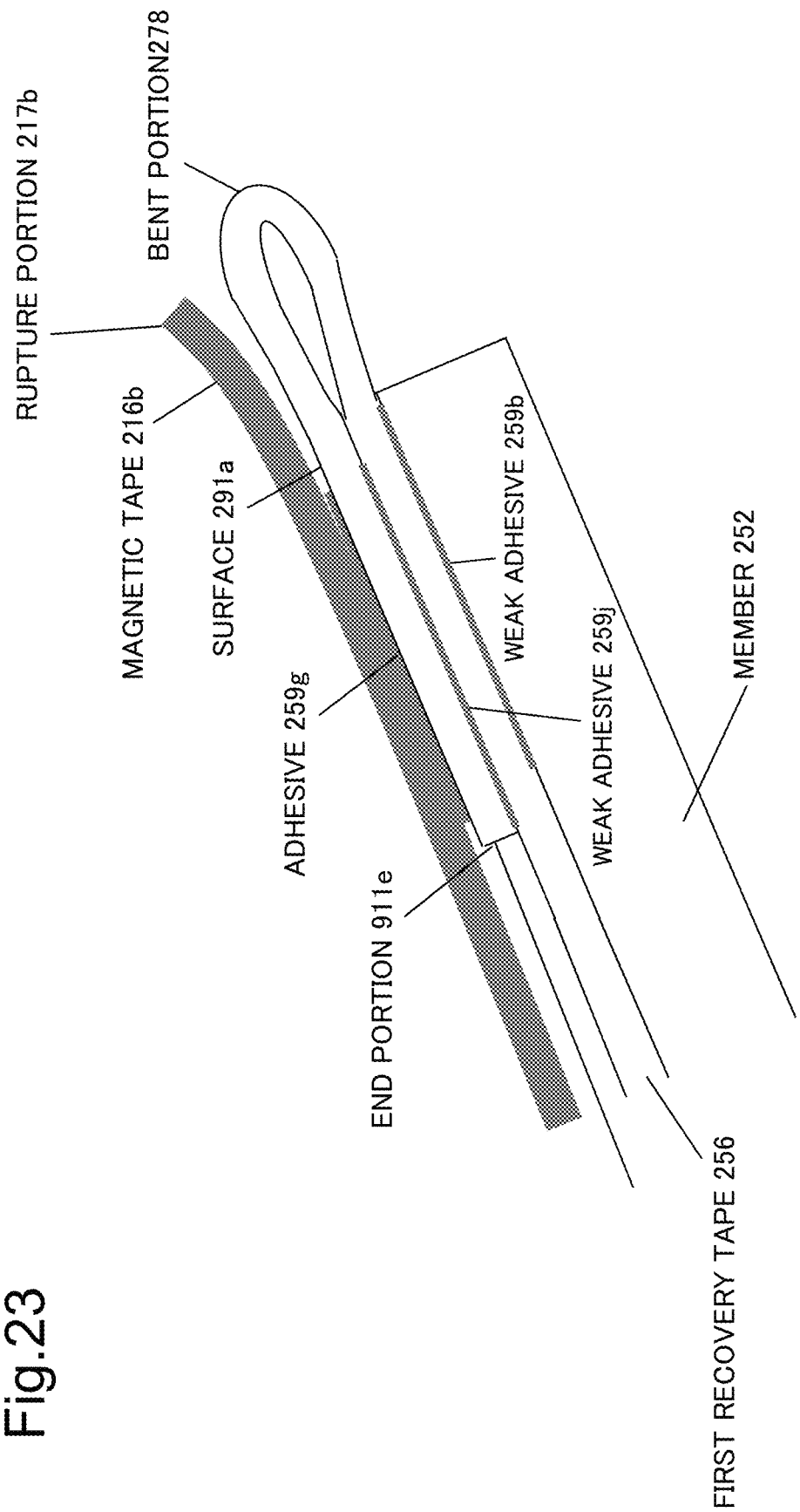
FIG. 23 is a schematic diagram illustrating a situation where a first recovery tape and the magnetic tape are bonded together.

The portion of the member 252 provided with the adhesive 259$g$ contacts the magnetic tape 216$b$, and thus a portion of the first recovery tape 256 on which the adhesive 259$g$ is formed is bonded to a vicinity of the rupture portion 217$b$ of the magnetic tape 216$b$. FIG. 23 is a schematic diagram illustrating a situation where the portion of the first recovery tape 256 on which the adhesive 259$g$ is formed is bonded to the vicinity of the rupture portion 217$b$ of the magnetic tape 216$b$.

Figure 24:
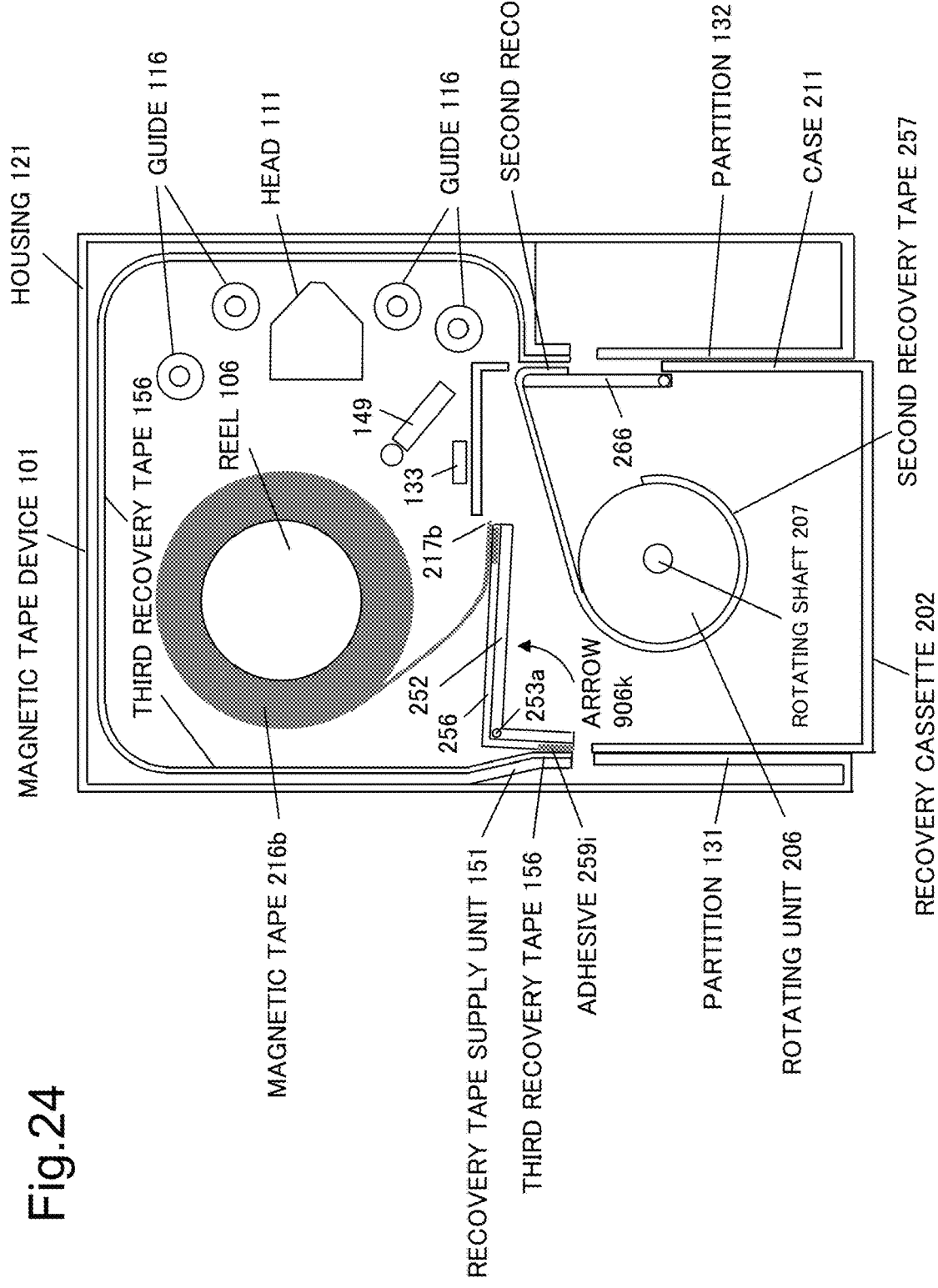
FIG. 24 is a schematic diagram illustrating a bonding operation (part 2) by the first bonding operation unit.

When the first bonding operation drive unit detects that the portion of the first recovery tape 256 provided with the adhesive 259$g$ contacts the magnetic tape 216$b$, the first bonding operation drive unit rotates the member 252 in an opposite direction of the arrow 906$k$. In this way, a portion of the member 252 on which the adhesive 259$i$ illustrated in FIG. 11 is formed contacts a portion, which faces a portion of the first recovery tape 256 on which the adhesive 259$i$ is formed, of the third recovery tape 156 installed on the recovery tape supply unit 151. FIG. 24 is a schematic diagram illustrating a state where the portion of the first recovery tape 256 on which the adhesive 259$i$ is formed contacts a portion of the third recovery tape 156 facing the portion of the member 252 on which the adhesive 259$i$ is formed.

The first bonding operation drive unit (not illustrated) stops the rotation when the portion of the first recovery tape 256 on which the adhesive 259$i$ is formed contacts the portion of the third recovery tape 156 facing the adhesive 259$i$. When the first bonding operation drive unit includes a motor, the first bonding operation drive unit can detect, from a drive current for driving the motor exceeding a threshold value, that the facing portion is contacted.

When the portion of the first recovery tape 256 on which the adhesive 259$i$ is formed contacts the portion of the third recovery tape 156 facing the adhesive 259$i$, the first recovery tape 256 and the third recovery tape 156 are bonded together by the adhesive 259$i$.

Figure 25:
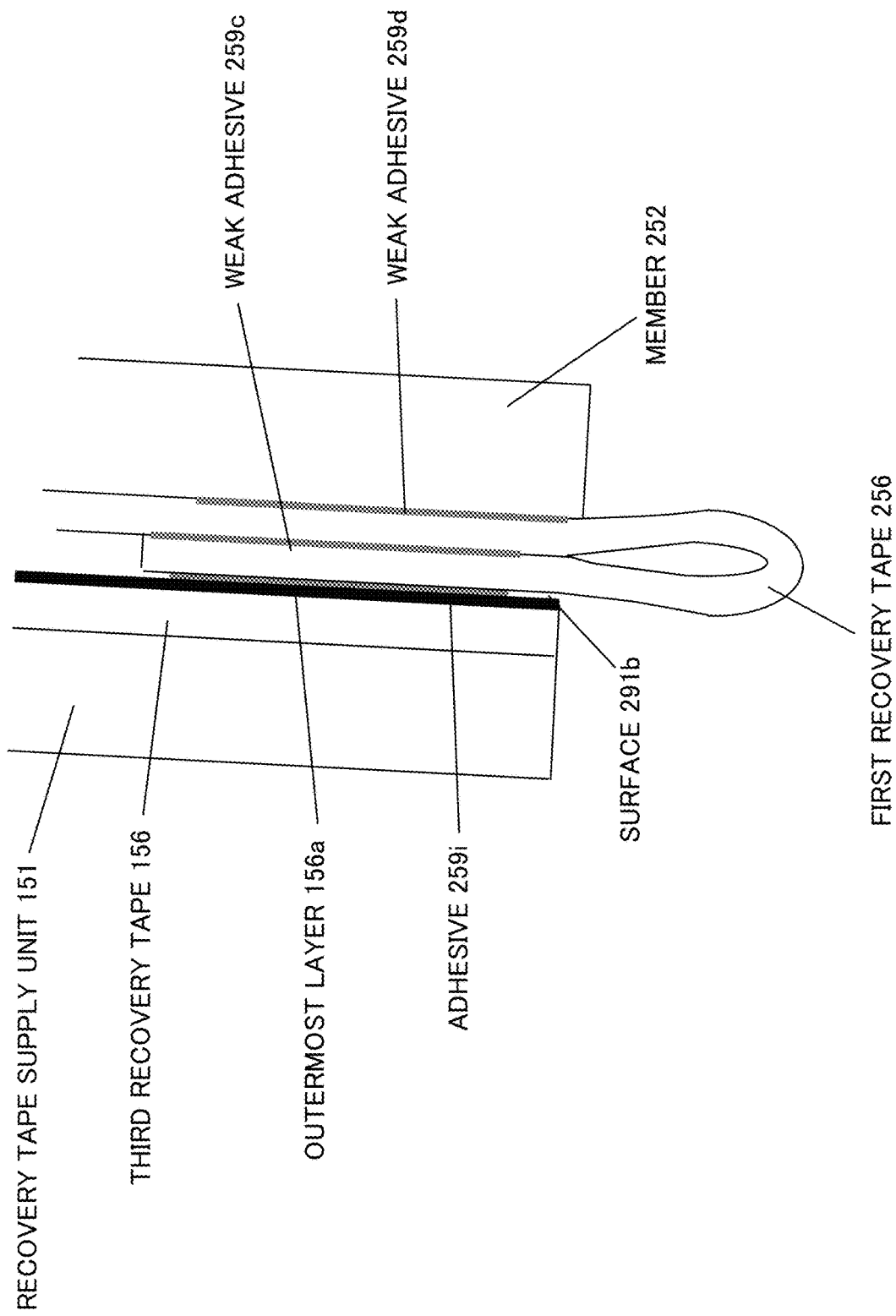
FIG. 25 is a schematic diagram illustrating a situation where the first recovery tape and a third recovery tape are bonded together.

FIG. 25 is a schematic diagram illustrating a situation where the first recovery tape 256 and the third recovery tape 156 are bonded together by the adhesive 259$i$.

The outermost layer 156$a$ (see FIG. 7) of the third recovery tape 156 provided on the recovery tape supply unit 151 is bonded to the surface 291$b$ of the first recovery tape 256 by the adhesive 259$i$.

Note that a shape of the member 252 is not limited to that illustrated in FIG. 11, and may be any shape as long as the above-described bonding operation with reference to FIGS. 22 to 25 can be achieved. Further, the first bonding operation unit may be divided into a portion that performs a bonding operation corresponding to the bonding operation illustrated in FIGS. 22 and 23 and a portion that performs a bonding operation corresponding to the bonding operation illustrated in FIGS. 24 and 25.

Figure 26:
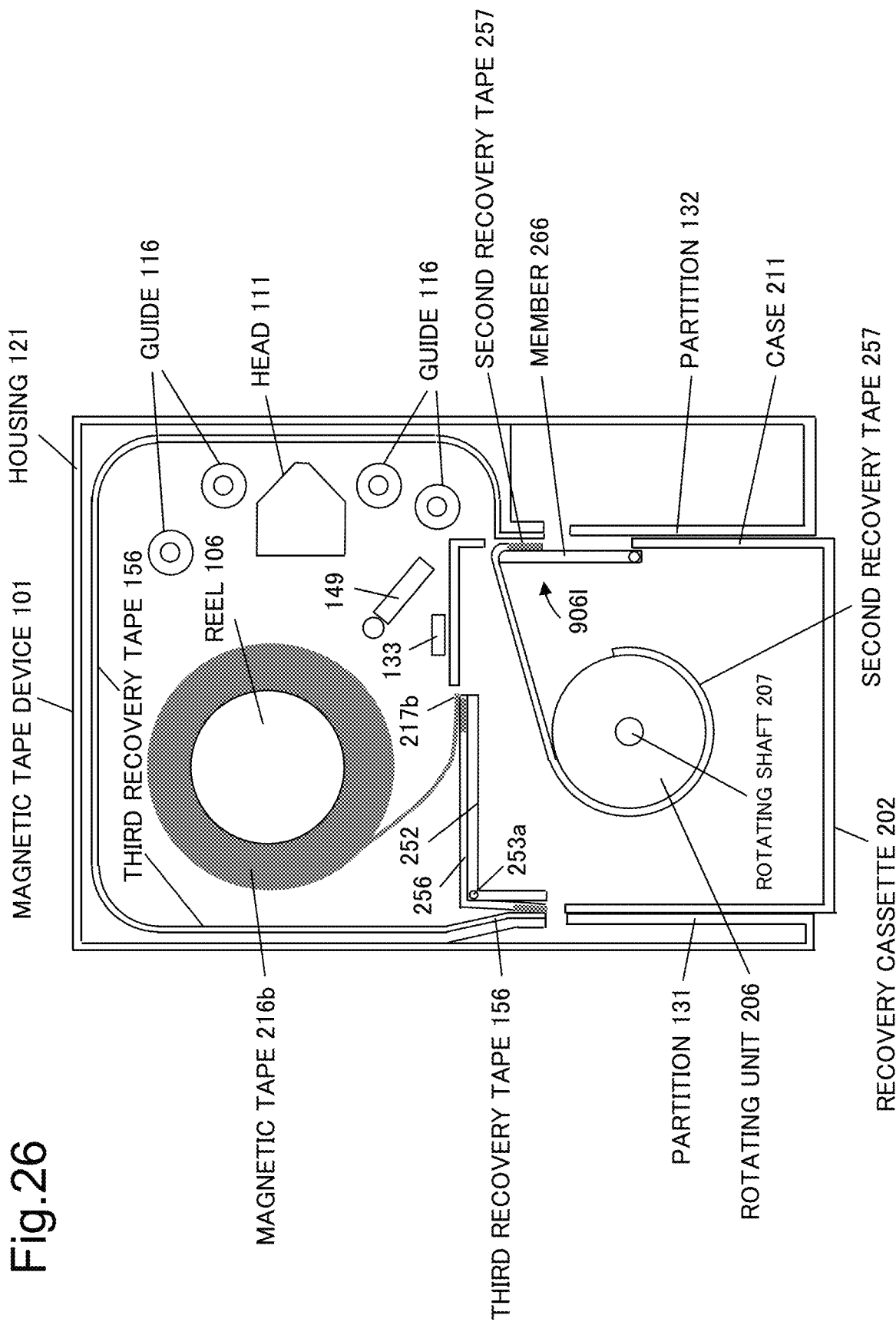
FIG. 26 is a schematic diagram illustrating a state where a rotational position of a member 252 returns to a rotational position illustrated in FIG. 21.

Then, it is assumed that the first bonding operation drive unit (not illustrated) detects that the portion of the first recovery tape 256 on which the adhesive 259$i$ is formed contacts the portion of the third recovery tape 156 facing the adhesive 259$i$. In this case, the first bonding operation drive unit returns a rotational position of the member 252 to the rotational position illustrated in FIG. 21 as illustrated in FIG. 26. In this way, the first recovery tape 256 is peeled off from the member 252.

The first bonding operation drive unit also transmits a notification signal to a second bonding operation drive unit (not illustrated). The second bonding operation drive unit is a drive unit that drives a rotation operation of the second bonding operation unit 261.

When the second bonding operation drive unit receives the notification signal, the second bonding operation drive unit rotates the member 266 in a direction of an arrow 906$l$ illustrated in FIG. 26.

Figure 27:
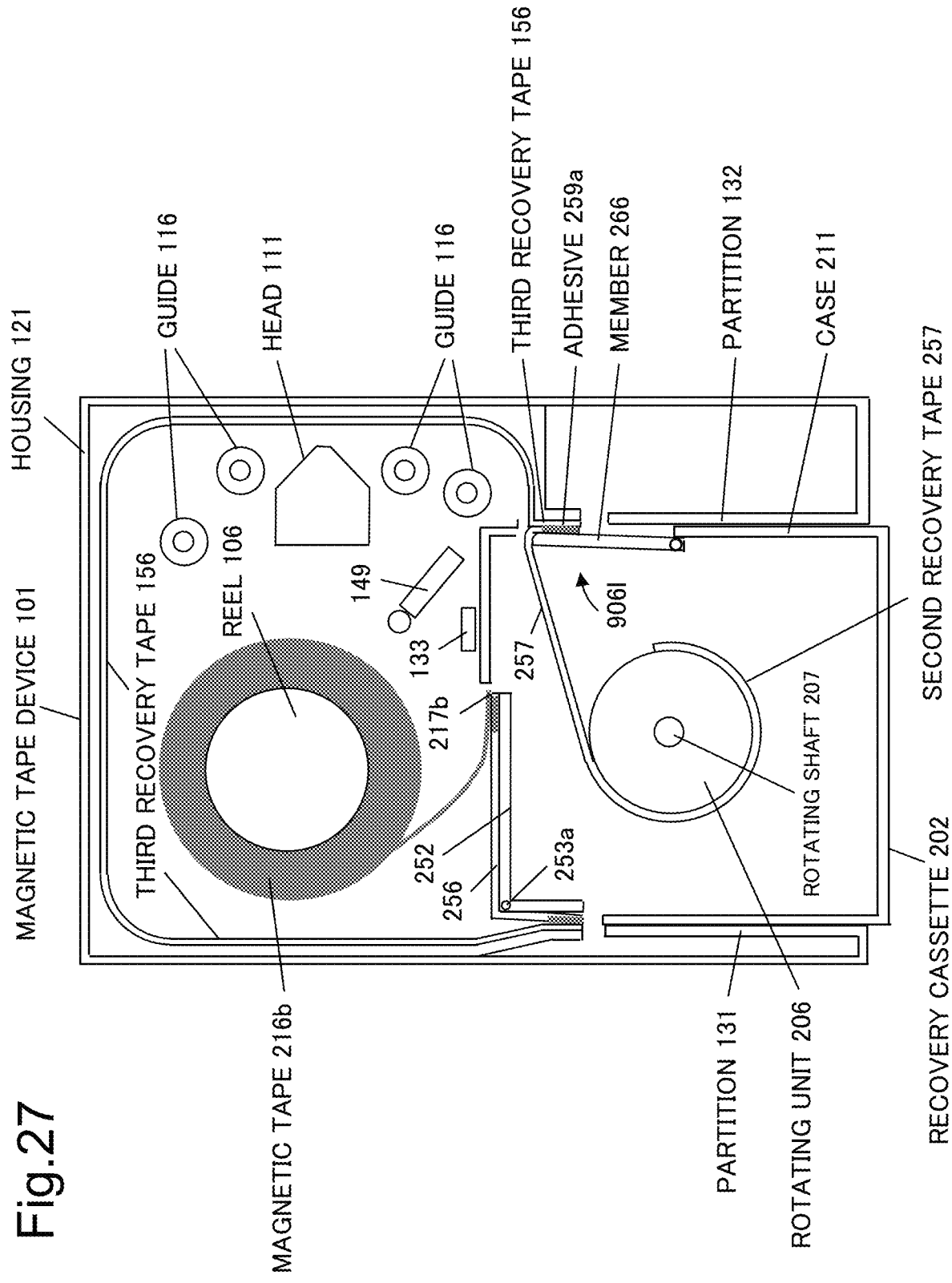
FIG. 27 is a schematic diagram illustrating a situation where a second recovery tape is bonded to the third recovery tape.

As illustrated in FIG. 27, by the operation, a portion (see FIG. 14) of the member 266 on which the adhesive 259$a$ is formed contacts a portion of the third recovery tape 156 facing the adhesive 259$a$.

Then, it is assumed that a portion of the second recovery tape 257 on which the adhesive 259$a$ is formed contacts the portion of the third recovery tape 156 facing the adhesive 259$a$. In this case, the second bonding operation drive unit (not illustrated) stops the rotation. When the second bonding operation drive unit includes a motor, the second bonding operation drive unit can detect, from a motor drive current exceeding a threshold value, that the portion of the second recovery tape 257 contacts the portion of the third recovery tape 156 facing the adhesive 259$a$.

Subsequently, the second bonding operation drive unit rotates the member 266 to a predetermined rotational position in an opposite direction of the arrow 906$l$.

Figure 28:
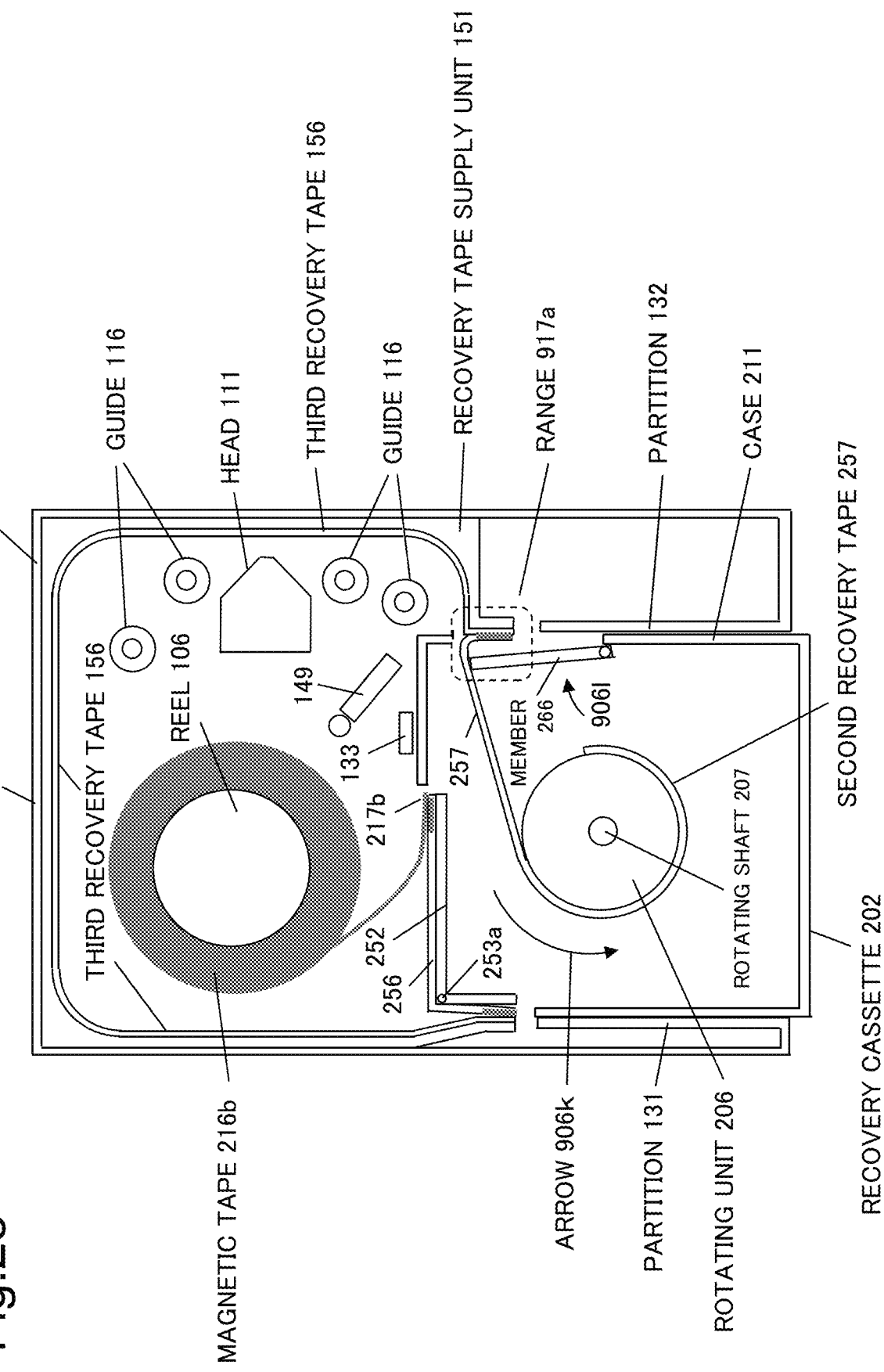
FIG. 28 is a schematic diagram illustrating a state where a member 266 rotates to a predetermined rotational position.

FIG. 28 is a schematic diagram illustrating a state where the member 266 finishes rotating to a predetermined rotational position.

Note that bonding of the second recovery tape 257 to the third recovery tape 156 may be performed simultaneously with at least one of bonding of the first recovery tape 256 to the third recovery tape 156 and bonding of the magnetic tape 216$b$ to the first recovery tape 256. In this case, a notification from the first bonding operation drive unit to the second bonding operation drive unit may be omitted.

Figure 29:
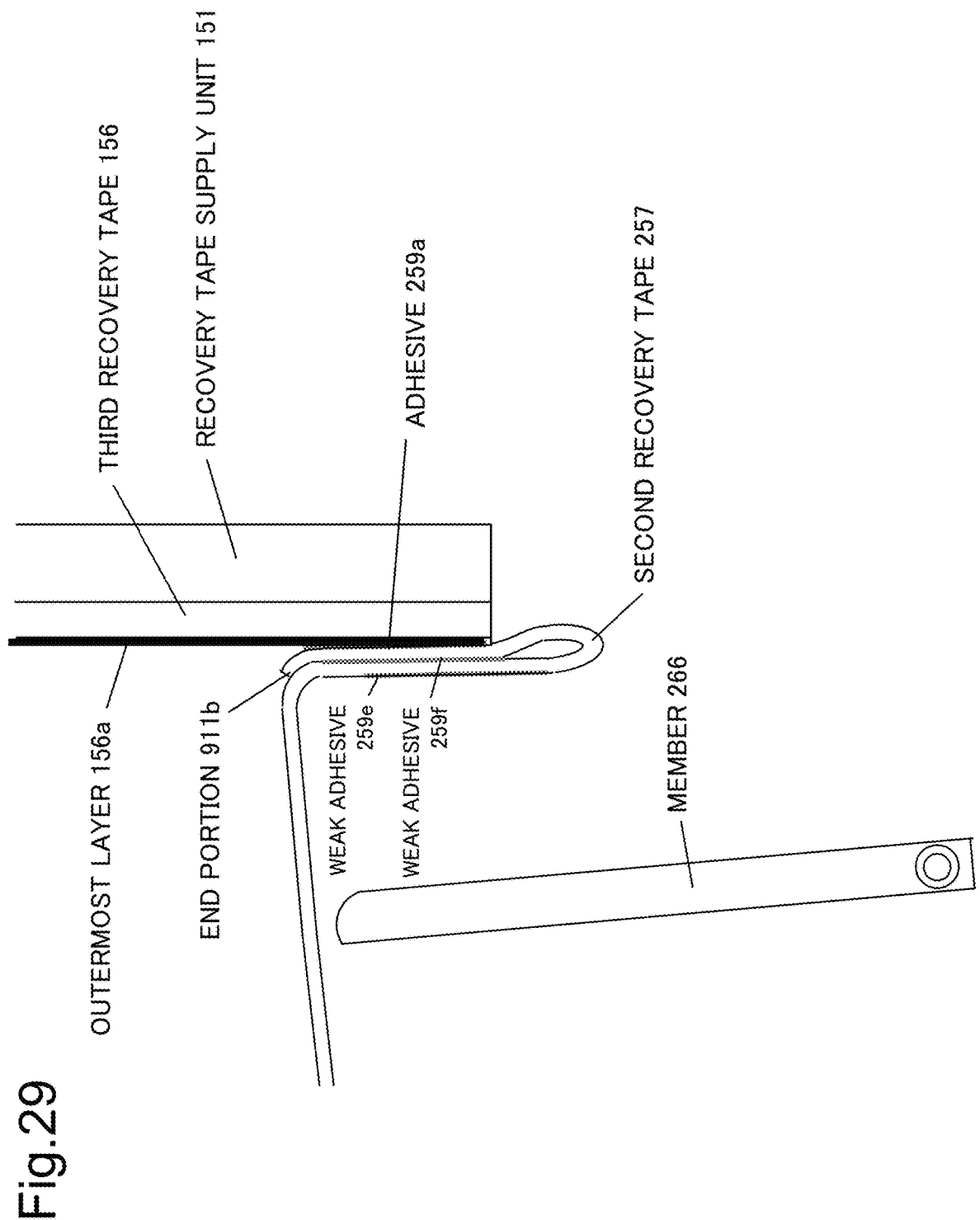

FIG. 29 is an enlarged view illustrating a configuration in a range 917$a$ illustrated in FIG. 28. While the second recovery tape 257 is bonded to the outermost layer 156$a$ of the third recovery tape 156 by the adhesive 259$a$, a portion of the second recovery tape 257 that has been bonded to the member 266 by the weak adhesive 259$e$ is peeled off from the member 266. Although not illustrated, in this state, peeling, from an adjacent layer of the third recovery tape 156, of a portion of the second recovery tape 257 bonded by the weak adhesive 259$f$ and a portion of the outermost layer 156$a$ bonded by the adhesive 259$a$ may occur.

Note that the state illustrated in FIG. 21 to the state illustrated in FIG. 29 are performed by the operation of the recovery cassette 202 regardless of an operation of an operator.

Next, an operator causes the drive unit 127 illustrated in FIG. 1 to rotate the rotating unit 206 illustrated in FIG. 28 in the direction of the arrow 906$k$ by an operation of an operation unit (not illustrated) of the magnetic tape device 101. In this way, the second recovery tape 257 is wound around the rotating unit 206, and the outermost layer 156*a* illustrated in FIG. 29 of the third recovery tape 156 is also peeled off from the adjacent layer of the third recovery tape 156, and pulled into a direction in which the second recovery tape 257 is wound. In this way, the first recovery tape 256 is peeled off from the member 252, and pulled into the direction in which the second recovery tape 257 is wound. Furthermore, the rupture portion 217*b* of the magnetic tape 216*b* is also pulled into the direction in which the second recovery tape 257 is wound.

Figure 30:
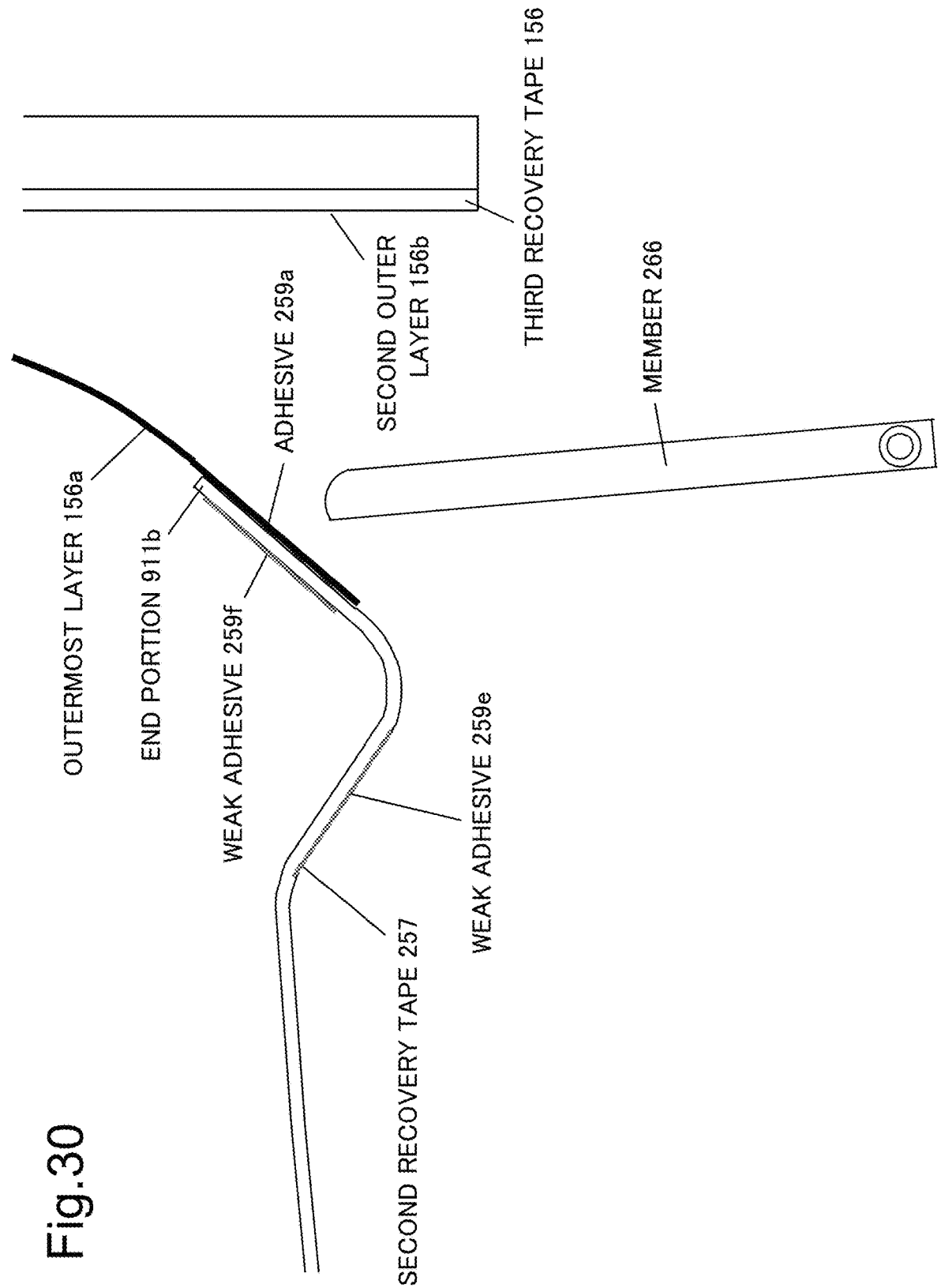
FIG. 30 is a schematic diagram illustrating a situation in a vicinity of the member 266.

FIG. 30 is a schematic diagram illustrating a situation where the range 917*a* illustrated in FIG. 28 changes by the second recovery tape 257 being wound around the rotating unit 206. In the state illustrated in FIG. 30, a portion of the second recovery tape 257 bonded by the weak adhesive 259*f* is peeled off, and furthermore, the outermost layer 156*a* of the third recovery tape 156 is peeled off from a second outer layer 156*b* being a layer adjacent to the outermost layer 156*a* of the third recovery tape 156.

Figure 31:
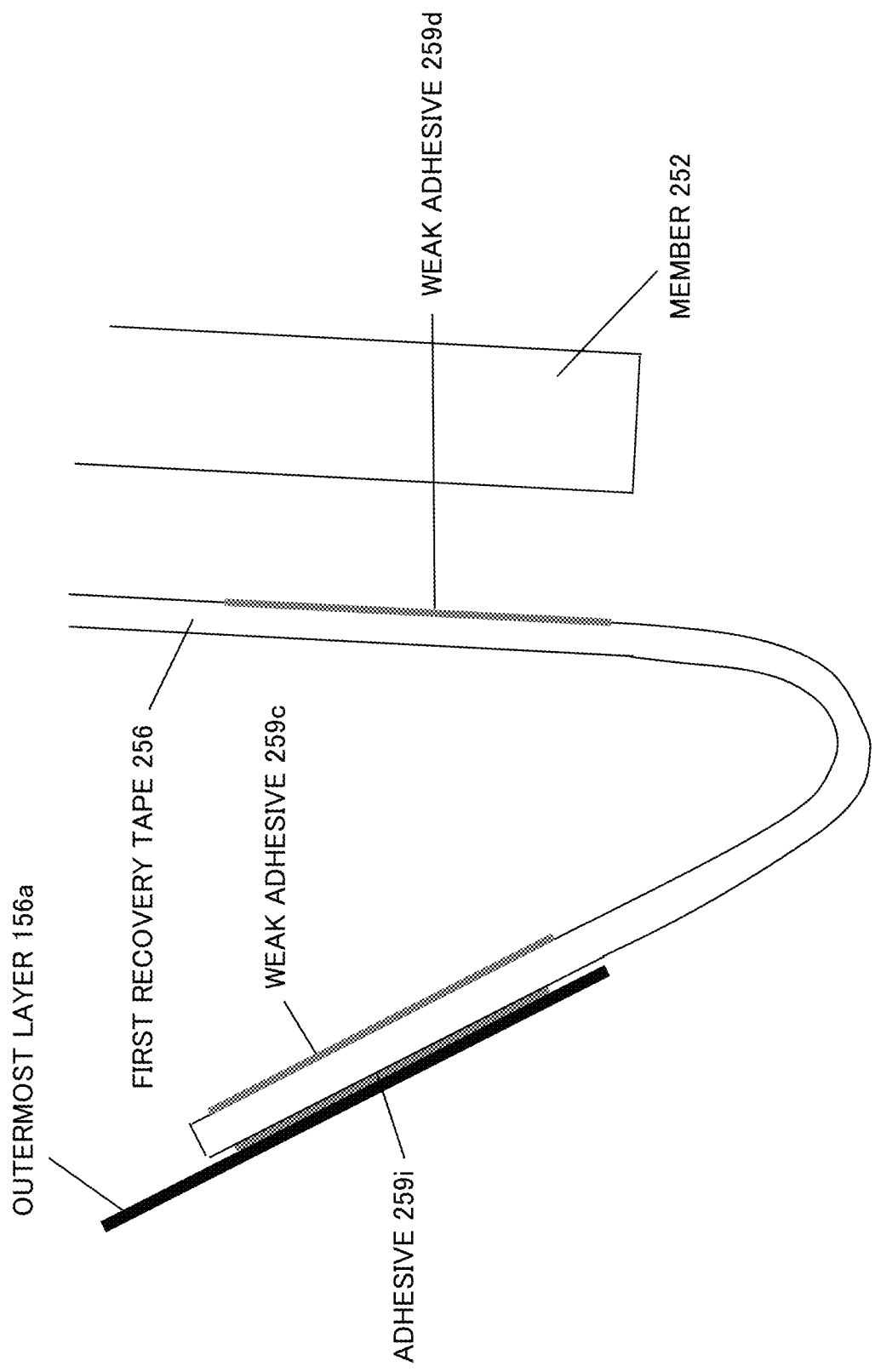
FIG. 31 is a schematic diagram illustrating a vicinity of a connection portion between an outermost layer and the first recovery tape.

FIG. 31 is a diagram illustrating a situation where the range illustrated in FIG. 25 changes by the second recovery tape 257 being wound around the rotating unit 206.

In the state illustrated in FIG. 31, the outermost layer 156*a* is peeled off from the layer that is adjacent to the outermost layer 156*a* of the third recovery tape 156 and is not illustrated in FIG. 31. Further, a portion of the first recovery tape 256 bonded to the member 252 by the weak adhesive 259*d* is also peeled.

Figure 32:
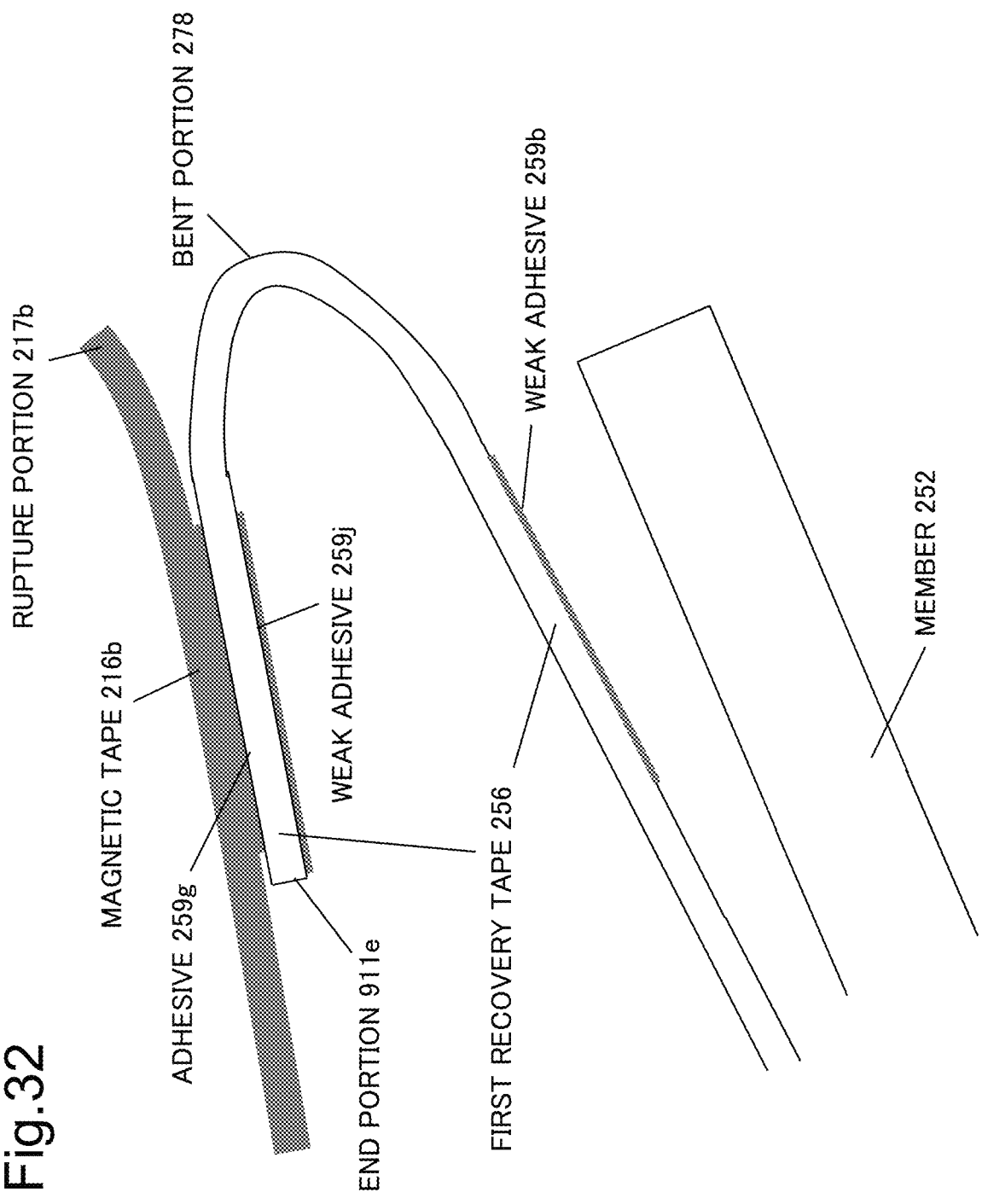
FIG. 32 is a schematic diagram illustrating a vicinity of a bonding portion between the first recovery tape and the magnetic tape.

FIG. 32 is a diagram illustrating a situation where the range illustrated in FIG. 23 changes by the second recovery tape 257 being wound around the rotating unit 206. A portion of the first recovery tape 256 bonded to the member 252 by the weak adhesive 259*b* is peeled off from the member 252. A portion of the first recovery tape 256 bonded by the weak adhesive 259*j* is also peeled.

Figure 33:
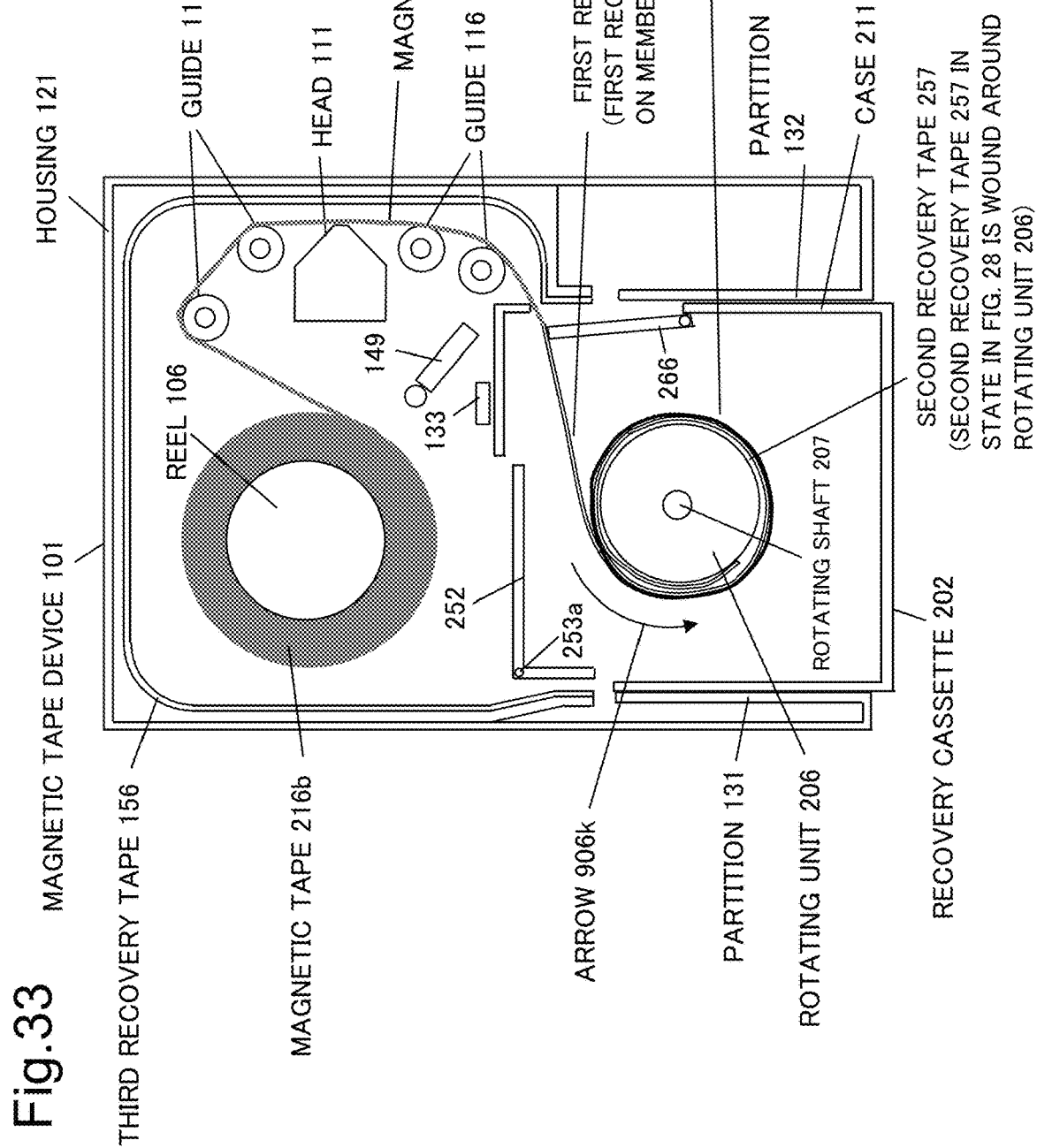
FIG. 33 is a schematic diagram illustrating a situation where the second recovery tape is further wound.

FIG. 33 is a diagram illustrating a situation where the second recovery tape 257 is further wound by the rotating unit 206. The second recovery tape 257, the outermost layer 156*a*, the first recovery tape 256, and the magnetic tape 216*b* are connected in this order, and are in a state close to one continuous tape.

The rotating unit 206 further rotates in the direction of the arrow 906*k* from the state illustrated in FIG. 33, and thus one continuous tape is wound around the rotating unit 206.

Figure 34:
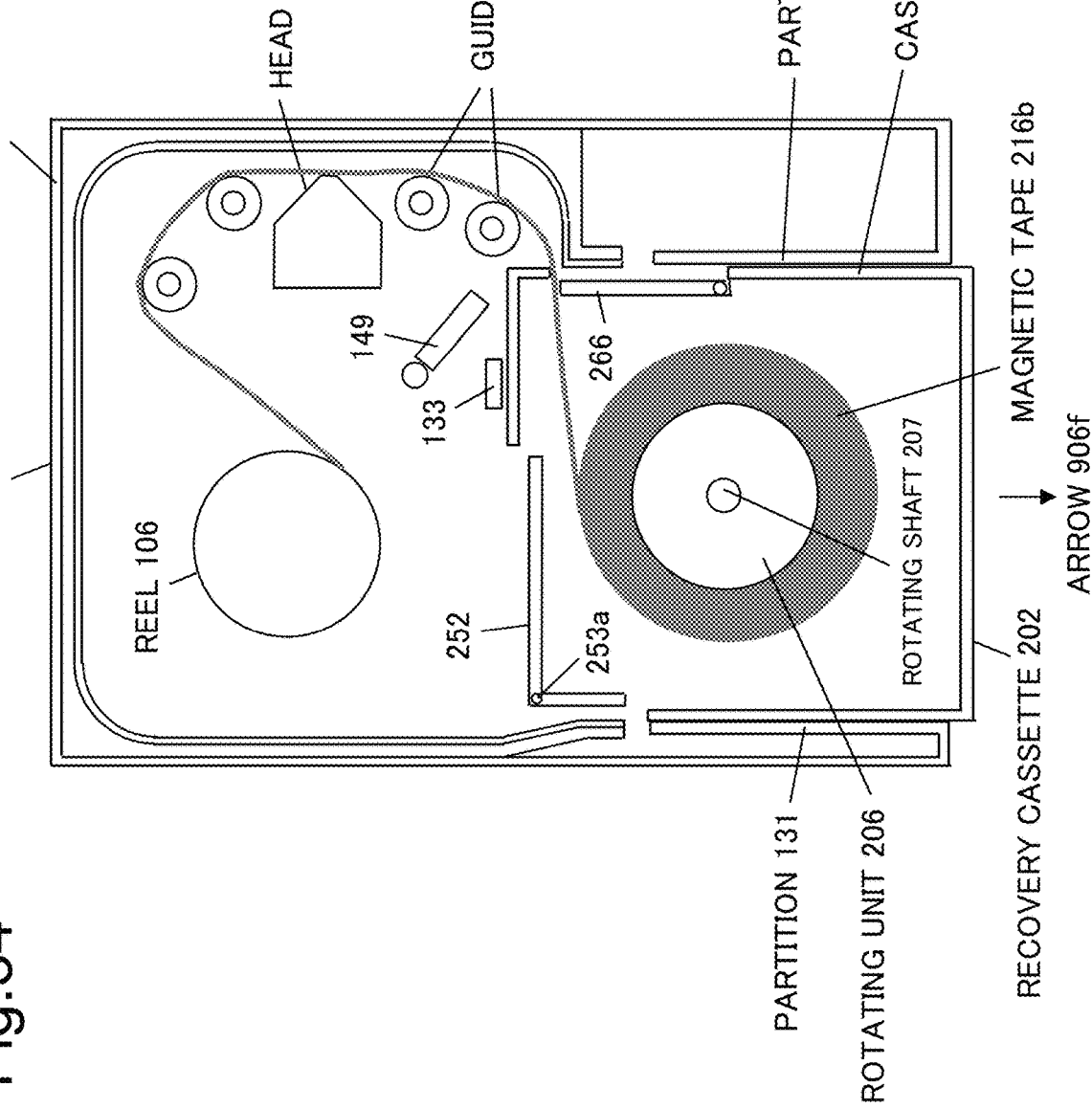
FIG. 34 is a diagram illustrating a state where one continuous tape is wound.

FIG. 34 is a diagram illustrating a state where one continuous tape is wound around the rotating unit 206.

Figure 35:
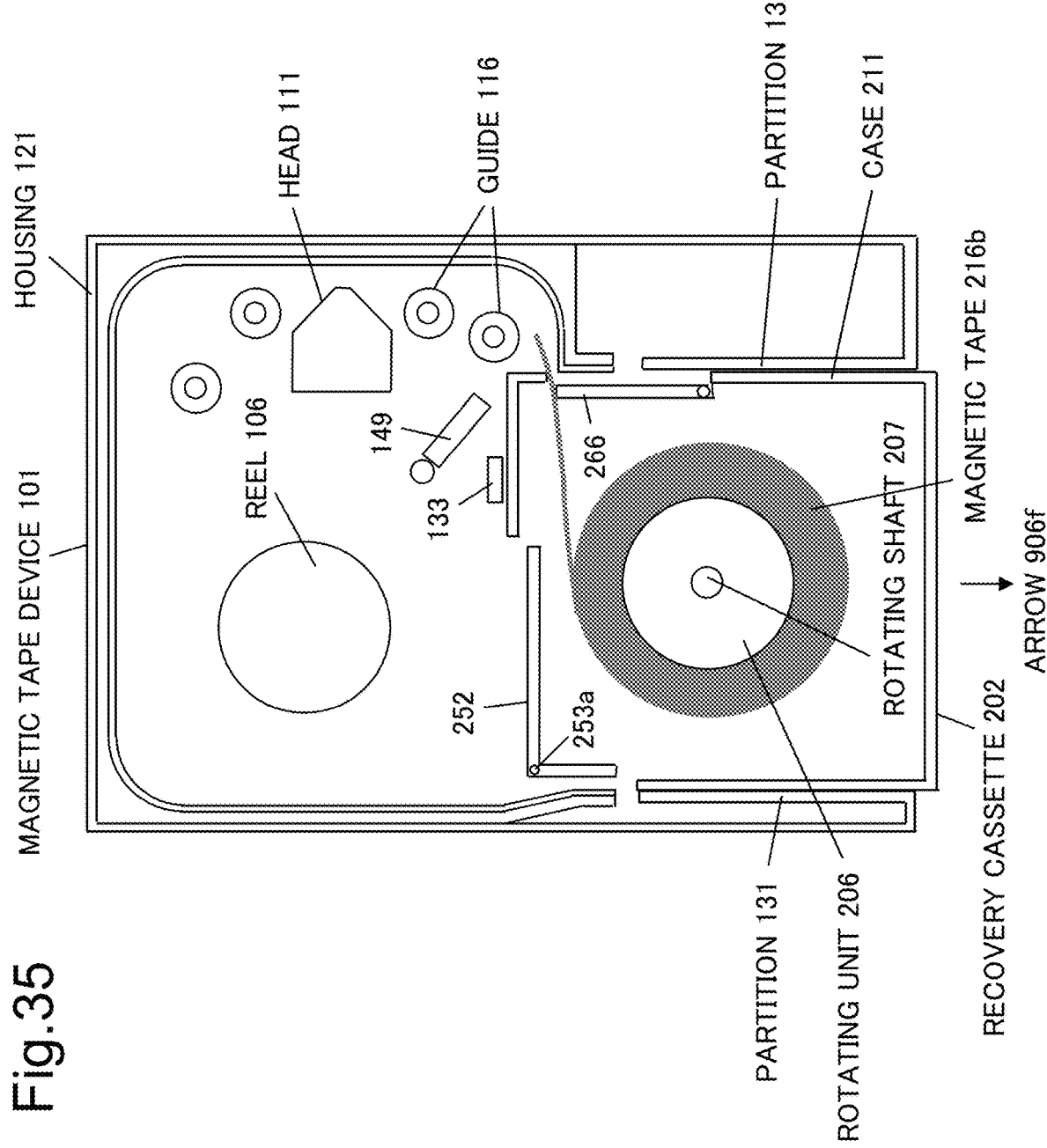
FIG. 35 is a schematic diagram illustrating a situation where winding of an in-device tape is further advanced.

A known connection releasing mechanism (not illustrated) removes an end portion of the magnetic tape 216*b* connected to the reel 106 from the state illustrated in FIG. 34. The connection releasing mechanism is, for example, a tape loading arm disclosed in FIG. 3 in NPL 1. Subsequently, when winding of the magnetic tape 216*b* by the rotating unit 206 is further advanced, a state as illustrated in FIG. 35 is acquired.

Figure 36:
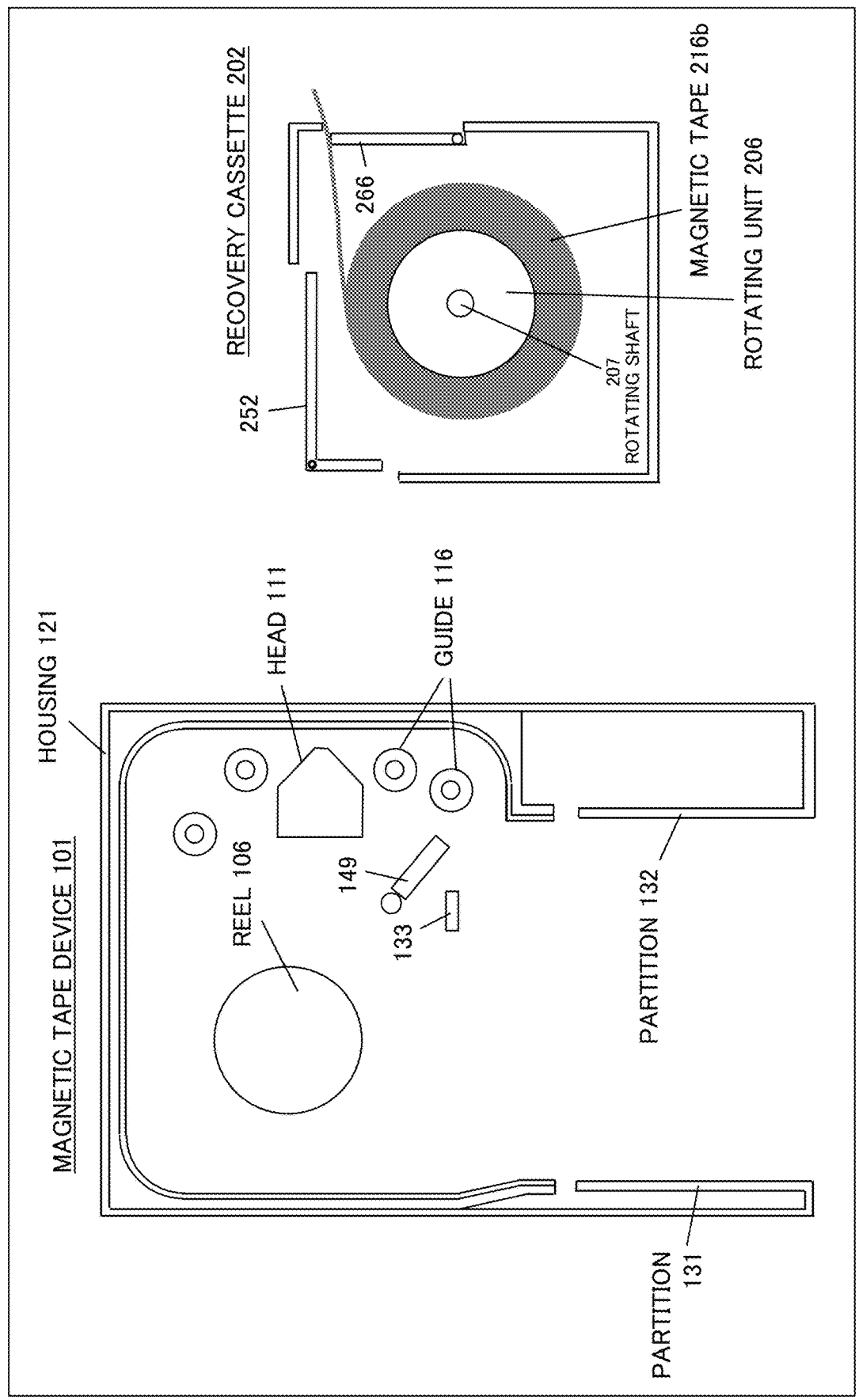
FIG. 36 is a schematic diagram illustrating a situation where the recovery cassette is removed from the magnetic tape device.

As illustrated in FIG. 36, by taking the recovery cassette 202 out from the magnetic tape device 101, the magnetic tape 216*b* remaining inside the magnetic tape device 101 due to a tape cut is recovered.

[Effect]

A recovery cassette according to the present example embodiment includes a first recovery tape, and a second recovery tape connected to a rotating unit being a portion that performs winding of a magnetic tape inside the recovery cassette. Further, a magnetic tape device according to the present example embodiment previously includes a third recovery tape outside a traveling path on which the magnetic tape travels. The third recovery tape is installed in a position in which there is no obstruction of a movement to the traveling path of the third recovery tape. Then, when the recovery cassette is mounted on the magnetic tape device, the first recovery tape is connected between an in-device tape being a magnetic tape remaining inside the magnetic tape device and a vicinity of a first end portion of the third recovery tape. Further, when the recovery cassette is mounted on the magnetic tape device, a vicinity of an end portion of the second recovery tape is connected to a vicinity of a second end portion of the third recovery tape. In this way, a recovery system according to the present example embodiment connects a vicinity of a rupture portion to the rotating unit of the recovery cassette by the connected first to third recovery tapes. A connection tape formed of the first to third recovery tapes being connected into one in such a manner and the magnetic tape is located outside the traveling path. Further, there is no obstruction of a movement to the traveling path of a connected tape between the connection tape and the traveling path. Thus, when winding of the connected tape is performed by rotation of the rotating unit, the connected tape further moves inward and travels on the traveling path. The traveling conforms to normal traveling of a magnetic tape, and thus a load on the magnetic tape device is hardly generated. Thus, the recovery system can improve a probability that the in-device tape occurring due to a tape cut can be recovered without disassembling the magnetic tape device.

Furthermore, since the in-device tape is wound by the recovery cassette similarly to an operation in a normal condition, the magnetic tape device winds the in-device tape to the end, and removes an end portion of the magnetic tape connected to a reel similarly to a case where a general cassette magnetic tape is wound. Thus, the magnetic tape device does not need to include a special mechanism for removing and cutting an end portion of an in-device tape after the in-device tape is wound to the end.

The magnetic tape device according to the present example embodiment may bring a step sensor into contact with a periphery of the in-device tape, and then determine a rotational position of the rupture portion from an output of the step sensor being acquired by rotating the in-device tape. In this case, the magnetic tape device stops the rupture portion in a rotational position shifted by a previously determined rotational angle from the determined rotational position of the rupture portion. In this way, the magnetic tape device stops the rupture portion in a position in which connection of the first recovery tape may be connected to a vicinity of the rupture portion. In this case, a vicinity of a connection portion between the in-device tape and the first recovery tape in the connection tape is in a state closer to one tape, and thus traveling on the traveling path becomes smoother. Therefore, the recovery system can further improve a probability that the in-device tape can be recovered without disassembling the magnetic tape device.

In a vicinity of an end portion of the first recovery tape being connected to the third recovery tape, the first recovery tape may be bent in an opposite direction of a direction in which a bonding member is present. In this case, the bent portion becomes straight during recovery, and thus a connection portion between both of the tapes becomes smaller and less likely to be peeled. Thus, the vicinity of the connection portion is in a state closer to one tape, and traveling on the traveling path becomes smoother. In addition, the connection portion is less likely to be peeled, and thus the recovery system can further improve a probability that the in-device tape can be recovered without disassembling the magnetic tape device.

In a vicinity of an end portion of the second recovery tape being connected to the third recovery tape, the second recovery tape may be bent in an opposite direction of a direction in which a bonding member is present. In this case, the bent portion becomes straight during recovery, and thus a connection portion between both of the tapes becomes smaller and less likely to be peeled. The vicinity of the connection portion is in a state closer to one tape, and traveling on the traveling path becomes smoother. In addition, the connection portion is less likely to be peeled, and thus the recovery system can further improve a probability that the in-device tape can be recovered without disassembling the magnetic tape device.

The third recovery tape may be a laminated tape acquired by overlapping a plurality of sub-tapes. In this case, recovery of an in-device tape is performed by an outermost layer of the laminated tape. In this case, even when a tape cut occurs again due to use of the magnetic tape device after a magnetic tape remaining inside the magnetic tape device due to a tape cut is recovered by the recovery system according to the present example embodiment, the recovery cassette can recover an in-device tape by a second outer layer. The recovery can be performed until the laminated sub-tape is used up.

Second Example Embodiment

A second example embodiment is an example embodiment related to a recovery method of recovering an in-device tape by cutting a tape after winding without using the third recovery tape as in the case of the first example embodiment.

A recovery system according to the second example embodiment is a combination of a magnetic tape device illustrated in FIG. 37 and a recovery cassette illustrated in FIG. 39 described later.

Figure 37:
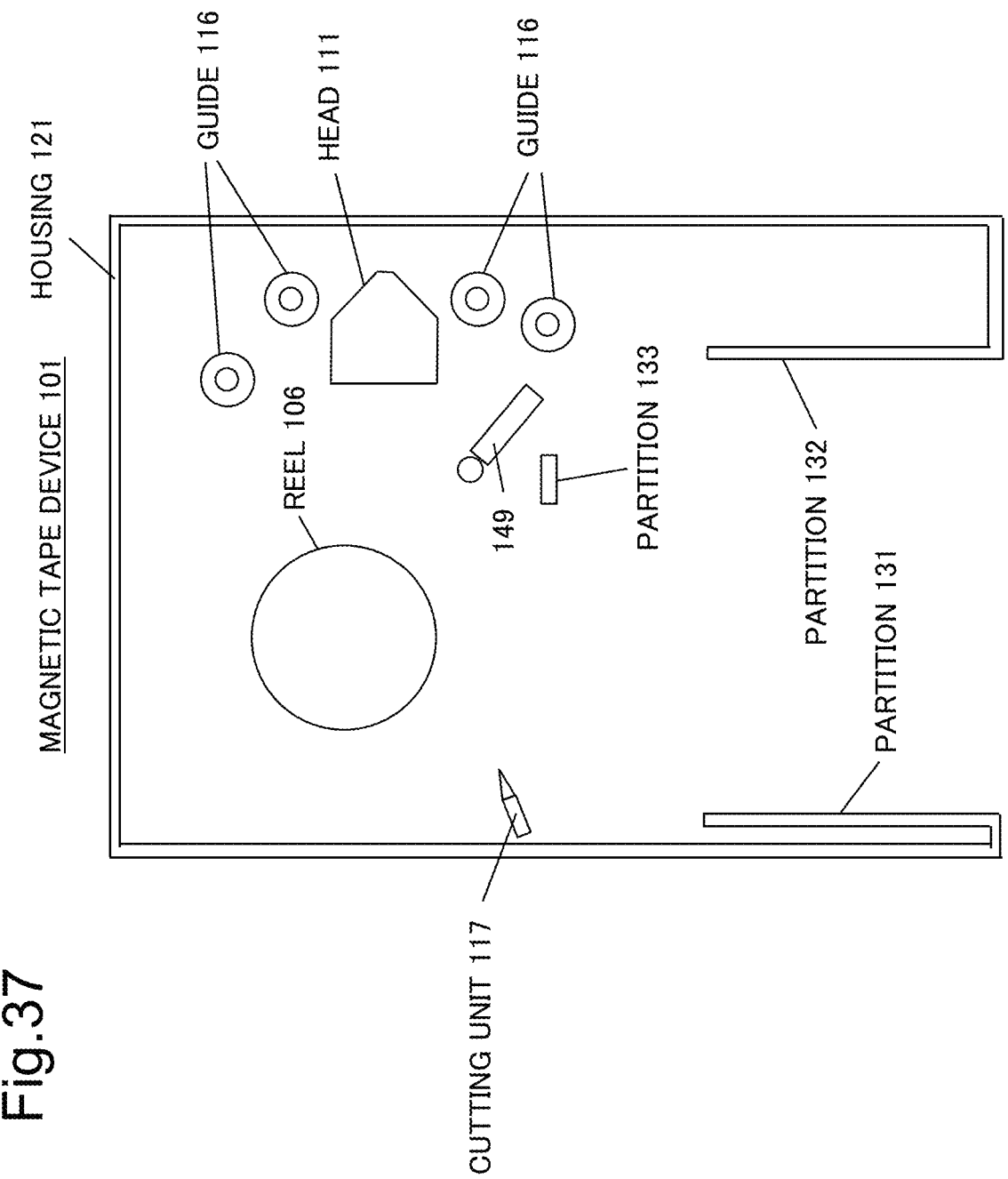
FIG. 37 is a schematic diagram illustrating a configuration example of a magnetic tape device according to a second example embodiment.

FIG. 37 is a schematic diagram illustrating a configuration of a magnetic tape device 101 being an example of a magnetic tape device according to the second example embodiment.

The magnetic tape device 101 illustrated in FIG. 37 does not include the recovery tape supply unit 151 and the third recovery tape included in the magnetic tape device 101 illustrated in FIG. 6. The magnetic tape device 101 illustrated in FIG. 37 includes a cutting unit 117. The cutting unit 117 can cut an in-device tape after the in-device tape is wound into the recovery cassette, and recover the tape.

Figure 38:
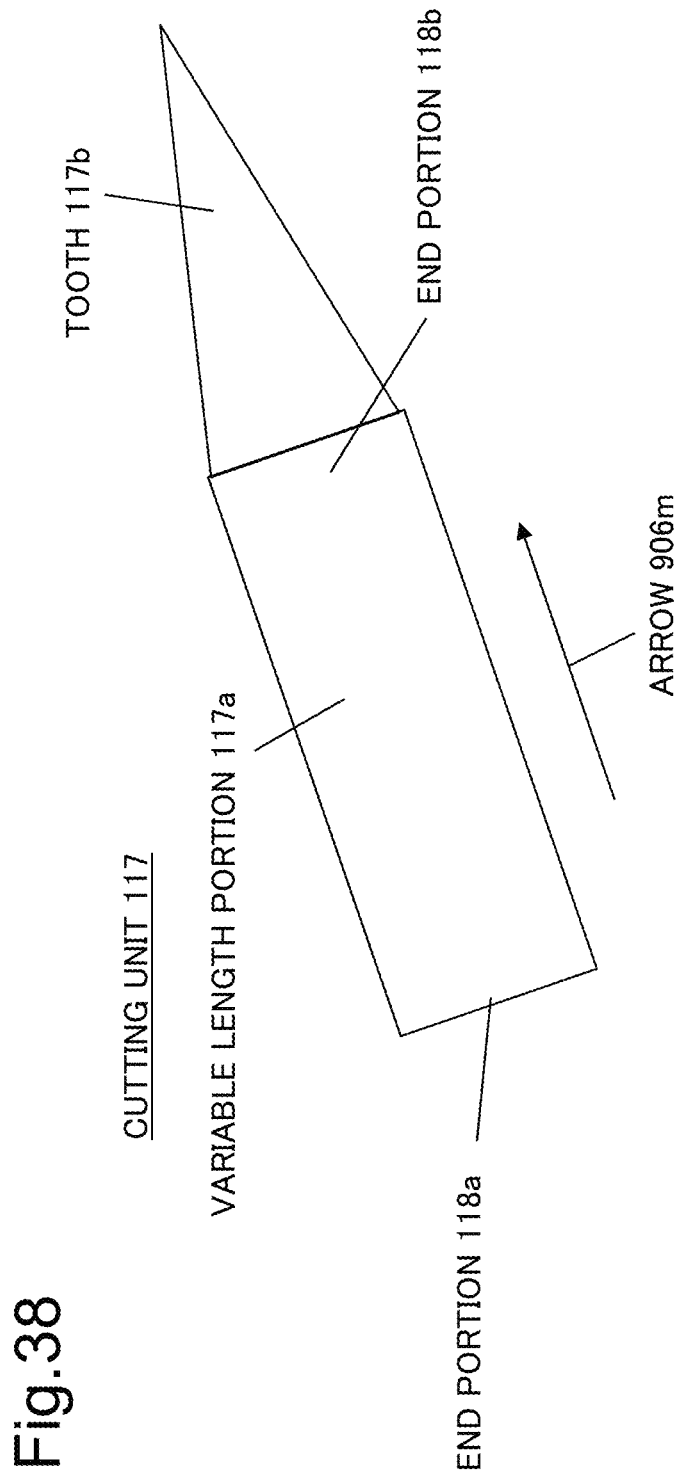
FIG. 38 is a schematic diagram illustrating a configuration example of a cutting unit.

FIG. 38 is a schematic diagram illustrating a configuration of the cutting unit 117 illustrated in FIG. 37.

The cutting unit 117 includes a variable length portion 117a and a tooth 117b.

An end portion 118a of the variable length portion 117a is fixed to a housing 121 of the magnetic tape device 101 illustrated in FIG. 37 or a member fixed to the housing 121.

The variable length portion 117a changes a position of an end portion 118b with respect to the end portion 118a in a direction parallel to an arrow 906m. The variable length portion 117a includes, for example, a stick, a guide member, and a motor. The guide member guides a movement direction of the stick in the direction parallel to the arrow 906m. A tooth is formed on a side surface of the stick in a longitudinal direction. The tooth engages with a gear mounted on a rotating shaft of the motor. The motor is fixed to the housing. When the motor is driven in the above-mentioned configuration, a tip position of the stick can move in the direction parallel to the direction of the arrow 906m with respect to the motor. The tooth 117b illustrated in FIG. 38 is mounted on the tip position of the stick.

Note that, in order to further increase a movement distance of the stick, the above-mentioned configuration may be combined in many stages and used.

The variable length portion 117a moves a tip of the tooth 117b in the direction of the arrow 906m by moving a position of 118b in the direction of the arrow 906m. Then, as described later with reference to FIG. 43, the tooth 117b cuts a magnetic tape located in the direction of the arrow 906m.

Figure 39:
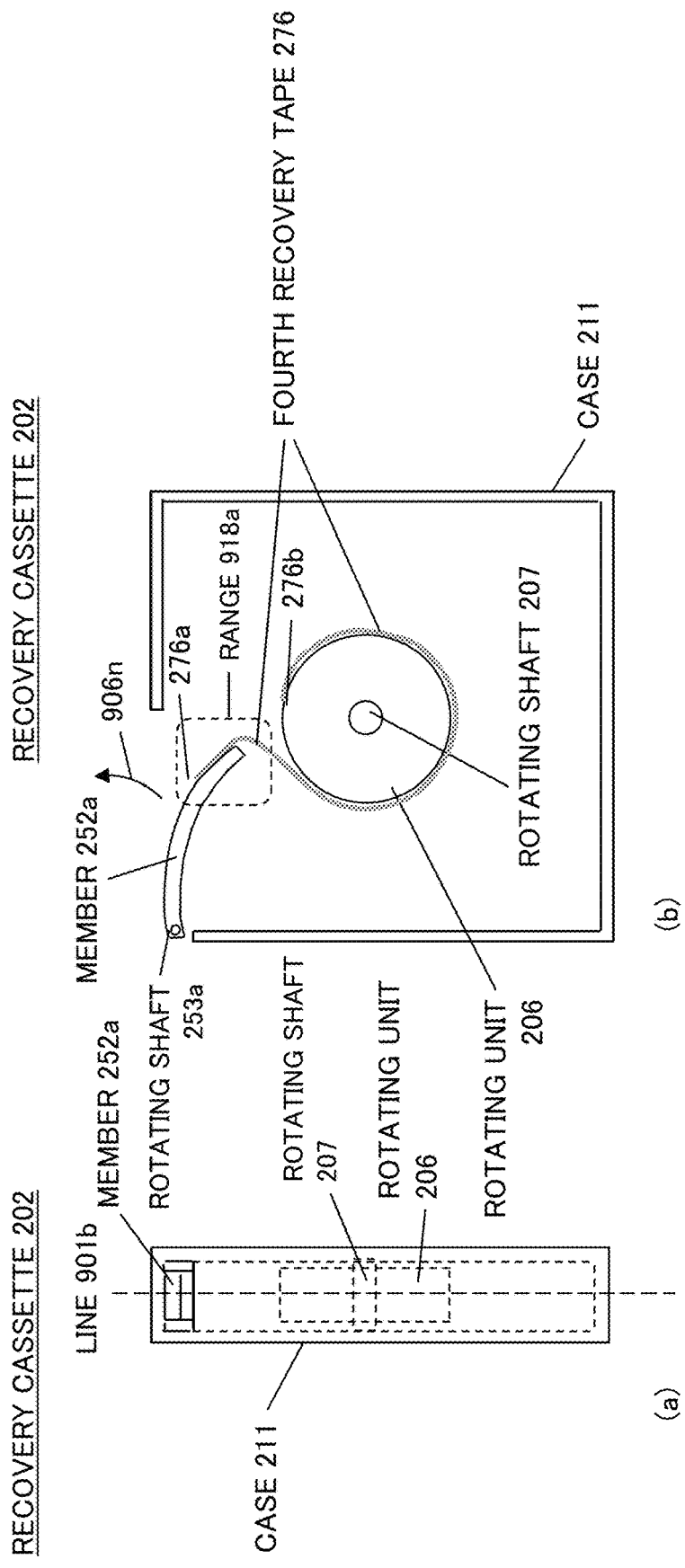
FIG. 39 is a schematic diagram illustrating a configuration example of a recovery cassette according to the second example embodiment.

FIG. 39 is a schematic diagram illustrating a configuration example of a recovery cassette 202 according to the second example embodiment. FIG. 39($a$) is a side view of the recovery cassette 202. FIG. 39($b$) is a cross-sectional view assumed when the recovery cassette 202 is cut at a line 901b.

The recovery cassette 202 includes a case 211, a rotating unit 206, a member 252a, and a fourth recovery tape.

Description of the rotating unit 206 is the same as the rotating unit 206 of the recovery cassette 202 according to the first example embodiment illustrated in FIG. 10.

The recovery cassette 202 rotates the member 252a about a rotating shaft 253a in a direction of an arrow 906n or an opposite direction by driving by a drive unit (not illustrated). A configuration of the drive unit can be appropriately configured by a known technique.

A part of a fourth recovery tape 276 is wound around the rotating unit 206. An end portion 276b of the fourth recovery tape 276 is fixed to the rotating unit 206. A vicinity of an end portion 276a of the fourth recovery tape 276 is bonded to the member 252a.

Figure 40:
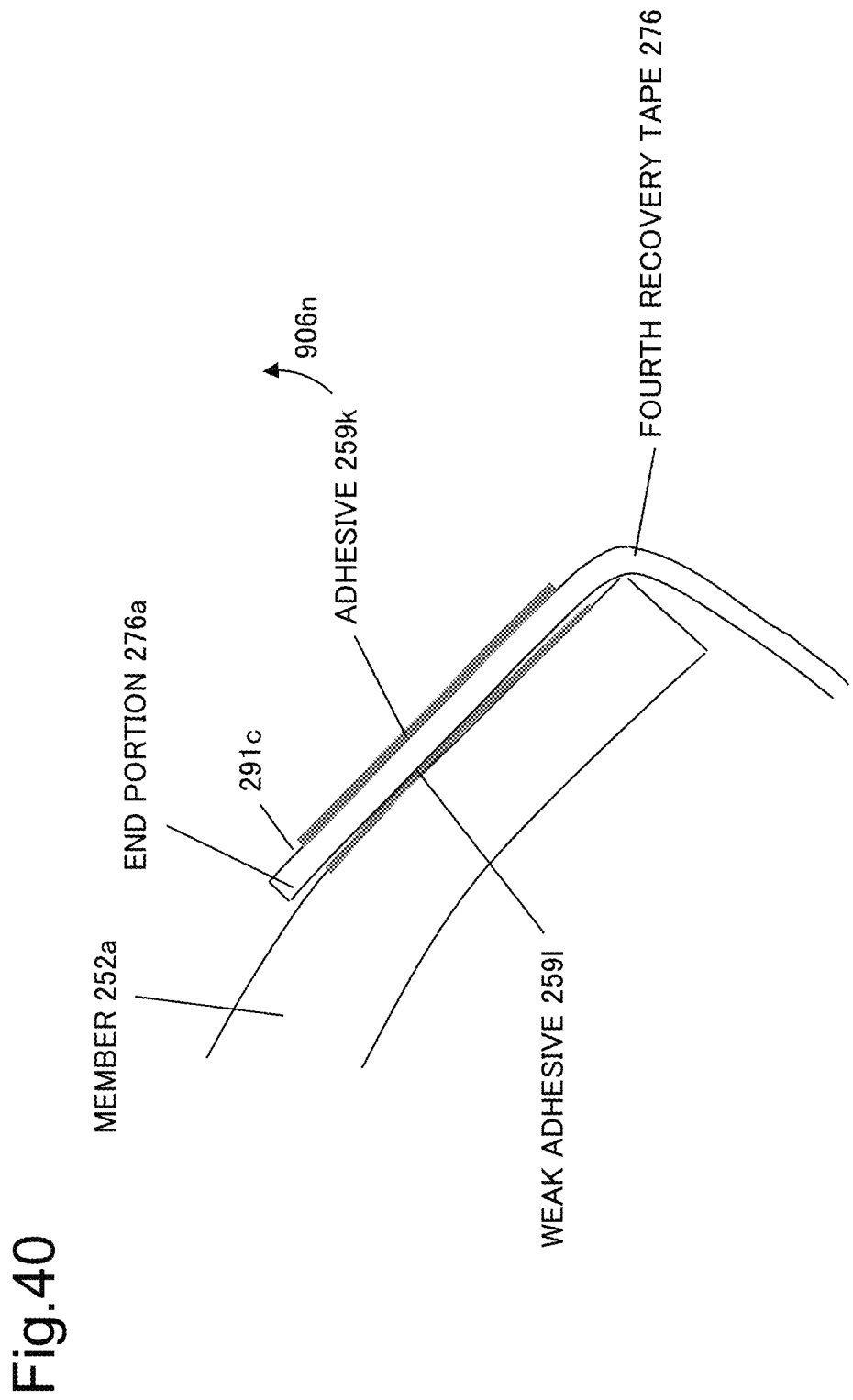

FIG. 40 is an enlarged view of a range 918a illustrated in FIG. 39.

In the vicinity of the end portion 276a, the fourth recovery tape 276 is bonded to the member 252a by a weak adhesive 259l. The adhesive strength of the weak adhesive 259l is weak enough for an adhering portion of the fourth recovery tape 276 to be easily peeled off from the member 252a due to predetermined external force.

An adhesive 259k is provided on a surface 291c of the fourth recovery tape 276. The adhesive strength of the adhesive 259k is sufficiently greater than the adhesive strength of the weak adhesive 259l. Thus, for example, when another tape is bonded to the fourth recovery tape 276 by the adhesive 259k and the tape is pulled upward, peeling occurs in a bonding portion by the weak adhesive 259l before peeling occurs in a bonding portion by the adhesive 259k.

Hereinafter, an operation of recovering an in-device tape by using the magnetic tape device 101 illustrated in FIG. 37 and the recovery cassette 202 illustrated in FIG. 39 will be described. The in-device tape is a magnetic tape that is difficult to recover inside the magnetic tape device due to a tape cut.

Figure 41:
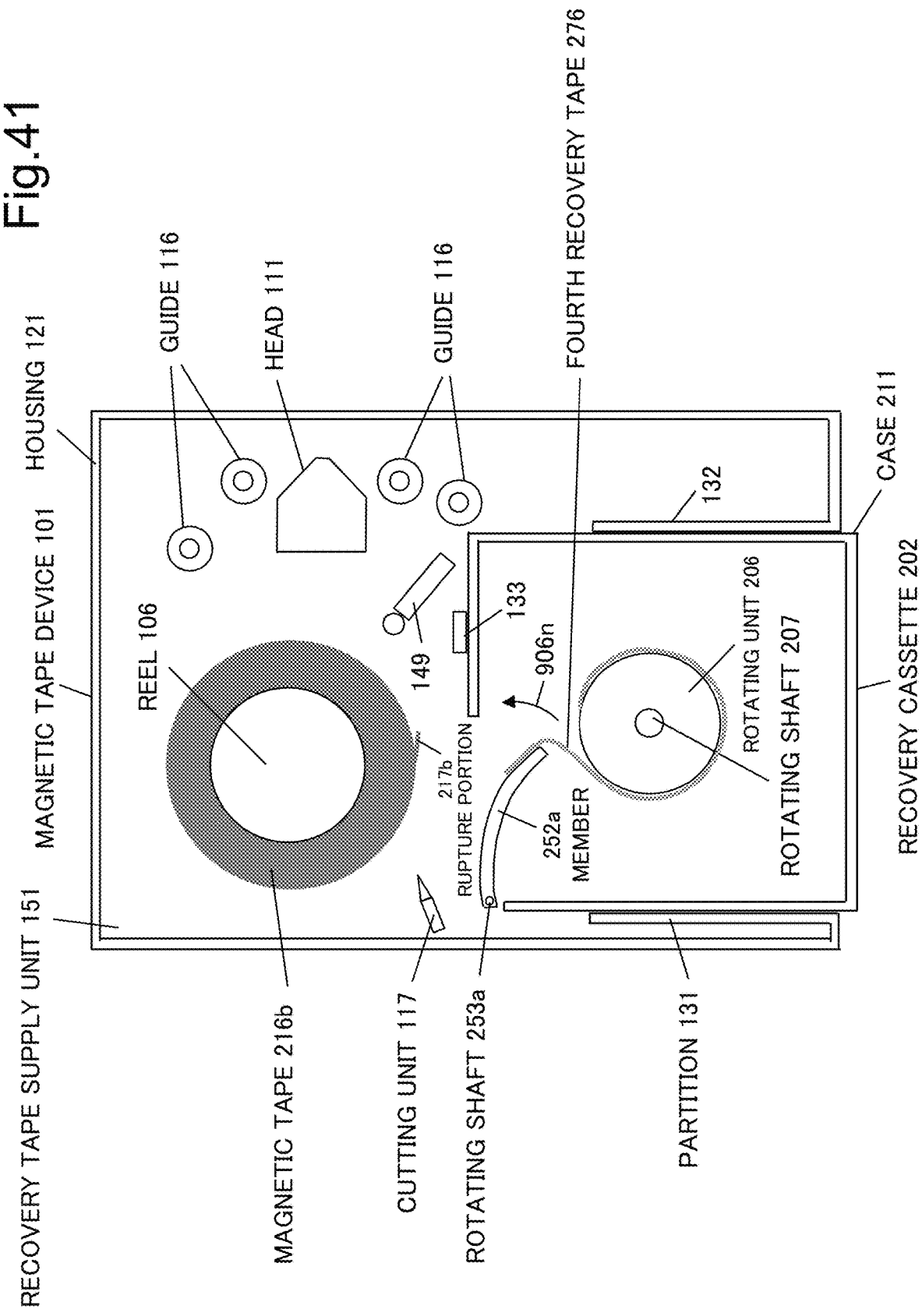
FIG. 41 is a diagram illustrating a situation where the recovery cassette according to the present example embodiment is mounted on the magnetic tape device according to the second example embodiment.

Description of an operation since a tape cut occurs until a state illustrated in FIG. 41 is the same as the operation described with reference to FIGS. 15 to 20. However, it is assumed that the recovery tape supply unit 151 and the third recovery tape 156 illustrated in FIG. 6 are not present.

Subsequent to the state illustrated in FIG. 20, as illustrated in FIG. 41, the recovery cassette 202 illustrated in FIG. 39 is mounted on the magnetic tape device 101 illustrated in FIG. 37 associated with the state illustrated in FIG. 20.

Then, a drive unit (not illustrated) of the recovery cassette 202 rotates the member 252a about the rotating shaft 253a in the direction of the arrow 906n.

Figure 42:
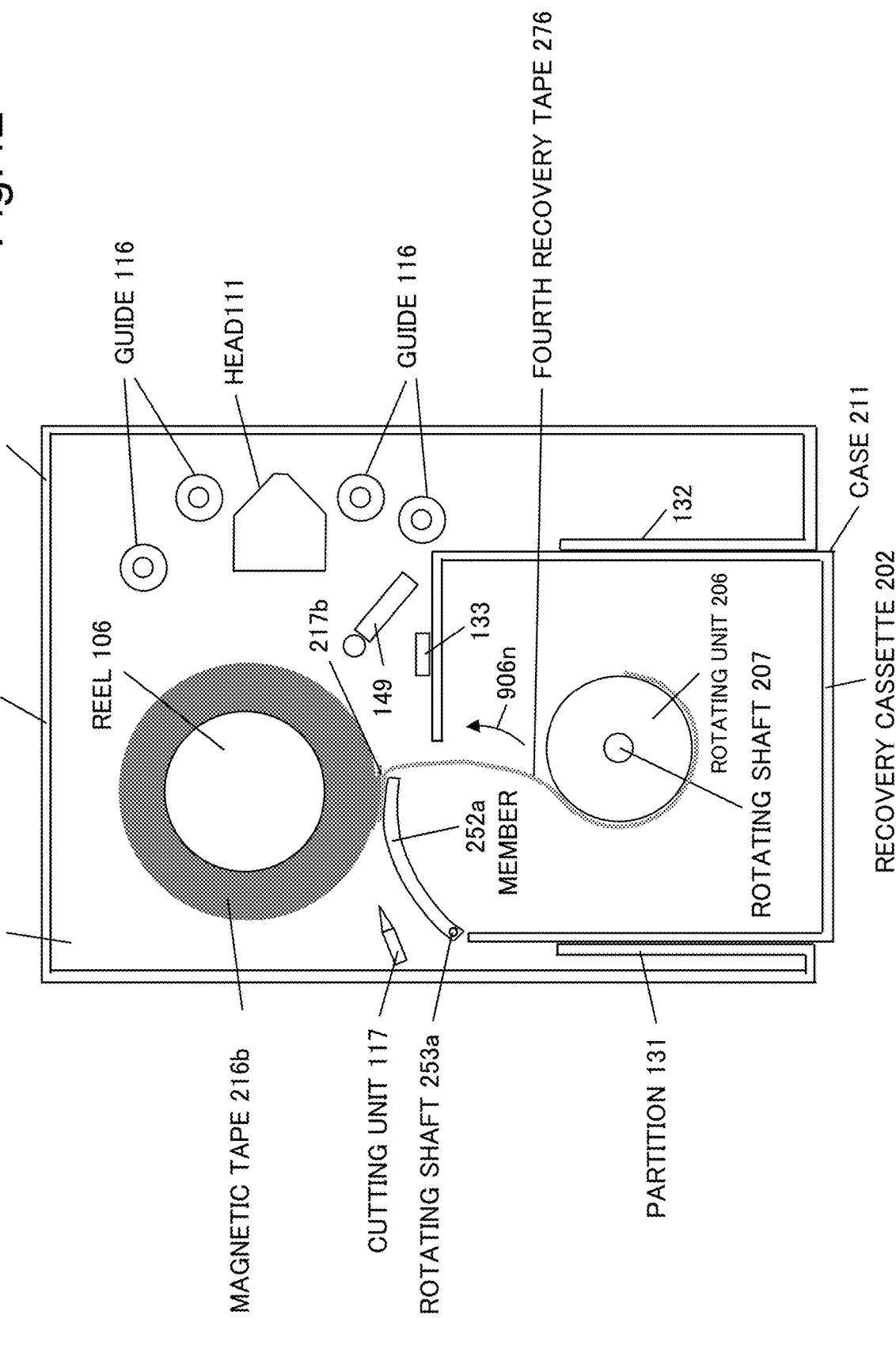
FIG. 42 is a diagram illustrating a state where a portion of a fourth recovery tape on which an adhesive is formed is in contact with a vicinity of a rupture portion of a magnetic tape.

As illustrated in FIG. 42, by the rotation, a portion of the fourth recovery tape 276 on which an adhesive 259k illustrated in FIG. 40 is formed is in contact with a vicinity of a rupture portion 217b of a magnetic tape 216b. By the contact, the portion of the fourth recovery tape 276 on which the adhesive 259k illustrated in FIG. 40 is formed is bonded to the vicinity of the rupture portion 217b of the magnetic tape 216b.

Figure 43:
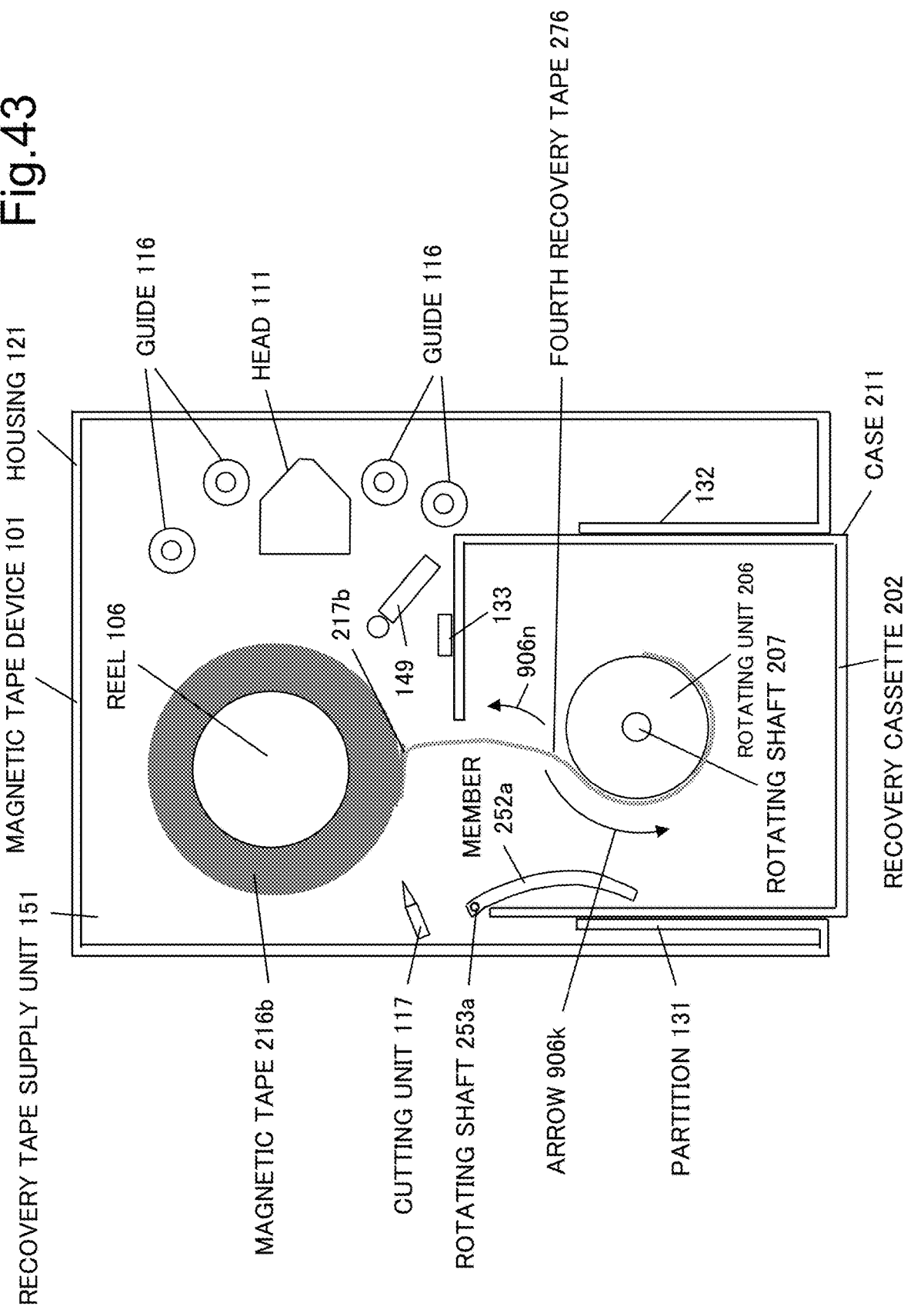
FIG. 43 is a diagram illustrating a state where a member 252a is rotated in an opposite direction of an arrow 906n.

Next, the drive unit rotates the member 252a in the opposite direction of the arrow 906n, and a state illustrated in FIG. 43 is acquired.

Next, the rotating unit 206 is rotated in a direction of an arrow 906k by driving from the magnetic tape device 101, and the magnetic tape 216b is wound around the rotating unit 206.

Figure 44:
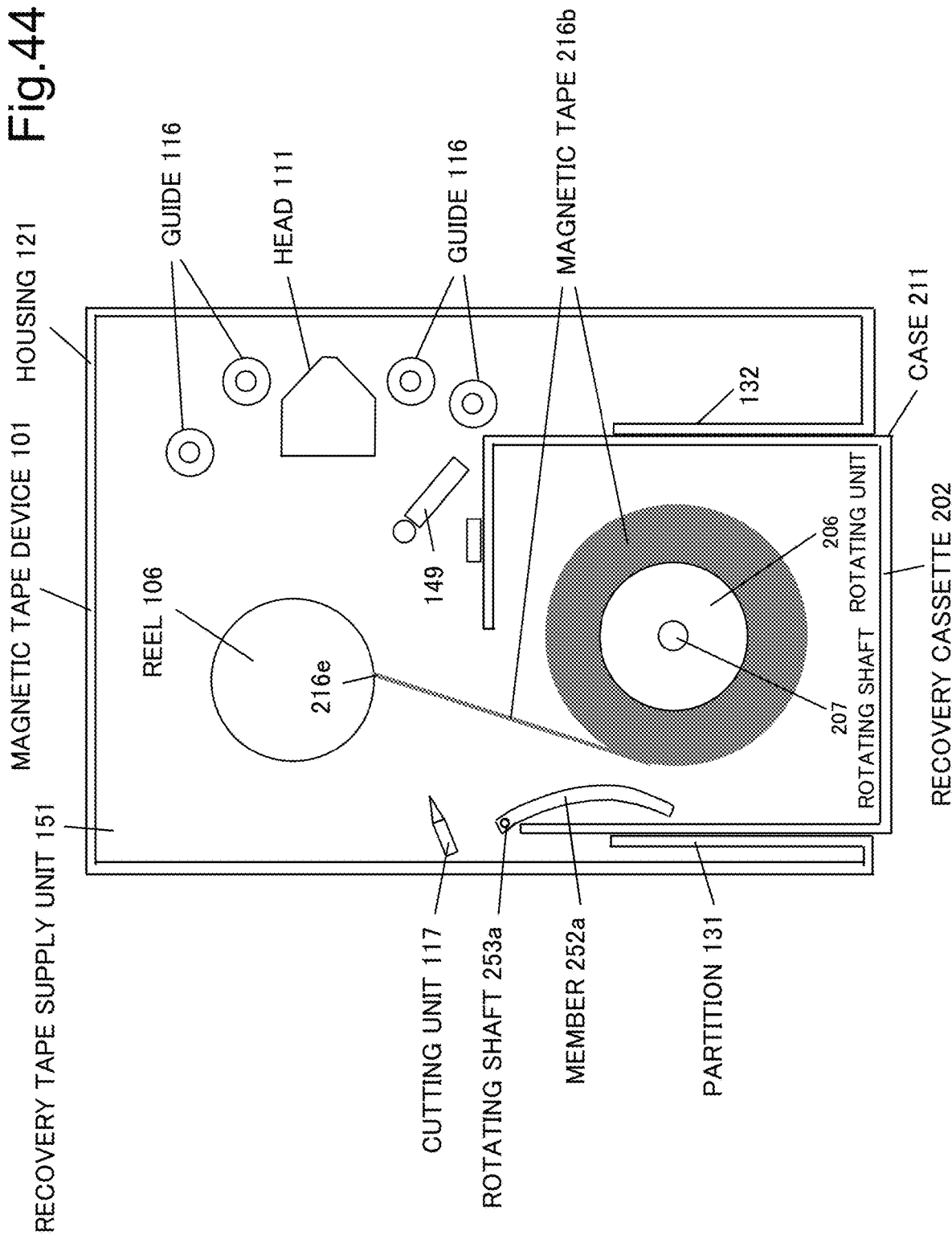
FIG. 44 is a diagram illustrating a state where an in-device tape is wound around a rotating unit.

FIG. 44 illustrates a state where the magnetic tape 216b is wound around the rotating unit 206.

In this state, the magnetic tape 216b is not wound by a normal traveling path, and thus a connection releasing mechanism (not illustrated) of the magnetic tape device 101 cannot perform removal, from the reel 106, of an end portion 216e of the magnetic tape 216b from the reel 106. The connection releasing mechanism is, for example, a tape loading arm disclosed in FIG. 3 in NPL 1. The reason why the connection releasing mechanism cannot perform the removal is that the connection releasing mechanism moves a tape end portion removed along a normal traveling path of a magnetic tape. Thus, when the magnetic tape 216b is not connected to the rotating unit 206 by the normal traveling path, the magnetic tape 216b gets entangled around a guide 116 and a head and the magnetic tape 216b becomes impossible to recover. Therefore, in the state illustrated in FIG. 44, an operator and the like cannot remove the recovery cassette 202 from the magnetic tape device 101.

Figure 45:
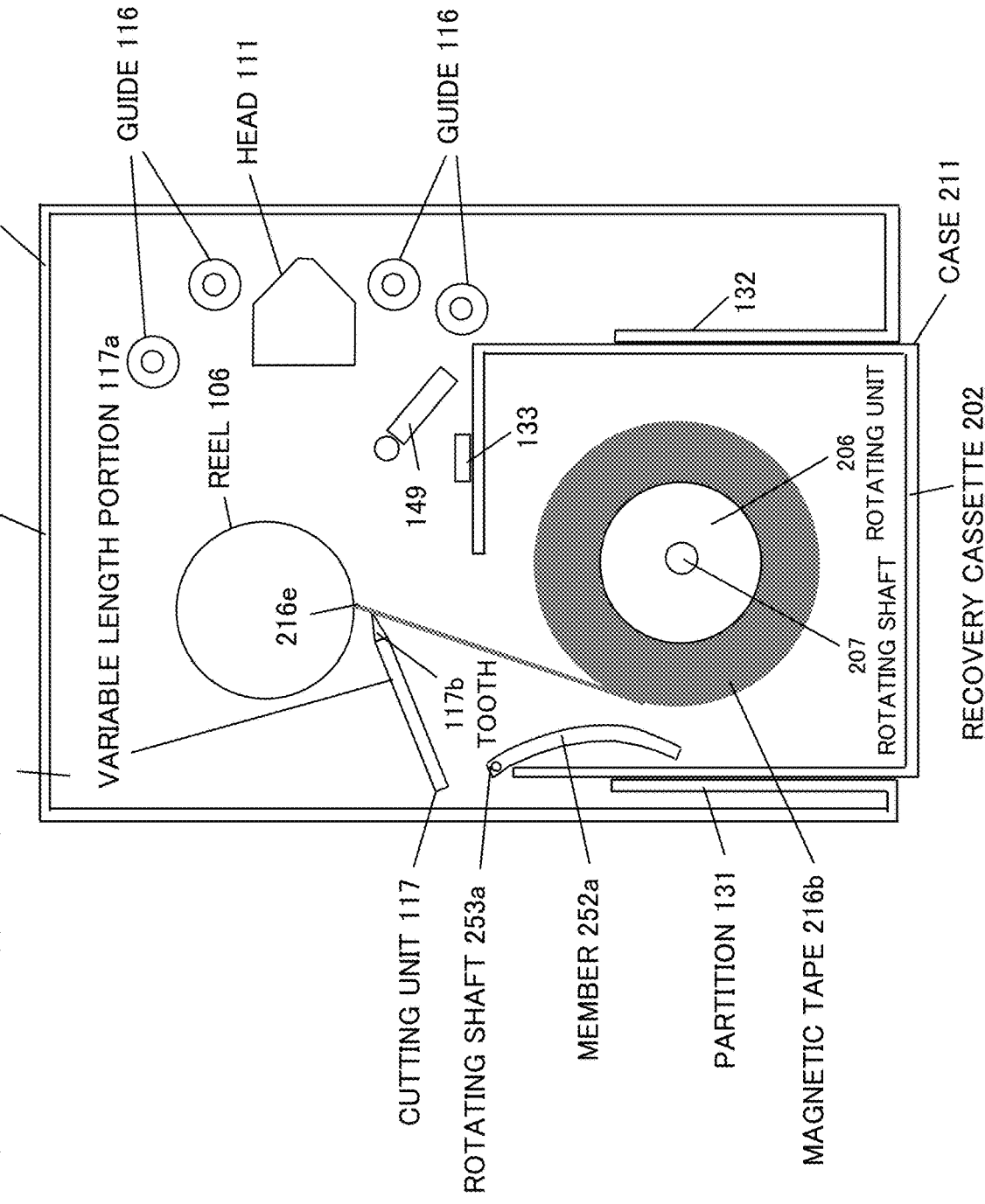
FIG. 45 is a diagram illustrating a situation immediately before a vicinity of an end portion of the in-device tape is cut by a cutting unit.

Thus, the variable length portion 117a illustrated in FIG. 38 of the cutting unit 117 is extended as illustrated in FIG. 45, and a vicinity of the end portion 216e of the magnetic tape 216b is cut at a tip of the tooth 117b.

Figure 46:
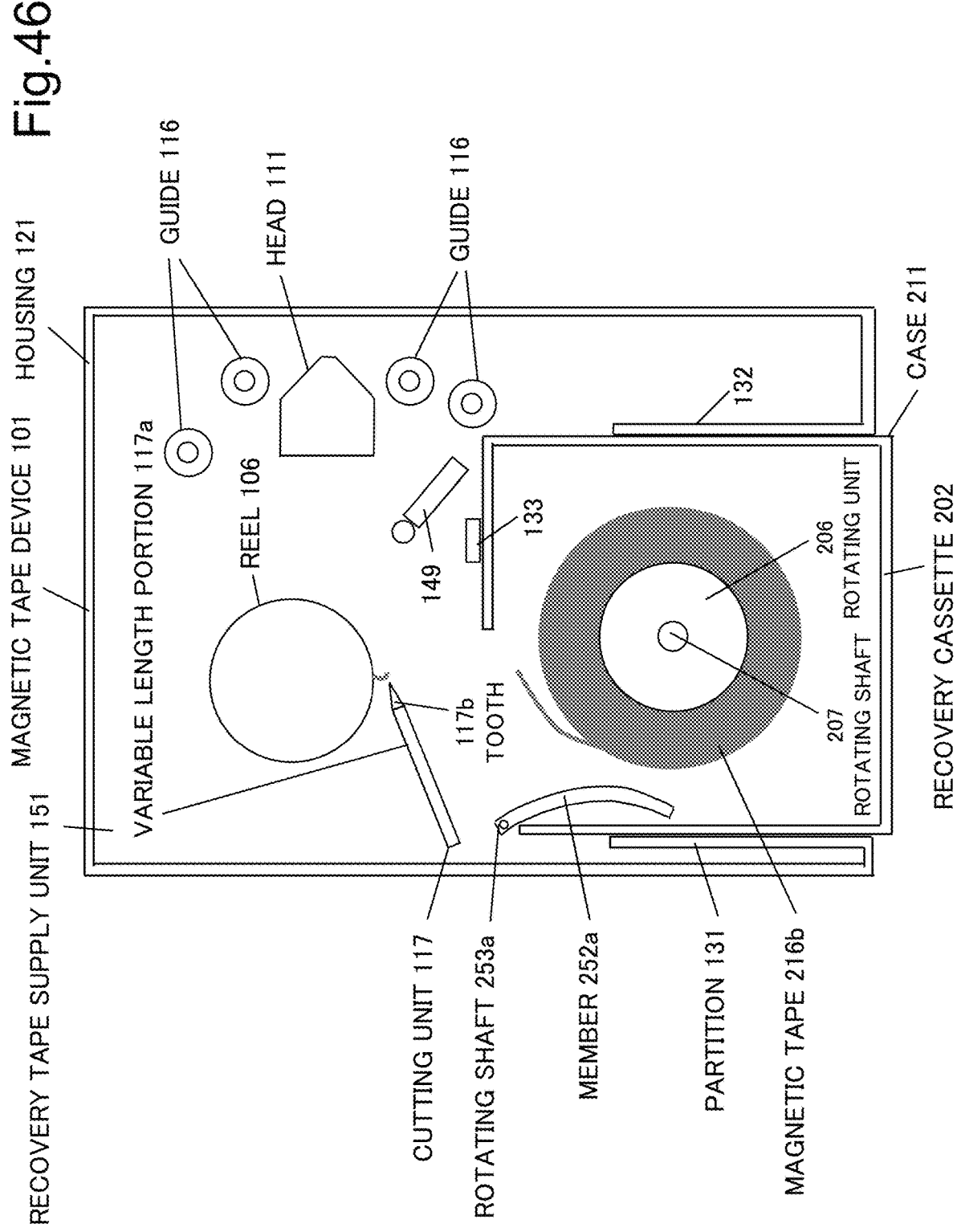
FIG. 46 is a diagram illustrating a situation where the vicinity of the end portion of the in-device tape is cut by the cutting unit.

FIG. 46 illustrates a situation where the vicinity of the end portion 216e of the magnetic tape 216b is cut at the tip of the tooth 117b. The state illustrated in FIG. 46 is a state where the recovery cassette 202 can be recovered from the magnetic tape device 101.

Figure 47:
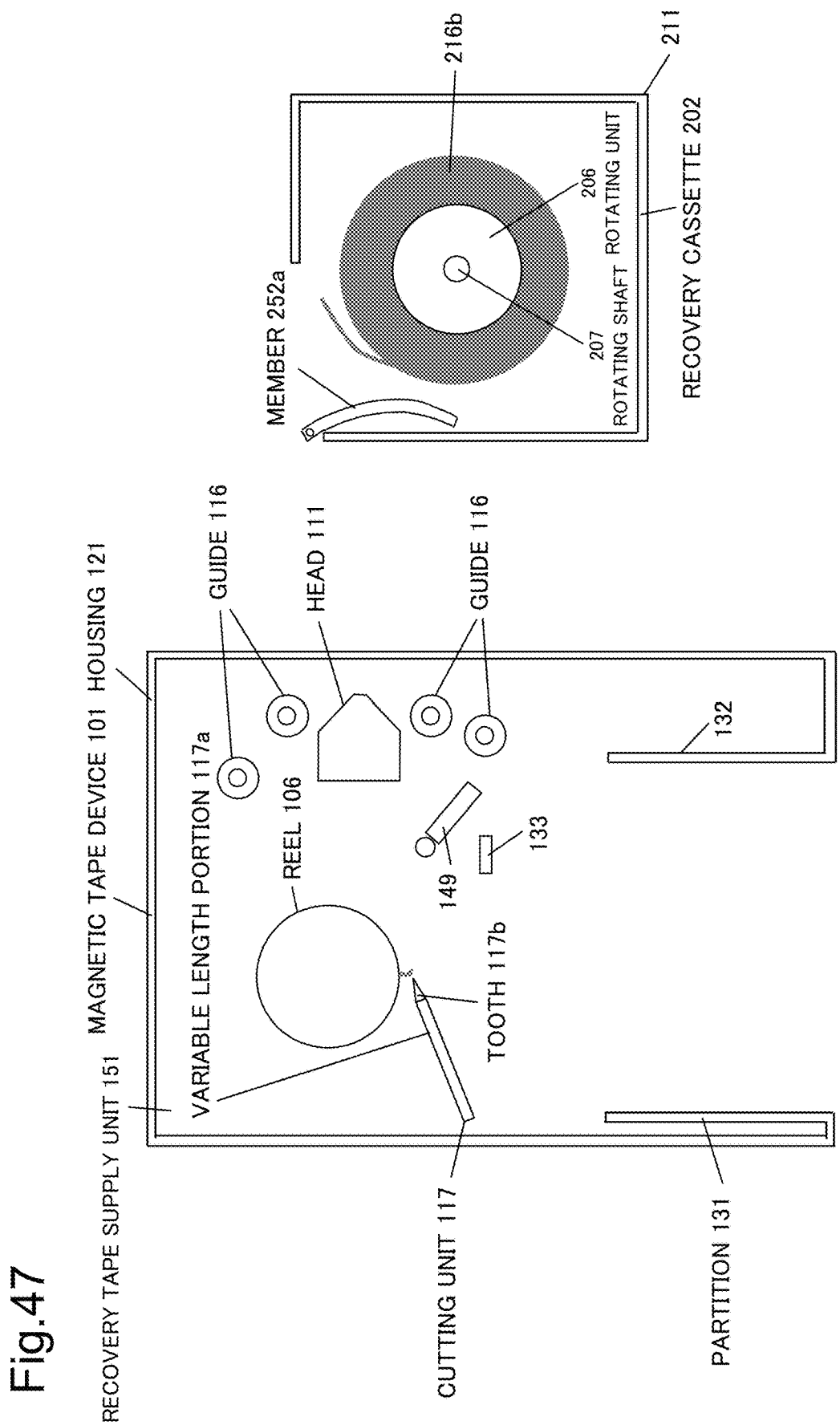
FIG. 47 is a diagram illustrating a situation where the in-device tape is recovered.

As illustrated in FIG. 47, by taking the recovery cassette 202 out from the magnetic tape device 101, the magnetic tape 216b is recovered from the magnetic tape device 101.
[Effect]

In a recovery system according to the second example embodiment, a recovery cassette connects an in-device tape that is difficult to recover inside a magnetic tape device to a rotating unit of the recovery cassette. Then, the recovery cassette winds the in-device tape connected to the rotating unit without causing the in-device tape to travel on a normal traveling path. Since the winding is not winding by the normal traveling path, an end portion of the in-device tape is not detached from a reel of the magnetic tape device by a normal operation even when the winding is completed. Thus, in the magnetic tape device according to the present example embodiment, a vicinity of the end portion of the in-device tape connected to the reel is cut by a cutting unit. By the cutting, the recovery cassette can be removed from the magnetic tape device.

In this way, the recovery system can improve a probability that an in-device tape can be recovered without previously installing a third recovery system and the like inside the magnetic tape device as in the recovery system according to the first example embodiment.

In the description above, an example of a case where a magnetic tape device is used as the tape device according to the example embodiment is described. However, the tape device according to the example embodiment may be any tape device that performs an operation of storing a tape outside the tape device into the tape device, and taking out the tape to the outside of the tape device again.

Figure 48:
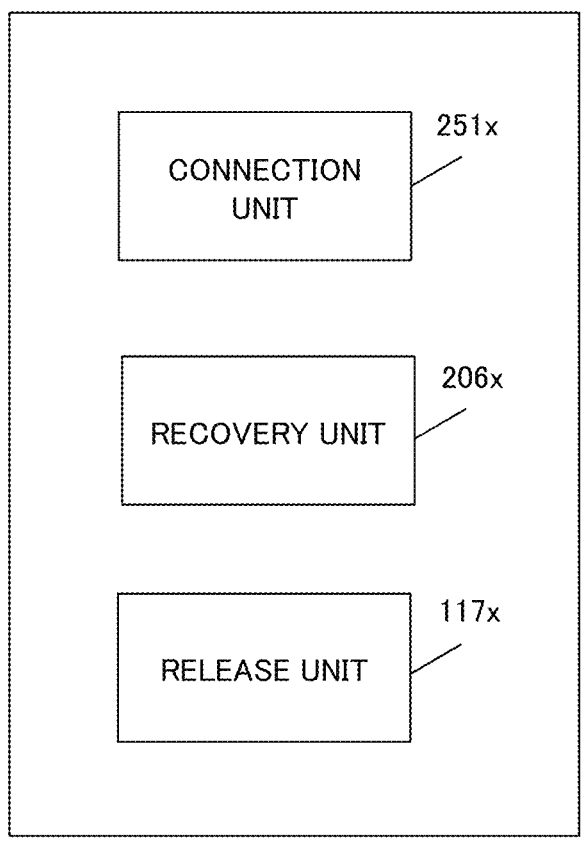
FIG. 48 is a block diagram illustrating a minimum configuration of a recovery device according to an example embodiment.

FIG. 48 is a block diagram illustrating a configuration of a recovery device 202x being a minimum configuration of the recovery device according to the example embodiment.

The recovery device 202x includes a connection unit 251x, a recovery unit 206x, and a cutting unit 117x.

The connection unit 251x attaches one end portion in a longitudinal direction of a recovery tape to a vicinity of another end portion being a free end of a tape member having one end portion in the longitudinal direction being bound to a member.

The recovery unit 206x to which another end portion of the recovery tape is fixed performs winding of the tape and the recovery tape that are attached.

After the attachment, the cutting unit 117x separates the tape from the member at the one end portion or in the vicinity of the one end portion.

The recovery device 202x attaches one end portion in a longitudinal direction of a predetermined recovery tape to a vicinity of another end portion being a free end of a tape having one end portion in the longitudinal direction being bound to a member. In this way, the recovery device 202x can wind, to the recovery unit 206x, the tape having one end portion in the longitudinal direction being bound to binding member.

Then, the recovery device 202x performs winding of the tape and the recovery tape that are attached.

After the attachment, the recovery device 202x further separates the tape from the member at the one end portion or in the vicinity of the one end portion.

As described above, the recovery device 202x can recover the tape from the member.

Thus, the recovery device 202x can improve a probability that a tape remaining inside a tape device can be recovered without disassembling the tape device.

Thus, the recovery device 202x with the above-mentioned configuration achieves the effect described in the section of [Advantageous Effects of Invention].

Note that the recovery device 202x is a combination of, for example, the recovery cassette 202 illustrated in FIGS. 5, 10, 21, 24, 26 to 28, and 33 to 36, and the connection releasing mechanism described in the first example embodiment. Alternatively, the recovery device 202x is a combination of, for example, the recovery cassette 202 illustrated in FIGS. 39 and 41 to 47, and the cutting unit 117 illustrated in FIGS. 37, 38, and 41 to 47.

Further, the connection unit 251x is a combination of, for example, the member 252 illustrated in FIGS. 10, 21, 22, 24, 26 to 28, and 33 to 36, the drive unit (not illustrated) of the member 252, the member 266, and the drive unit (not illustrated) of the member 266. Alternatively, the connection unit 251x is, for example, the member 252a illustrated in FIGS. 39 and 41 to 47 and the drive unit (not illustrated) of the member 252a.

Further, the recovery unit 206x is, for example, the rotating unit 206 illustrated in FIGS. 10, 14, 21, 22, 24, 26 to 28, 33 to 36, 39, and 41 to 47.

Further, the tape is, for example, the magnetic tape 216b illustrated in FIGS. 15 to 18, 20 to 22, 24, 26 to 28, 32 to 36, and 41 to 47.

Further, the one end portion is, for example, the end portion of the magnetic tape 216b fixed to the reel 106 illustrated in FIGS. 15 to 18, 20 to 22, 24, 26 to 28, 33 to 36, and 41 to 47.

Further, the another end portion is, for example, the rupture portion 217b of the magnetic tape 216b illustrated in FIGS. 16 to 18, 20 to 22, 24, 26 to 28, 32, and 33.

Each of the example embodiments of the present invention is described above, but the present invention is not limited to the example embodiments described above, and further modification, replacement, and adjustment can be added without departing from a basic technical idea of the present invention. For example, a configuration of an element illustrated in each of the drawings is one example for facilitating understanding of the present invention, and the present invention is not limited to the configuration illustrated in the drawings.

What is claimed is:

1. A recovery device comprising:
   a connection unit that attaches one end portion in a longitudinal direction of a recovery tape to a vicinity of one end portion in a longitudinal direction of a tape having another end portion being bound to a member;
   a recovery unit to which another end portion of the recovery tape is fixed, and that performs winding of the tape and the recovery tape that are attached; and
   a cutting unit that separates the tape from the member at the one end portion or in a vicinity of the one end portion after the attachment, wherein
   the cutting unit is included in a tape device including the member, and
   the connection unit and the recovery unit are included in a second device that can be mounted on the tape device.

2. The recovery device according to claim 1, wherein the cutting unit performs the separation when the winding is performed on the tape traveling on a predetermined traveling path.

3. The recovery device according to claim 2, further comprising:
   a first attaching unit that performs first attachment being the attachment on the tape in a vicinity of a first end portion of a second tape installed in a position that is located outside the traveling path with respect to the member and has no obstruction of a movement to the traveling path on a way to the traveling path; and
   a second attaching unit that performs second attachment being the attachment on the recovery tape in a vicinity of a second end portion of the second tape.

4. The recovery device according to claim 3, wherein the first attaching unit performs the first attachment by attaching the tape and the second tape to a first connection member included in the first attaching unit.

5. The recovery device according to claim 4, wherein the first connection member is a third tape.

6. The recovery device according to claim 5, wherein the first attaching unit performs the first attachment on the tape in a vicinity of a third end portion being an end portion of the tape to the third tape in a vicinity of a fourth end portion being one end portion of the third tape, and the first attachment on the second tape in a vicinity of the first end portion to the third tape in a vicinity of a fifth end portion being another end portion of the third tape.

7. The recovery device according to claim 6, wherein a vicinity of the fourth end portion of the third tape is bonded to the first attaching unit by first bonding strength, and the first bonding strength has strength to a degree of being peeled by the winding.

8. The recovery device according to claim 6, wherein a vicinity of the fourth end portion of the third tape has a shape of being bent in an opposite direction to a direction in which a first attaching member being a member for performing the first attachment on the third tape is present.

9. The recovery device according to claim 8, wherein a vicinity of the fifth end portion of the third tape is bonded to the first attaching unit by second bonding strength, and the second bonding strength has strength to a degree of being peeled by the winding.

10. The recovery device according to claim 8, wherein a vicinity of the fifth end portion of the third tape has a shape of being bent in an opposite direction to a direction in which a first attaching member being a member for performing the first attachment on the third tape is present.

11. The recovery device according to claim 10, wherein the shape of being bent of the third tape is maintained by third bonding strength being bonding strength of a contact location of the third tape in which a mutual contact is made by bending, and the third bonding strength has strength to a degree of being peeled by the winding.

12. The recovery device according to claim 3, wherein the first attaching unit performs the first attachment by electric power.

13. The recovery device according to claim 3, wherein the second attaching unit performs the second attachment on a second connection member connected to the recovery unit.

14. The recovery device according to claim 13, wherein the second connection member is a fourth tape.

15. The recovery device according to claim 14, wherein the second attaching unit performs the second attachment by performing the attachment on the fourth tape in a vicinity of a sixth end portion being an end portion of the fourth tape that is not connected to other.

16. A recovery system comprising:
    a recovery device;
    a tape device to which the recovery device is mountable;
    a connection unit of the recovery device that attaches one end portion in a longitudinal direction of a recovery tape to a vicinity of one end portion in a longitudinal direction of a tape having another end portion being bound to a member;
    a recovery unit of the recovery device to which another end portion of the recovery tape is fixed, and that performs winding of the tape and the recovery tape that are attached; and
    a cutting unit of the tape device that separates the tape from the member at the one end portion or in a vicinity of the one end portion after the attachment.

17. The recovery system of claim 16, further comprising:
    an installation unit of the tape device that installs the second tape member.

18. A recovery method comprising:
    attaching, via a connection unit, one end portion in a longitudinal direction of a recovery tape to a vicinity of one end portion in a longitudinal direction of a tape having another end portion being bound to a predetermined member;
    performing, via a recovery unit, winding of the tape and the recovery tape that are attached, another end portion of the recovery tape being fixed; and
    separating, via a cutting unit, the tape from the member at the one end portion or in a vicinity of the one end portion after the attachment, wherein
    the cutting unit is included in a tape device including the member, and the connection unit and the recovery unit are included in a second device that can be mounted on the tape device.

* * * * *